(12) United States Patent
Crain et al.

(10) Patent No.: US 7,240,881 B2
(45) Date of Patent: Jul. 10, 2007

(54) GEOMATIC SUPPORT HAVING HINGED LEGS WITH HINGE LOCK

(75) Inventors: Stephen B. Crain, Cape Girardeau, MO (US); Christopher T. Moore, Creal Springs, IL (US); Ralph C. Mize, Jonesboro, IL (US); Jerry L. Williamson, Olmsted, IL (US); Larry W. Essex, Villa Ridge, IL (US)

(73) Assignee: Crain Enterprises, Inc., Mound City, IL (US)

( * ) Notice: Subject to any disclaimer, the term of this patent is extended or adjusted under 35 U.S.C. 154(b) by 0 days.

(21) Appl. No.: 11/332,958

(22) Filed: Jan. 17, 2006

(65) Prior Publication Data

US 2006/0118681 A1 Jun. 8, 2006

Related U.S. Application Data

(63) Continuation of application No. 10/418,553, filed on Apr. 18, 2003, now Pat. No. 7,048,241.

(60) Provisional application No. 60/432,375, filed on Dec. 11, 2002, provisional application No. 60/373,885, filed on Apr. 19, 2002.

(51) Int. Cl.
*F16M 11/16* (2006.01)

(52) U.S. Cl. .................. 248/188; 248/168; 248/170

(58) Field of Classification Search ............ 248/170, 248/171, 163.1, 166, 168, 173, 440.1, 579; 403/157, 324, 325, 84, 91
See application file for complete search history.

(56) References Cited

U.S. PATENT DOCUMENTS

| 175,407 | A | 3/1876 | Beaumont, Jr. |
|---|---|---|---|
| 361,527 | A | 4/1887 | Kazanjian |
| 446,472 | A | 2/1891 | Roberts |
| 769,447 | A | 9/1904 | McKinney |
| 1,034,365 | A | 7/1912 | Hauser |
| 1,153,371 | A | 9/1915 | Carter |
| 1,597,095 | A | 8/1926 | Martinsen |
| 1,646,064 | A | 10/1927 | Obermeyer, Jr. |
| 1,650,747 | A | 11/1927 | Thalhammer |
| 1,714,006 | A | 5/1929 | Eilenberg |
| 1,780,039 | A | 10/1930 | Pechan |
| 1,780,308 | A | 11/1930 | Morris |
| 1,818,977 | A | 8/1931 | Gray |

(Continued)

FOREIGN PATENT DOCUMENTS

FR  2706014 A1 * 12/1994

OTHER PUBLICATIONS

Gardner Engineering, Rod Rest, www.rodrest.net, 2002, 1 page, Parkway Ogden, Utah.

(Continued)

*Primary Examiner*—Anita M. King
(74) *Attorney, Agent, or Firm*—Senniger Powers

(57) ABSTRACT

A support capable of supporting geomatic equipment has hinged legs which allow the legs to pivot about a horizontal axis to selected positions. A hinge lock associated with each of the legs allows the leg to be locked in the selected angular position. Locking of the legs in this manner facilitates stability of the support.

19 Claims, 63 Drawing Sheets

U.S. PATENT DOCUMENTS

| | | | |
|---|---|---|---|
| 1,973,226 | A | 9/1934 | Rose et al. |
| 2,002,756 | A | 5/1935 | Segelhorst |
| 2,238,708 | A | 4/1941 | Russell |
| 2,245,901 | A | 6/1941 | Chaskin |
| 2,275,330 | A | 3/1942 | Tveten |
| 2,467,567 | A | 4/1949 | Price |
| 2,490,369 | A | 12/1949 | Neuwirth |
| 2,508,039 | A | 5/1950 | Neuwirth |
| 2,587,511 | A * | 2/1952 | Nerman ............... 248/169 |
| 2,600,713 | A | 6/1952 | Wells |
| 2,668,682 | A | 2/1954 | Dalton |
| 2,687,866 | A | 8/1954 | Johnson |
| 2,733,881 | A | 2/1956 | Threlfall et al. |
| 2,788,578 | A | 4/1957 | Digiacinto |
| 2,790,617 | A * | 4/1957 | Harland ............... 248/278.1 |
| 2,835,975 | A | 5/1958 | Zimmerman |
| 3,051,425 | A | 8/1962 | Homrighausen |
| 3,077,035 | A | 2/1963 | Hackney |
| 3,128,982 | A * | 4/1964 | Christopher ........... 248/183.2 |
| 3,195,234 | A | 7/1965 | Glidden et al. |
| 3,207,100 | A | 9/1965 | Peacock |
| 3,239,176 | A | 3/1966 | Johnson |
| 3,437,156 | A | 4/1969 | Laverty |
| 3,519,234 | A | 7/1970 | Matson |
| 3,559,357 | A | 2/1971 | Lowe |
| 3,570,130 | A | 3/1971 | Boehm |
| 3,598,066 | A | 8/1971 | Polezoes |
| 3,655,160 | A | 4/1972 | Grillot |
| 3,685,162 | A | 8/1972 | Haun |
| 3,727,872 | A | 4/1973 | Spieth et al. |
| 3,840,042 | A | 10/1974 | Siegal |
| 3,855,710 | A | 12/1974 | Lunden |
| 3,866,758 | A | 2/1975 | Strassle |
| 3,963,207 | A | 6/1976 | Guasti |
| 4,017,152 | A | 4/1977 | Allen |
| 4,113,222 | A | 9/1978 | Frinzel |
| 4,146,969 | A | 4/1979 | Chaires |
| 4,167,352 | A | 9/1979 | Pletscher |
| 4,192,076 | A | 3/1980 | Hall |
| 4,208,946 | A | 6/1980 | Van Sickle |
| 4,270,721 | A | 6/1981 | Mainor, Jr. |
| 4,290,207 | A | 9/1981 | Browning et al. |
| 4,317,552 | A | 3/1982 | Weidler |
| 4,317,553 | A | 3/1982 | Meinunger |
| 4,348,034 | A | 9/1982 | Welt |
| 4,356,637 | A | 11/1982 | Hall |
| 4,366,940 | A | 1/1983 | Vargas |
| 4,640,482 | A | 2/1987 | Rogers |
| 4,671,713 | A * | 6/1987 | Lenkman ............... 410/7 |
| 4,695,021 | A | 9/1987 | Leinfelder |
| 4,705,491 | A | 11/1987 | Andersson |
| 4,706,916 | A | 11/1987 | Cullmann et al. |
| 4,754,841 | A | 7/1988 | Koffski |
| 4,767,090 | A | 8/1988 | Hartman et al. |
| 4,803,784 | A | 2/1989 | Miller |
| 4,803,812 | A | 2/1989 | Alexander, Sr. |
| 4,817,898 | A | 4/1989 | Locher |
| 4,832,296 | A | 5/1989 | Schnepp |
| 4,879,816 | A | 11/1989 | Sierk |
| 4,905,718 | A | 3/1990 | Vandiver |
| 4,926,561 | A | 5/1990 | Miller |
| 4,929,113 | A * | 5/1990 | Sheu ............... 403/157 |
| 4,940,203 | A | 7/1990 | Hayakawa |
| 4,941,763 | A | 7/1990 | Euteneuer |
| 5,072,910 | A | 12/1991 | May |
| 5,148,641 | A | 9/1992 | Rushing et al. |
| 5,154,377 | A | 10/1992 | Suk |
| 5,156,110 | A | 10/1992 | Fuller |
| 5,226,340 | A | 7/1993 | Takeda |
| 5,230,187 | A | 7/1993 | Reimann |
| 5,234,267 | A | 8/1993 | Pauer et al. |
| 5,238,321 | A | 8/1993 | Jarjoura |
| 5,320,316 | A | 6/1994 | Baker |
| 5,386,961 | A | 2/1995 | Lu |
| 5,400,516 | A | 3/1995 | Kellenberger |
| 5,425,452 | A | 6/1995 | Shanks et al. |
| 5,442,866 | A | 8/1995 | Woods |
| 5,459,934 | A | 10/1995 | Heroux |
| 5,492,430 | A | 2/1996 | Jones |
| 5,577,799 | A | 11/1996 | St. Germain |
| 5,613,580 | A | 3/1997 | Young |
| 5,614,918 | A | 3/1997 | Dinardo et al. |
| 5,662,296 | A | 9/1997 | Wu |
| 5,720,369 | A | 2/1998 | Thorn |
| 5,740,998 | A | 4/1998 | Lindsay |
| 5,749,549 | A | 5/1998 | Ashjaee |
| 5,769,370 | A | 6/1998 | Ashjaee |
| 5,791,609 | A | 8/1998 | Hankins |
| 5,794,899 | A | 8/1998 | Tamllos |
| 5,823,491 | A * | 10/1998 | Lindsay et al. ............... 248/169 |
| 5,964,443 | A | 10/1999 | Leveille |
| 6,027,086 | A | 2/2000 | Heitlinger et al. |
| 6,031,170 | A | 2/2000 | Hoshino |
| 6,050,531 | A | 4/2000 | Wilcox |
| 6,161,807 | A * | 12/2000 | Steiner et al. ............... 248/166 |
| 6,206,139 | B1 | 3/2001 | Bogart, Jr. |
| 6,234,442 | B1 | 5/2001 | Huang |
| 6,254,043 | B1 | 7/2001 | Schwärzler |
| 6,311,537 | B1 | 11/2001 | Vigil |
| 6,349,905 | B1 | 2/2002 | Mills |
| 6,398,247 | B1 | 6/2002 | Kuo |
| 6,409,412 | B1 | 6/2002 | Huang |
| 6,476,300 | B1 | 11/2002 | Kurosaki |
| 6,502,321 | B1 | 1/2003 | Crain et al. |
| 6,536,723 | B1 | 3/2003 | Nakatani |
| 6,631,877 | B1 | 10/2003 | Crain et al. |
| 6,672,026 | B2 | 1/2004 | Sumerak |
| 6,688,012 | B1 | 2/2004 | Crain et al. |
| 6,688,566 | B1 | 2/2004 | Crain et al. |
| 6,702,482 | B2 | 3/2004 | Sherwin |
| 6,711,826 | B2 | 3/2004 | Crain et al. |
| 6,772,526 | B1 | 8/2004 | Crain et al. |
| 6,824,319 | B1 | 11/2004 | Speggiorin |
| 6,951,326 | B2 * | 10/2005 | Vanover ............... 248/170 |
| 2002/0084617 | A1 | 7/2002 | Torsiello |
| 2003/0042388 | A1 | 3/2003 | Peterson |
| 2003/0226944 | A1 | 12/2003 | Sode |
| 2003/0234327 | A1 * | 12/2003 | Nakatani ............... 248/177.1 |
| 2004/0206879 | A1 | 10/2004 | Steyn et al. |

OTHER PUBLICATIONS

Seco Prism Pole Tripod, www.hayesinstrument.com, 2001, 1 page, Shelbyville, Tennessee.

Seco Prism Pole Bipod, www.hayesinstrument.com, 2001, 1 page, Shelbyville, Tennessee.

* cited by examiner

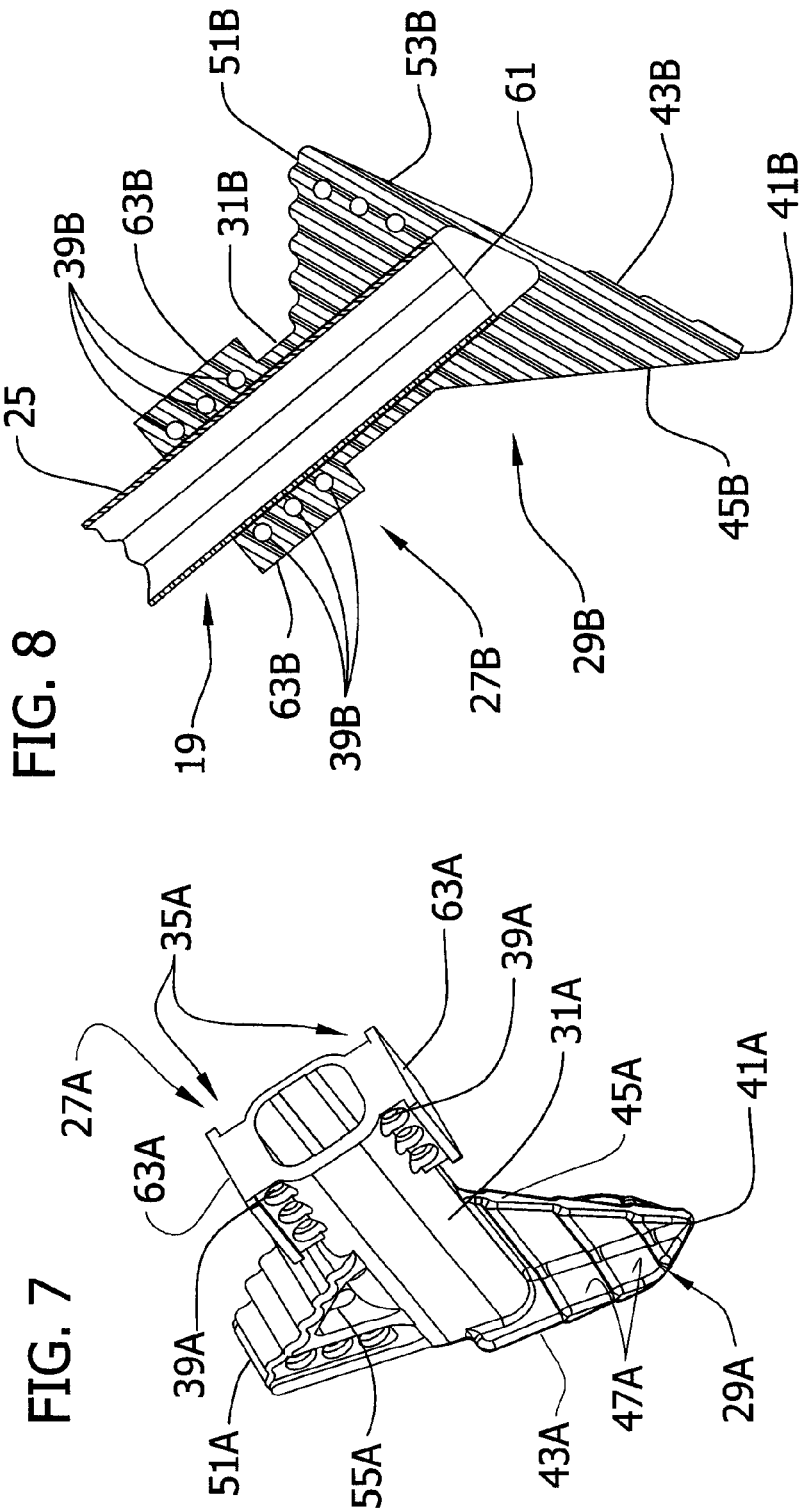

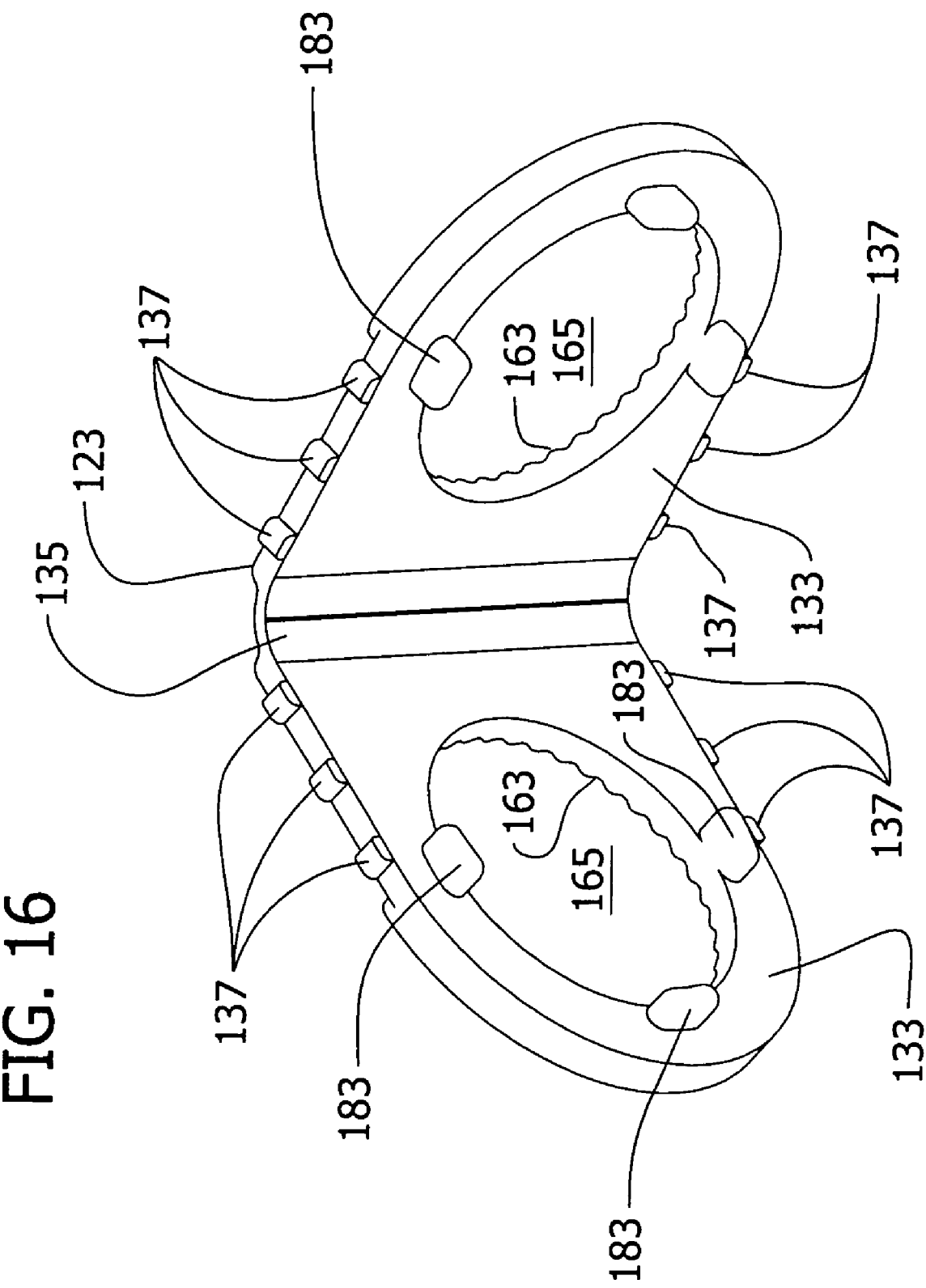

FIG. 31
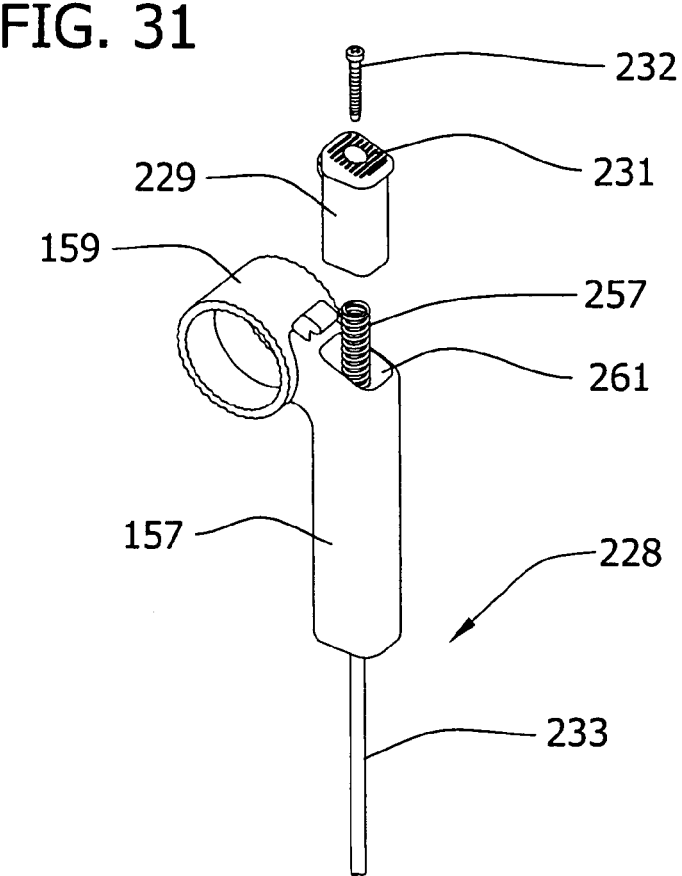
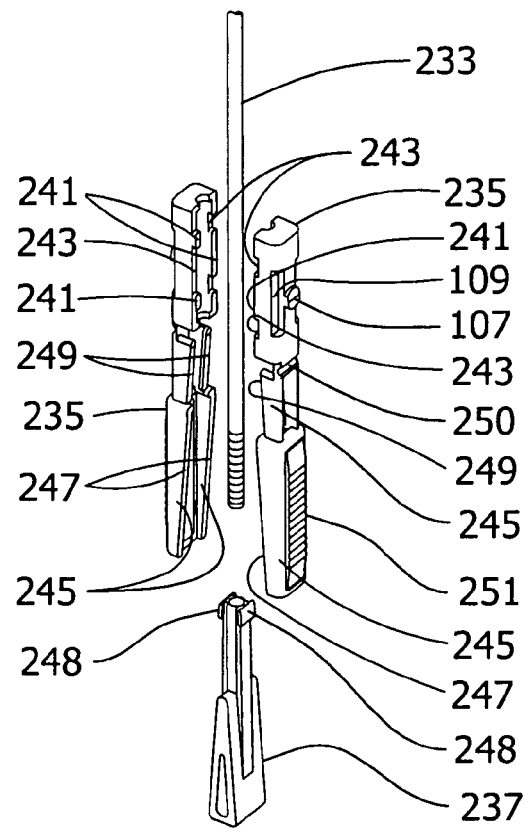

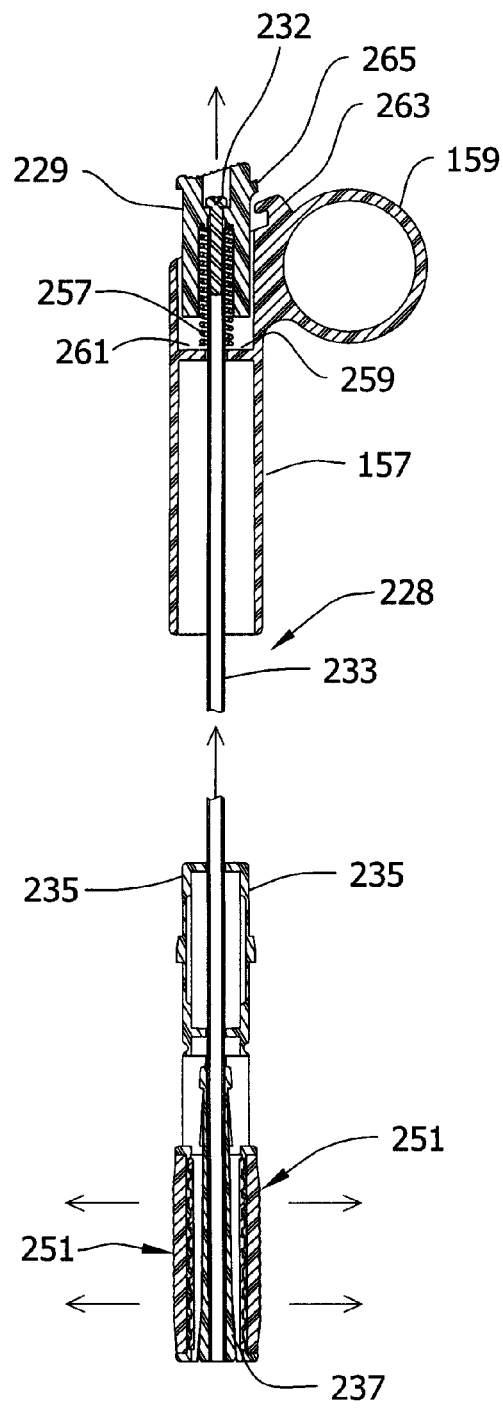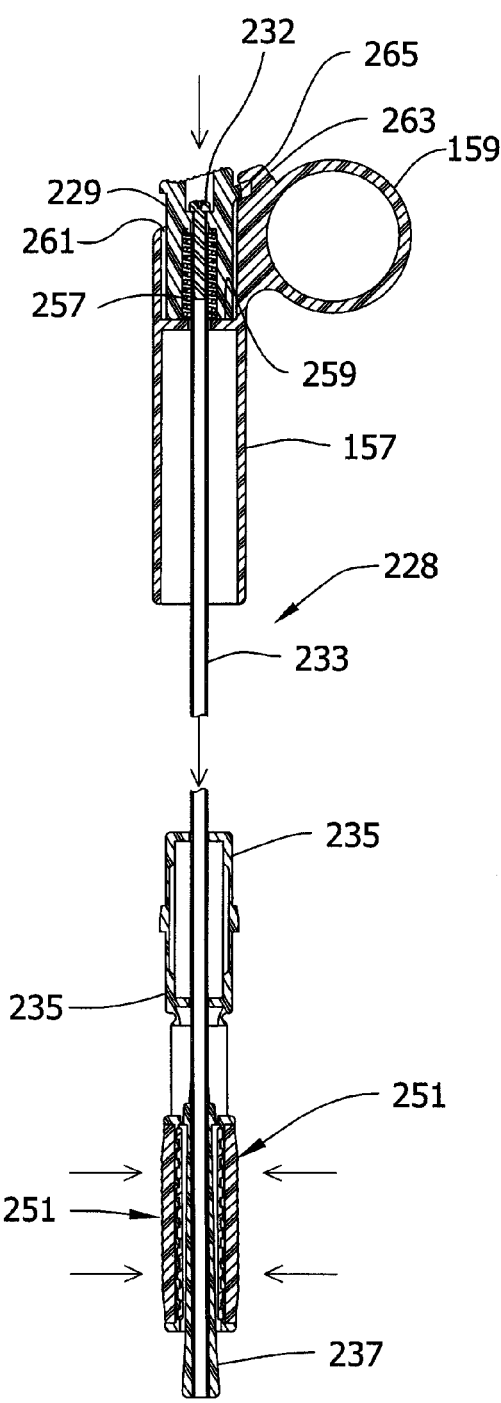

GEOMATIC SUPPORT HAVING HINGED LEGS WITH HINGE LOCK

CROSS-REFERENCE TO RELATED APPLICATION

This application is a continuation of U.S. patent application Ser. No. 10/418,553, filed Apr. 18, 2003 now U.S. Pat. No. 7,048,241, which claims the benefit of U.S. Provisional Application 60/373,885, filed Apr. 19, 2002, and U.S. Provisional Application 60/432,375, filed Dec. 11, 2002. All of which are hereby incorporated by reference.

BACKGROUND OF THE INVENTION

This invention relates generally to devices which support and hold equipment and more particularly to a foot for such devices suitable for holding geomatic equipment and accessories.

Although the art of surveying is old, recent improvements in equipment, such as automatic electronic total surveying stations, have increased the accuracy of the surveying instruments far beyond what was possible previously. Where accepted accuracy for equipment in the not too distant past was 20 seconds of a degree, accuracy is now commonly required to be 1 second of a degree. At these levels of precision, the instruments and many of their accessories must be supported in a manner which is consistent and stable. Accordingly, there is a need for closer examination of support structure used for surveying equipment so that improvements in instrumentation will not be lessened by inadequate supports. Further, the cost of surveying equipment makes it highly undesirable to damage it by failure of the supports because of instability.

Pole supports used in the surveying field typically take the form of bipods or tripods, but conceivably any number of legs could be provided. Conventionally, it has been necessary to provide completely separate inventories of bipods and tripods to meet the needs of different customers and for different applications. Legs of these supports are usually freely pivotable about a head of the support to swing toward each other for ease of carrying the support when not in use. A support having three or more legs can support equipment or other items above and out of contact with the ground. Typically, bipods are used to support surveying equipment such as a surveying pole, which also contacts the ground, but tripods may also be used to support surveying poles. The stability of such supports can be compromised in situations where there are forces (e.g., wind and loads from the surveying equipment) acting on the support and tending to tip the support over. In that case, one of the legs is subjected to an upward force component tending to raise the leg up as the support pivots about a point(s) of contact of the other leg(s) with the ground.

Presently, there is little or no resistance provided by the legs to such upward forces other than the weight of the leg. Even if there are stakes associated with the legs that penetrate the ground, the upward force tends to be directed right along the long axis of the stakes so that they are lifted out of the ground. The problem is compounded by the fact that the legs conventionally are mounted for pivoting freely about a horizontal axis. Even if the support does not tip over, if one leg loses contact with the ground or the frictional resistance to pivoting movement of the leg becomes sufficiently small, the leg will swing in toward the center of the support. The support is unlikely to regain stability when this happens. Should the support move back toward its original position, the leg having pivoted inwardly is no longer in position to engage the ground in a stable position. The center of gravity of the combined support and surveying equipment may lie outward of the point where the leg re-contacts the ground so that the entire unit topples over in the opposite direction from the initial tipping movement. Alternatively as the leg pivots inwardly, the weight of the leg exerts a smaller torque resisting the tipping motion so that the motion may continue causing the unit to collapse. If instability of the support causes it to move, even where it does not fall over, accuracy is compromised.

It may be difficult to position the surveying pole in the correct location when a support is attached to the pole and the legs of the support are in a stowed position. The legs can obstruct the surveyor's view of the bottom point of the pole. It is desirable for the legs to be capable of retracting to a short length to reduce the obstruction. However, any items attached to the lower ends of the legs to facilitate securing the ends in the ground project down below the lower ends, increasing the effective retracted length of the leg and making it more difficult to remove the items as an obstruction by retracting the length of the legs.

Although the present invention has particular application for use in supporting surveying and geographic positioning equipment, it is not limited to such applications. As used herein "geomatic" is intended to encompass surveying and geographic positioning. The invention is envisioned as being useful to support equipment and other items having no relation to surveying or geographic positioning.

SUMMARY OF THE INVENTION

In one aspect of the invention, a support for use in supporting geomatic equipment generally comprises a head and at least one leg for use in supporting the head above the ground. A hinge is adapted to connect the leg to the head for pivoting movement of the leg about an axis relative to the head in directions outwardly from the head and inwardly toward the head. A hinge lock is adapted to lock the leg in a fixed position of pivoting relative to the head. A hinge lock actuator is rotatable between a locked position of the hinge lock in which the leg is held in the fixed position, and an unlocked position in which the leg is free to pivot with respect to the head. The actuator is constrained for rotation between a first position corresponding to the locked position and a second position corresponding to the unlocked position. The actuator is movable between the first position and the second position by rotating the actuator less than 180°.

In another aspect of the invention, a support for use in supporting geomatic equipment generally comprises a head, and at least one leg for use in supporting the head above the ground. A hinge is adapted to connect the leg to the head for pivoting movement of the leg about an axis relative to the head in directions outwardly from the head and inwardly toward the head. A hinge pin is attached to the head. The hinge pin has a diameter at least about as great as the length of the pin thereby providing a large cylindrical surface on which the hinge may turn.

The objects and features of the present invention will be in part apparent and in part pointed out hereinafter.

BRIEF DESCRIPTION OF THE DRAWINGS

FIG. 7 is an interior perspective of another form of the foot;

FIG. 8 is a longitudinal section of the foot and leg portion of FIG. 9;

FIG. 16 is an enlarged perspective of the front wall of the head showing an outer surface thereof;

FIG. 31 is an exploded perspective of an extension locking device of the leg;

FIG. 33 is a schematic section of the locking device in a lock position;

FIG. 34 is a schematic section of the locking device in an unlock position;

Corresponding reference characters indicate corresponding parts throughout the several views of the drawings.

DETAILED DESCRIPTION OF THE PREFERRED EMBODIMENTS

Figure 1:
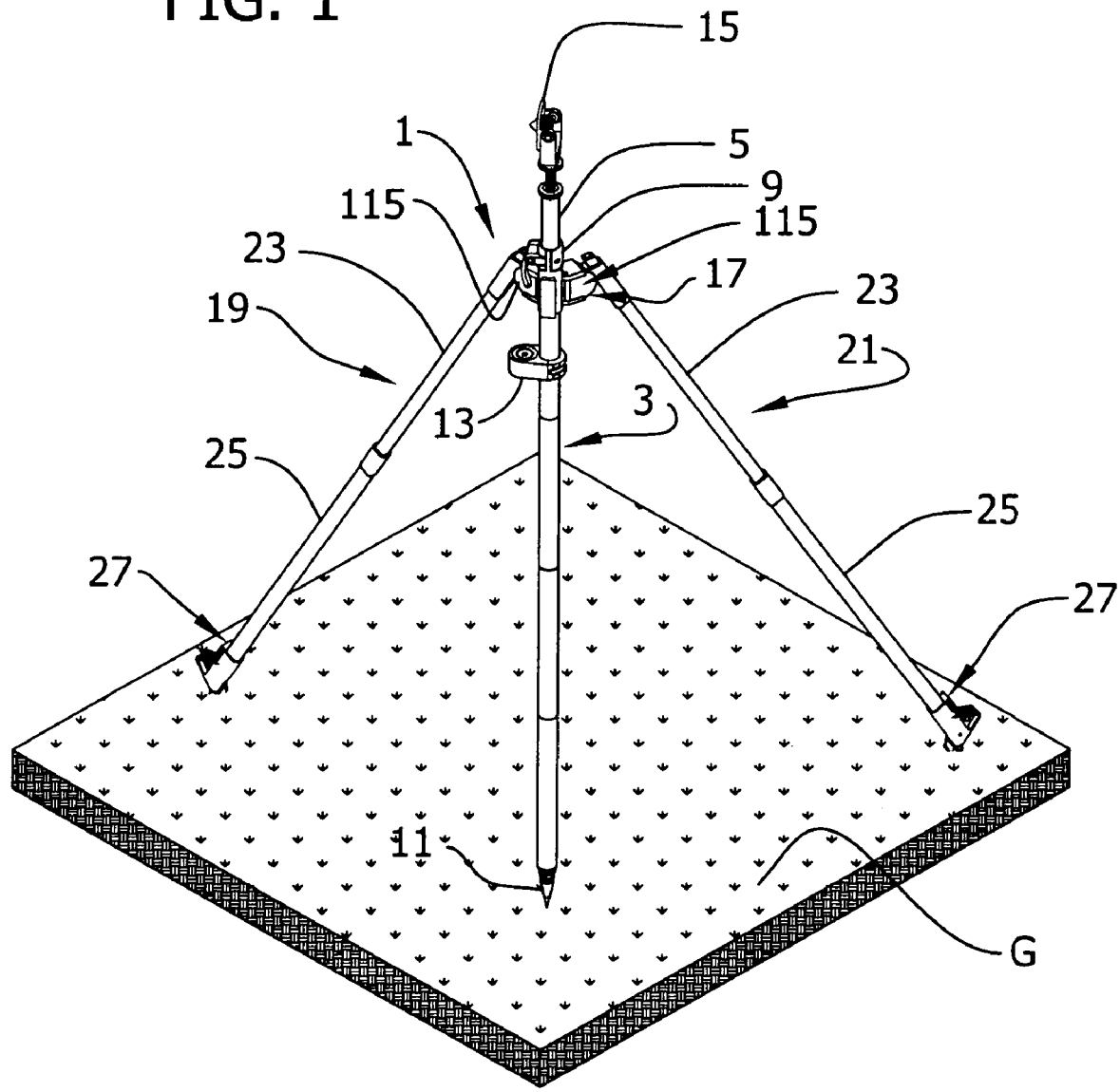
FIG. 1 is a perspective of a bipod support holding a surveying pole in an upright position on a plot of ground.
Figure 2:
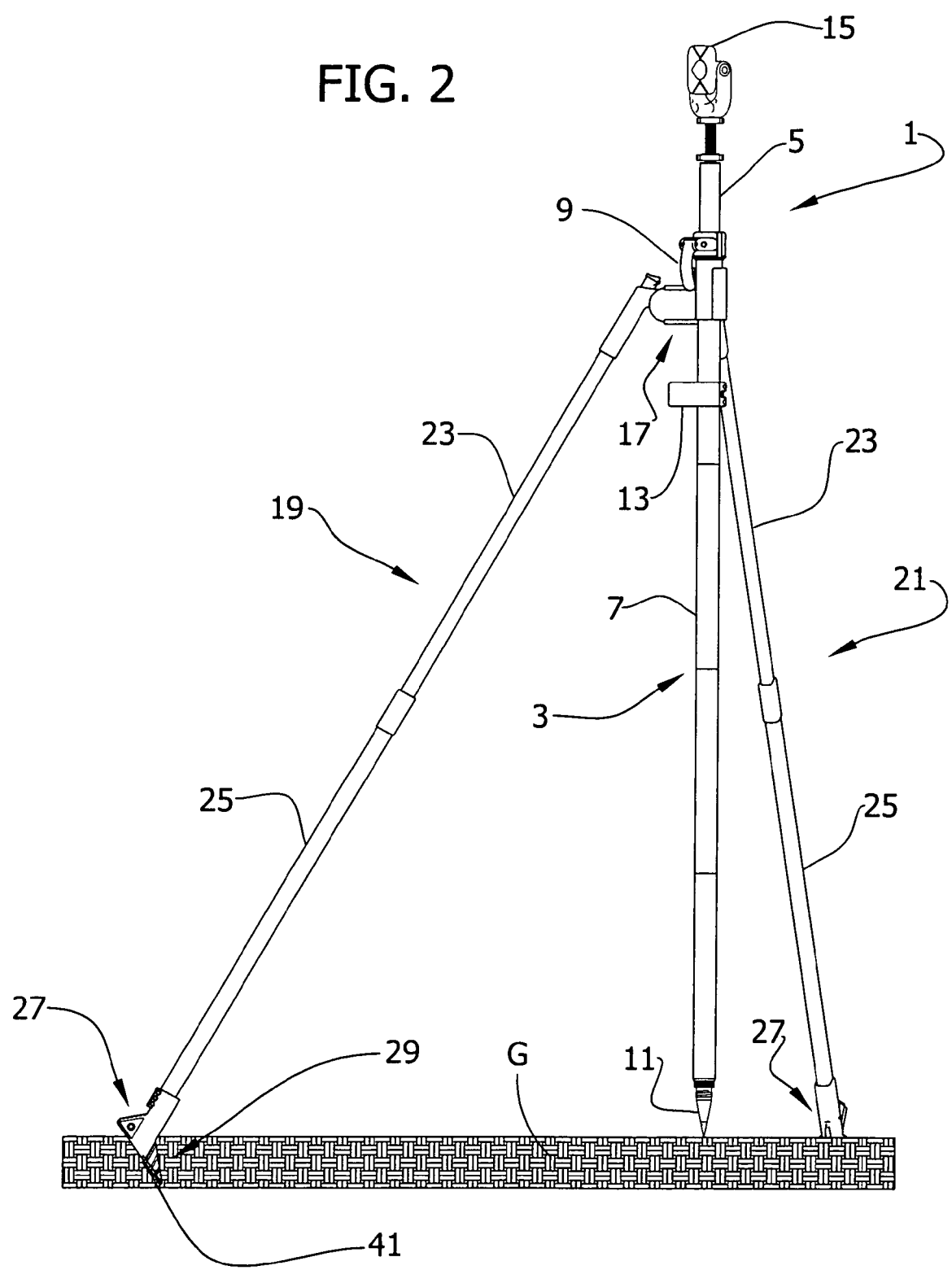
FIG. 2 is a side elevation of the bipod support and surveying pole.

Referring now to the drawings, and in particular to FIGS. 1 and 2, a support of the present invention is shown in the form of a bipod support 1 holding a surveying pole 3 in an upright position on a plot of ground G (the numbers designated their subjects generally). The pole 3 is extensible and retractable and includes an upper section 5 and a lower section 7 telescopingly receiving the upper section. The upper and lower pole sections 5, 7 are held in a selected position of extension by a clamp 9 located at the joint of the upper and lower pole sections. Typically, the upper section 5 has indicia (not shown) indicating the height above the ground. A pointed tip 11 is mounted on the lower end of the lower pole section 7 and engages the ground G. A level 13 mounted on the lower pole section 7 is used to position the surveying pole 3 vertically upright. In the illustrated embodiment, a prism 15 at the top of the pole 3 is used to sight or determine positions with laser, modulated infrared, angular and/or GPS position locators or the like. The prism 15 reflects light back to the position locator for establishing the location of the prism in a survey. However, it is to be understood that other items could be located at the top of the pole without departing from the scope of the present invention. Reference is made to co-assigned U.S. application Ser. No. 09/648,172, filed Aug. 25, 2000 (the disclosure of which is incorporated herein by reference), showing and describing a surveying pole of the same general type as the present invention.

The bipod support 1 includes a head 17 connected to the surveying pole 3, a first leg 19 and a second leg 21 (the reference numbers designating their subjects generally). The first and second legs 19, 21 are mounted on the head 17 for pivoting inwardly and outwardly with respect to the head about a generally horizontal pivot axis. Each leg (19 and 21) includes a first section 23 telescopingly received in a second section 25 so that the leg can be selectively increased or decreased in length. The operation of the leg (19 or 21) to extend and retract will be described in more detail hereinafter. Each leg (19 and 21) further includes a foot (generally indicated at 27) at its free end (opposite the head 17) which engages the ground G. The foot 27 is capable of penetrating the ground G to facilitate positive location of the ends of the first and second legs. A ground penetrating portion (generally indicated at 29) of each foot 27 penetrates the ground G and is obscured from view by the ground in FIG. 1. In FIG. 2, the ground penetrating portion 29 of the foot 27 of leg 19 may be seen under the ground.

A description of the foot 27 will be made with reference to the leg 19, the foot on the other leg 21 being of the same construction and arrangement. Referring now to FIGS. 2A, 3, 5 and 6, each foot 27 is shown to include a sleeve 31 receiving an end portion of the leg 19. The ground penetrating portion 29 extends from one side of the sleeve 31 in an inward direction (generally toward the head 17 and surveying pole 3) and a pedal 33 extends from the opposite side. A mount generally indicated at 35 and located at the top of the sleeve may be used to attach an article (not shown) to the foot 27. The mount 35 is undercut on both sides, leaving laterally projecting lips 37 for use in a tongue in groove type connection which is the same as will be described more fully below. The word "undercut" is used to herein to describe the final shape of the mount 35, not the method for forming the mount, which in a preferred embodiment would be molded with the other parts of the foot 27. Holes 39 extending through the mount 35 in the undercut portion can be used for bolting an article to the foot 27. In the illustrated embodiment, the ground penetrating portion 29, sleeve 31, pedal 33 and mount 35 are formed as one piece from a suitable polymeric material. However, it is to be understood that the foot 27 may be formed in multiple pieces and from other materials (e.g., metal) without departing from the scope of the present invention.

Figure 2A:
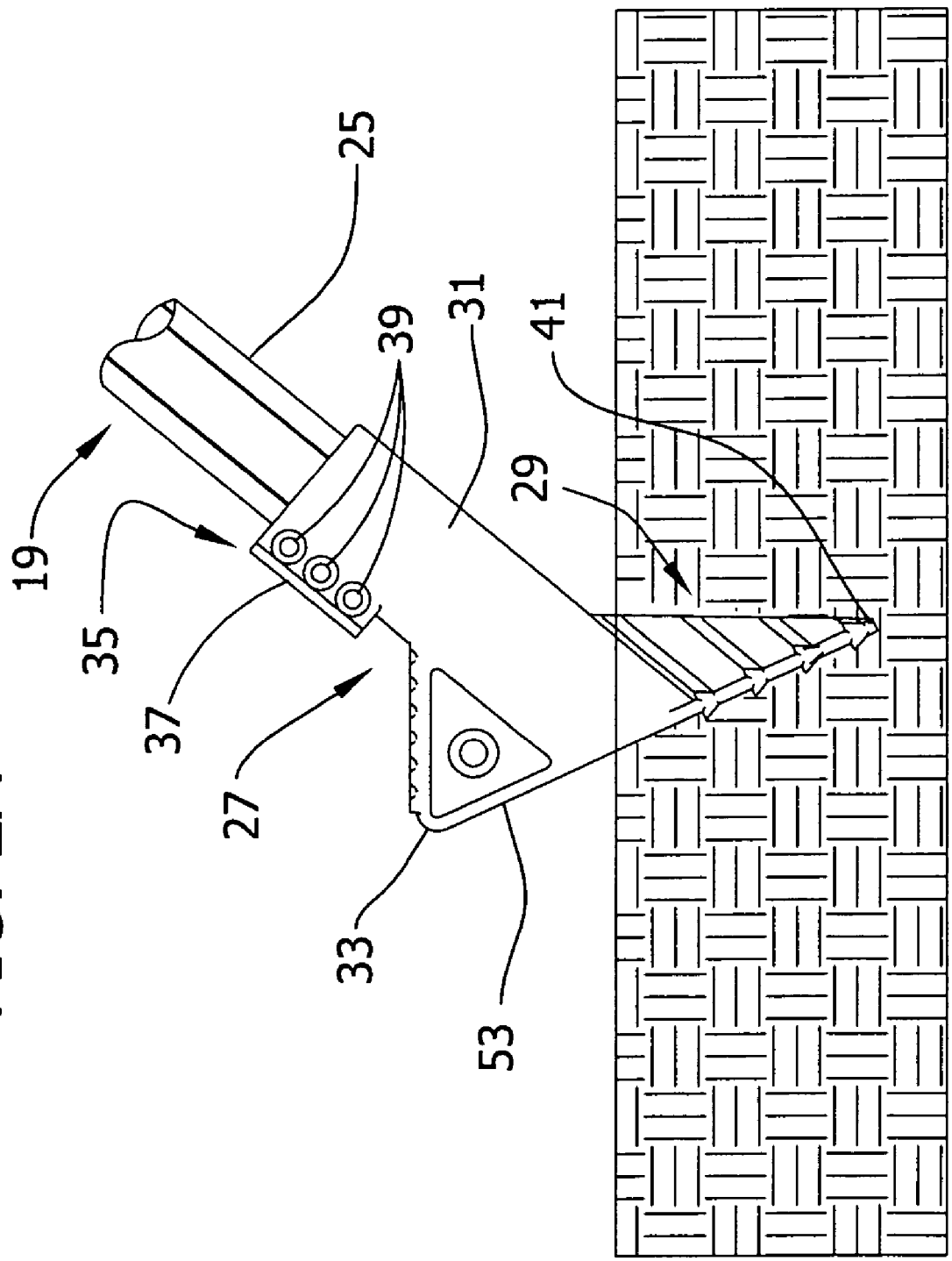
FIG. 2A is an enlarged, fragmentary elevation of the bipod support, showing a foot of the bipod support embedded in the ground.
Figure 4:
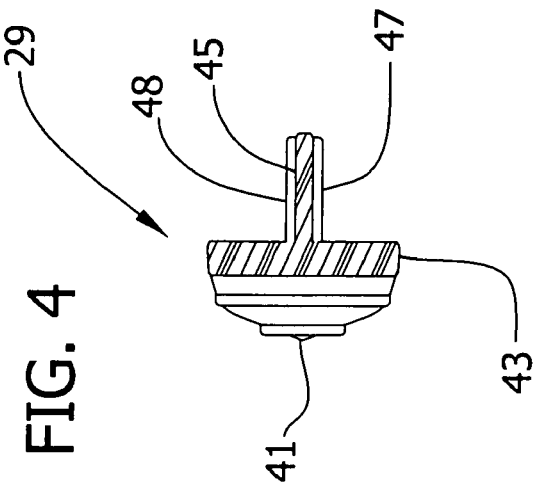
FIG. 4 is a section taken in the plane including line 4-4 of FIG. 3.
Figure 3:
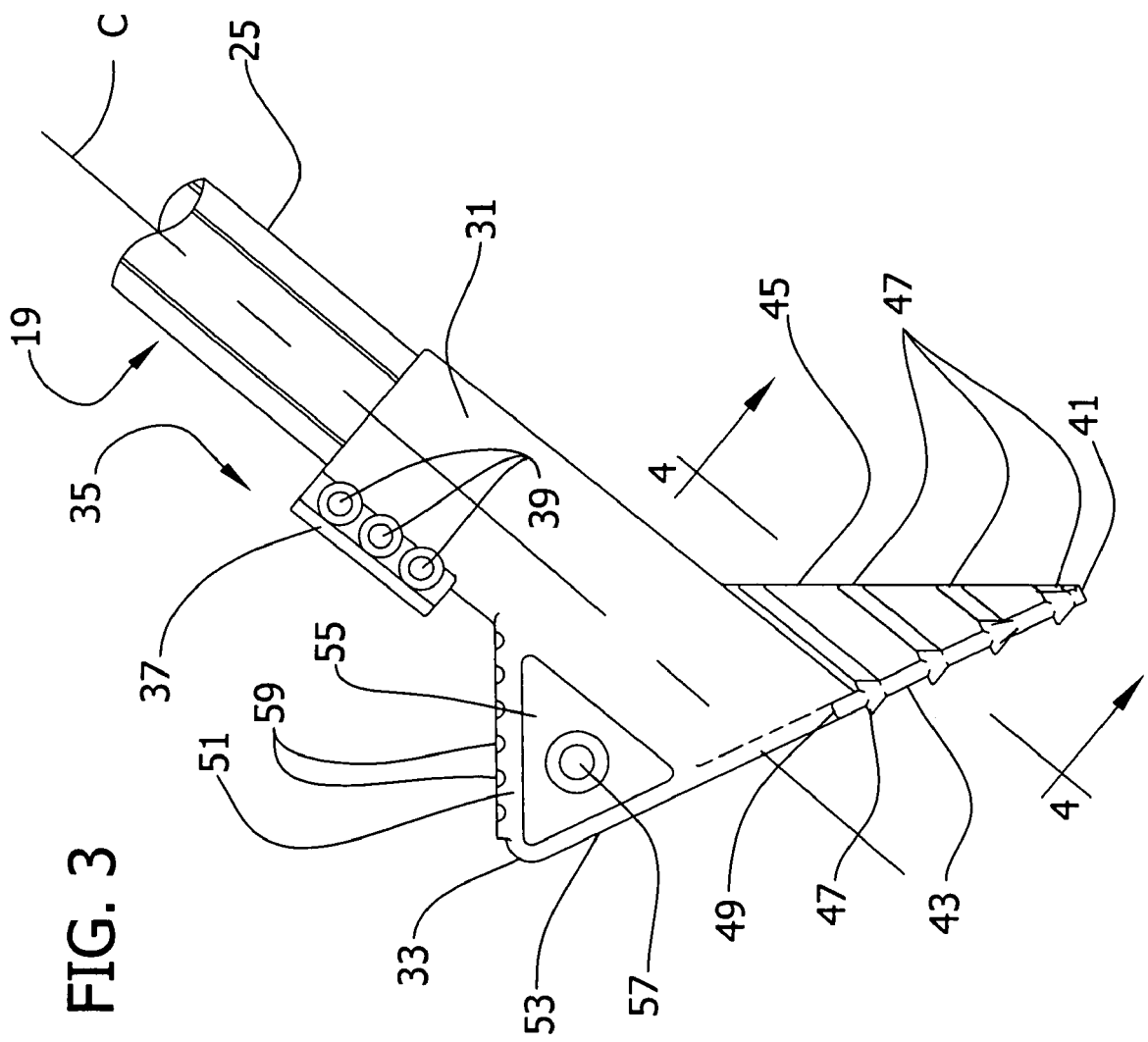
FIG. 3 is an enlarged fragmentary elevation of a lower end of a leg of the bipod showing a foot thereof.

The ground penetrating portion 29 has a tip 41 which, as can be seen in FIG. 2A, is located inward and under the leg 19 when penetrating the ground G. In the illustrated embodiment, the entire ground penetrating portion 29 occupies this position with earth located above the ground penetrating portion and between the portion and the leg 19. Therefore, support 1 resists forces in both directions along the length of the leg 19 to maintain stability of the support. Forces applied downwardly along the leg 19 are resisted by the rigidity of the leg and engagement of the foot 27 with the ground G. Upwardly directed forces along the leg 19 are resisted by the ground penetrating portion 29. Upwardly directed forces might occur if the bipod support 1 and surveying pole 3 were subject to a force tending to tip them to the right as shown in FIG. 2. The weight of the earth above the first wall 43 of the ground penetrating portion 29 holds the foot 27 in place against such upward movement. The ground penetrating portion 29 is particularly constructed to facilitate retention, and also initial penetration of the ground G. More particularly, the ground penetrating portion 29 comprises a first wall 43 and a second wall 45 intersecting the first wall generally at right angles so that the ground penetrating portion has a generally "T" shape in cross section (see FIG. 4). The first wall 43 tapers from its widest dimension near the sleeve to the tip 41, roughly in the shape of a spade. The angle made by the first wall 43 relative to the centerline C of the leg 19 (and sleeve 31) preferably about 90° (i.e., perpendicular) to about 150°. As illustrated in FIG. 3, the angle of the first wall 43 is about 120°.

The second wall 45 acts as a gusset to strengthen the ground penetrating portion 29 without substantially increasing the cross section of the ground penetrating portion presented to the ground G when the foot 27 is pushed into the ground. The second wall 45 has a roughly triangular shape, tapering toward the tip 41. Thus, it may be seen that the ground penetrating portion 29 is shaped to facilitate penetration of the ground. Retention of the ground penetrating portion 29 is facilitated by barbs 47 formed in the first and second walls which extend in a transverse direction across the first wall 43, and continue along the second wall 45 on both sides thereof. The barbs 47 have the cross sectional shape of an arrow pointed toward the tip 41 of the ground penetrating portion 29. As the ground penetrating portion is pushed into the ground G, the leading edges of the barbs 47 facilitate pushing the earth aside to allow the ground penetrating portion 29 to pass into the ground. However as each barb 47 passes through the earth and in its final position of penetration, earth moves behind a wide end 48 of the barb and tends to block movement of the ground penetrating portion 29 out of the ground G in the opposite direction. A similar effect occurs when the shoulders 49 of the first wall 43 immediately adjacent the foot 27 pass into the ground. Earth can cover the projecting ends 49 further to resist extraction of the ground penetrating portion 29.

Figure 5:
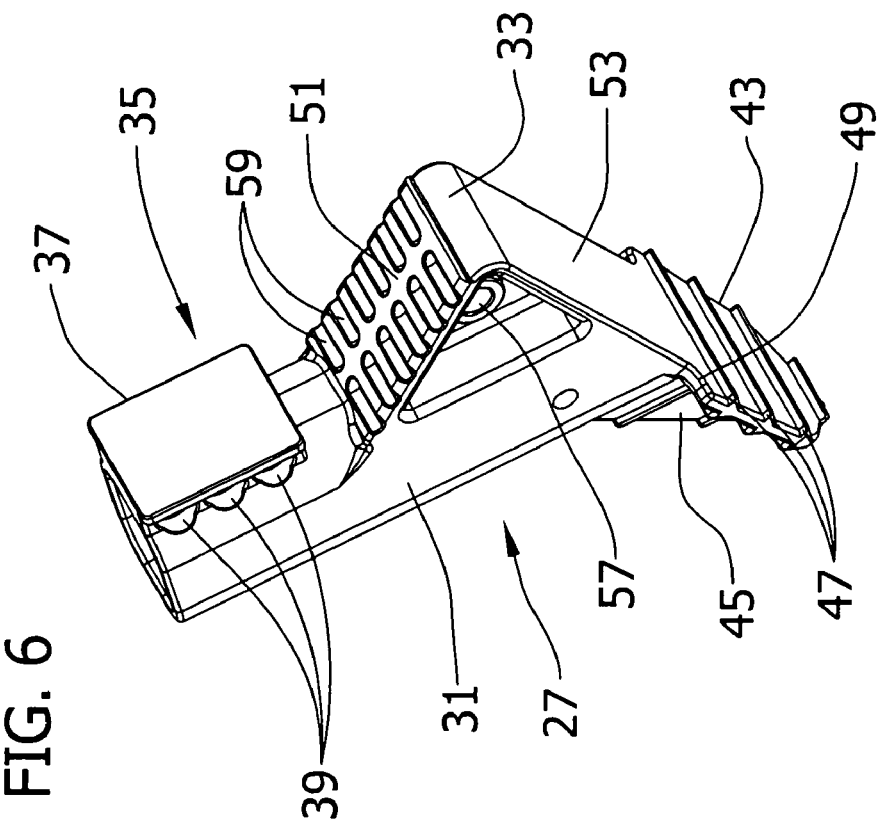
FIG. 5 is a perspective of the foot as viewed from a vantage interior of the bipod support.
Figure 6:
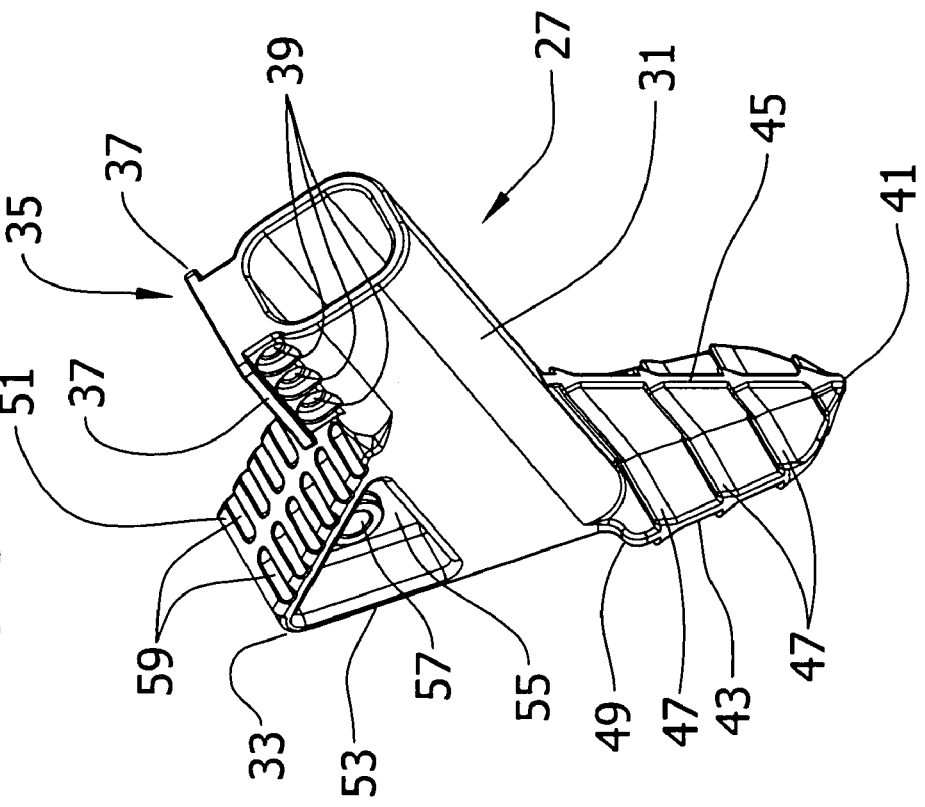
FIG. 6 is a perspective of the foot as viewed from a vantage exterior of the bipod support.

Referring to FIGS. 3, 5 and 6, it may be seen that the pedal 33 includes a foot pad 51 projecting outwardly from the sleeve 31 to an outer wall 53 extending at an angle to the foot pad and generally in plane with the first wall 43 of the ground penetrating portion 29. A bridge wall 55 extends between the sleeve 31, foot pad 51 and outer wall 53 and connects the three to form a rigid structure having a low weight and employing minimal material. A hole 57 in the bridge wall 55 can be used to connect items (not shown) to the foot 27. The foot pad 51 includes a foot engagement surface having grooves 59 to enhance traction on the surface. The angle the foot pad 51 makes with the center line C of the sleeve 31 (and hence the leg 19) is selected to that at least a substantial component of a force applied by pressing down on the foot pad 51 is directed along the first wall 43 of the ground penetrating portion 29 toward the tip 41. In a preferred embodiment, the foot pad 51 makes an angle with the center line C of the sleeve 31 which is greater than or equal to about 100°.

Modified versions of the foot 27 shown in FIG. 7, FIGS. 8-11 and FIG. 12 are designated generally at 27A, 27B and 27C, respectively. Corresponding parts of the modified feet 27A, 27B, 27C are indicated by the same reference numbers used for parts of the foot 27, but with a following alphabetic identifier. Like the version of the foot 27 shown in FIGS. 1-6 the modified versions of the foot 27A, 27B, 27C each includes a sleeve (31A, 31B) which receives a lower end portion of the leg 19. As shown in FIG. 8, a lower end 61 of the leg 19 is received almost to the bottom of the sleeve 31B and at least a portion of the ground penetrating portion 29B is directly radially opposite the leg. The foot 27B extends in an axial direction beyond the lower end 61 of the leg 19 only a very short distance. Thus, the fully retracted length of the leg 19 including the foot 27B having the projecting ground penetrating portion 29B is not substantially greater than it would be without the foot. It will be understood that as the angle of the first wall 43B of the ground penetrating portion 27B moves more toward 90° to the center line of the sleeve 31B, the axial extent of the foot 27B beyond the lower end 61 of the leg 19 is further reduced.

Figure 9:
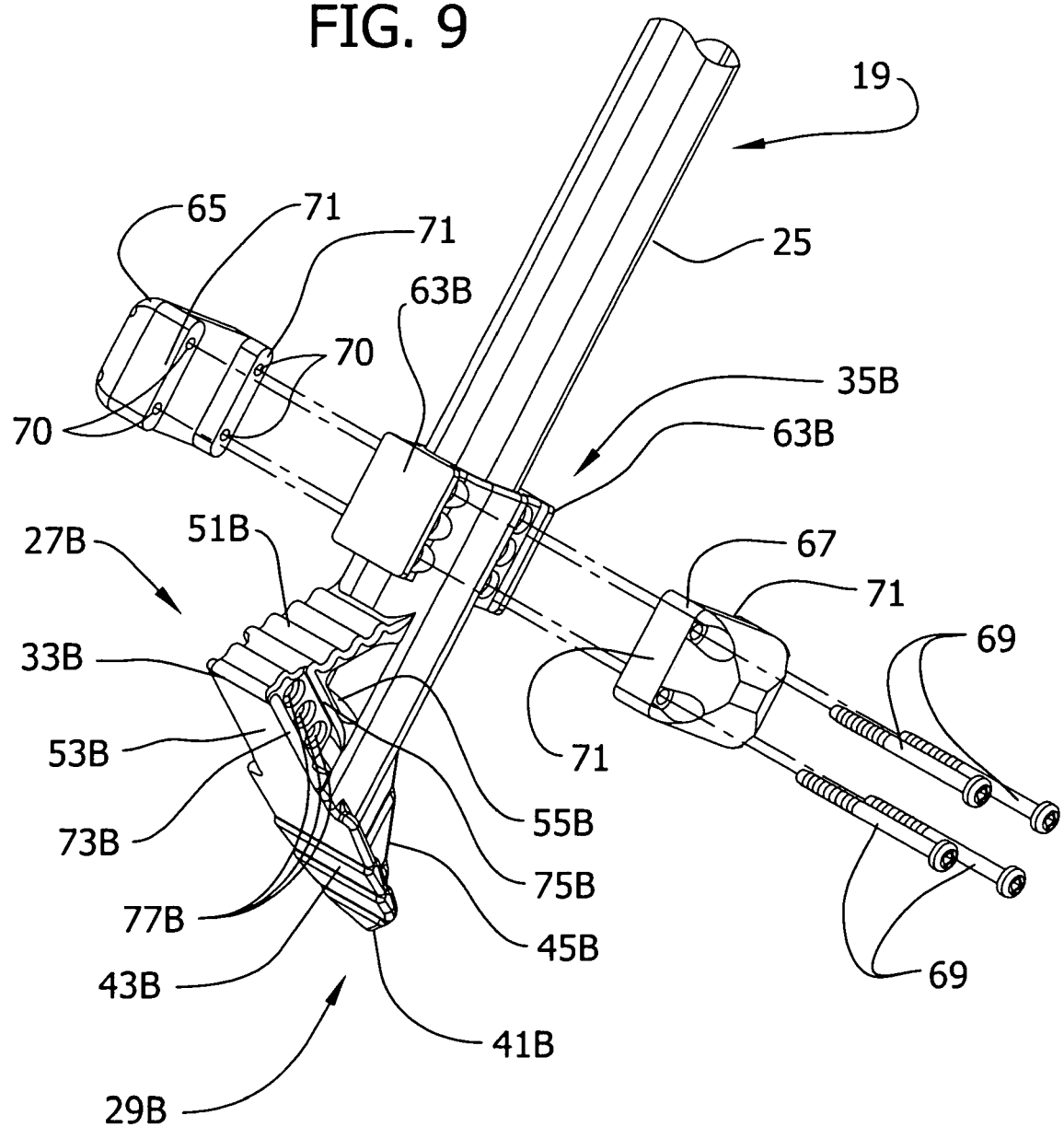
FIG. 9 is a fragmentary exterior perspective of the foot and a portion of the leg with a leg weight exploded therefrom.
Figure 10:
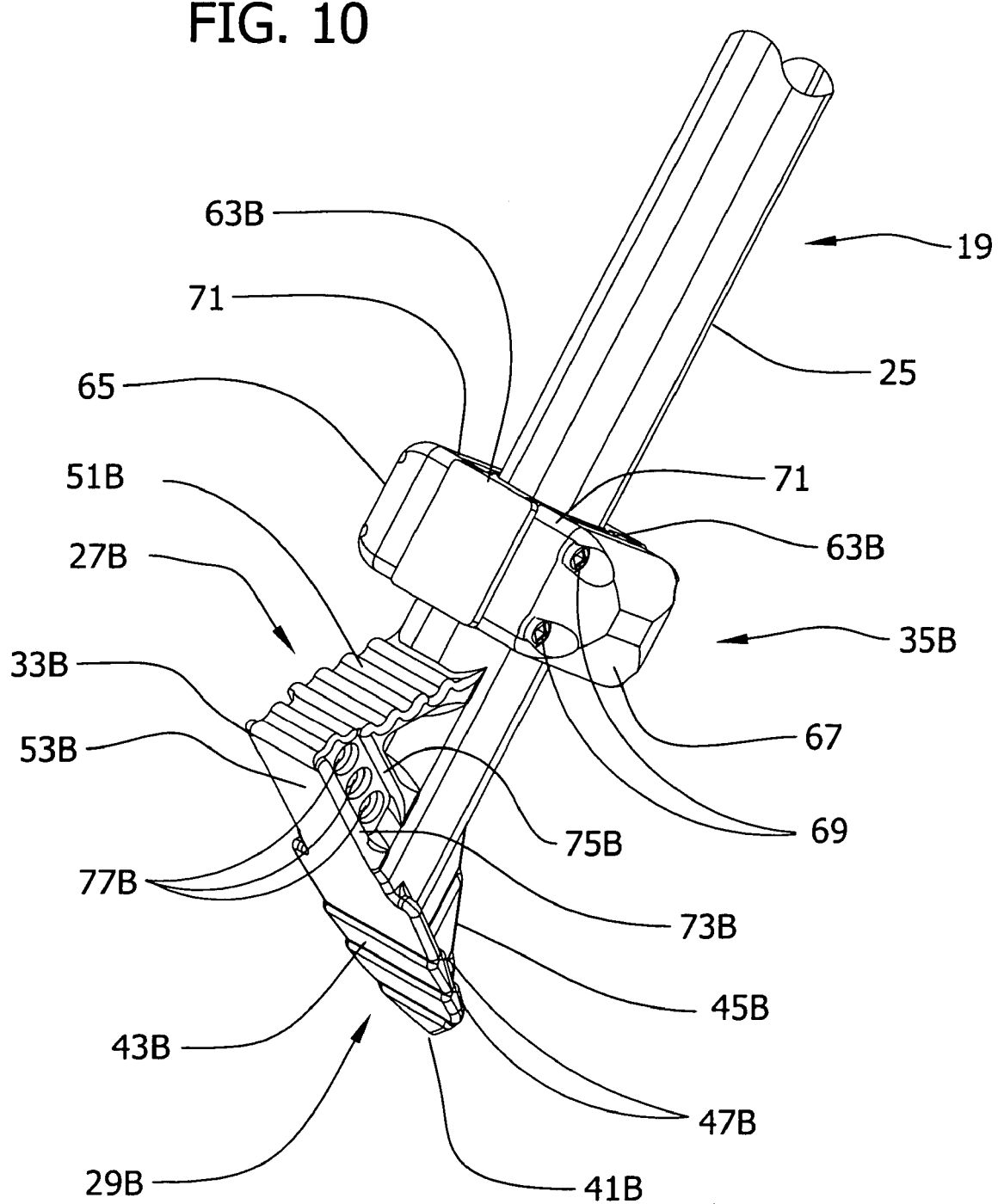
FIG. 10 is the perspective of FIG. 9 but showing the weight as connected to the foot.

Referring to FIG. 7, the ground penetrating portion 29A of the foot is modified by lengthening the barbs 47A on the first and second walls 43A, 45A so that they contact each other without intervening flat spaces present on the ground penetrating portion 29 of FIGS. 1-6. The mount 35A includes two identical undercut formations 63A on opposite, outer and inner sides of the sleeve 31A, both of which are capable of sliding, tongue in groove connection to an article (not shown). As shown in FIGS. 9 and 10, the presence of two mounting formations 63B allows one or more articles to be attached to the foot 27B by bolting on opposite sides of the foot. In the illustrated embodiment, the article is shown as a leg weight having first and second members (designated 65 and 67, respectively) capable of being attached on laterally opposite sides of the foot 27B. The second weight member 67 has four smooth holes generally in the four corners of the member which receive bolts 69 through the second weight member. The bolts 69 pass through the top and bottom holes 39B formed in the undercut portion of the mounting formations 63B and into threaded holes 70 in the second weight member 65. As the bolts 69 are tightened down, the first and second weight members 65, 67 are clamped against the mounting formations 63B (FIG. 10). The weight members 65, 67 are formed so that they receive a portion of the foot and have ridges 71 which are received in the undercut portions of the mounting formations 63B.

The version of the foot 27B shown in FIG. 9 has a foot pad 51B with an undulating (rather than grooved) foot engagement surface. Moreover, the pedal 33B is particularly formed to facilitate a tongue in groove connection of an article (not shown). The outer wall 53B of the pedal 33B is wider than the foot pad 51B defining a ridge 73B which is opposed by a ridge 75B formed in the bridge wall 55B of the foot. The ridges 73B, 75B define a groove used to mount articles on the foot 27B. The same arrangement of ridges 73B, 75B is present on the side of the foot 27B not seen in FIG. 9. The bridge wall 55B is thicker than the bridge walls 55, 55A of the FIGS. 5 and 7 embodiments, and does not entirely close off the opening between the sleeve 31B, foot pad 51B and outer wall 53B. Three holes 77B are formed in the bridge wall 55B and extend completely through the bridge wall.

Figure 11:
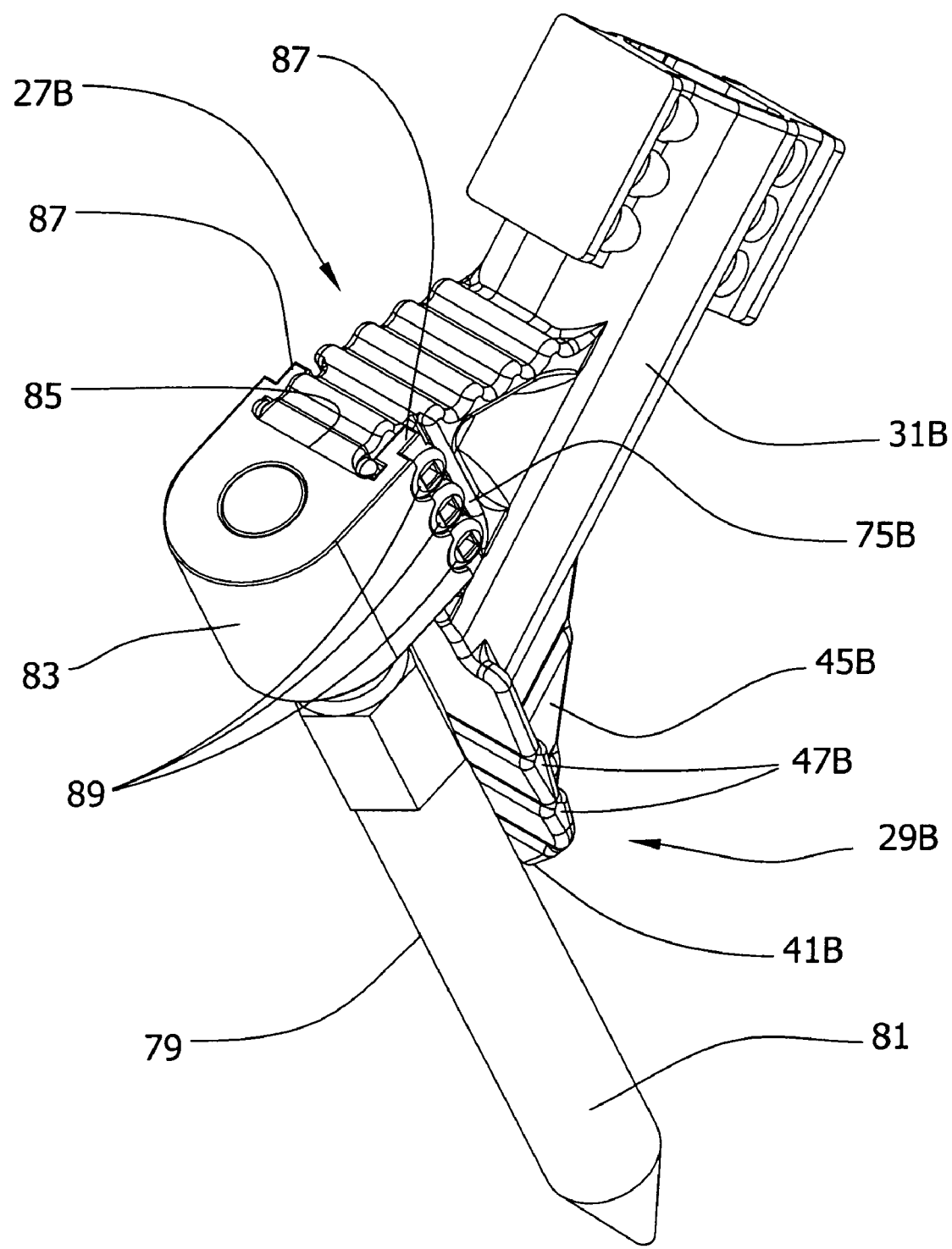
FIG. 11 is an exterior perspective of a foot having a stake attached thereto.

One example of an article which can be mounted on the foot is a stake 79 illustrated in FIG. 11. The stake 79 has a long body 81 with a pointed end projecting substantially beyond the tip 41B of the ground penetrating portion 29B of the foot 27B when ground conditions demand deeper penetration to secure the leg 19. Although the stake body 81 is shown with a conventional form, it is contemplated that the stake could be barbed and/or have a small cross section (like the T-shaped cross section of the ground penetrating portion) without departing from the scope of the present invention. A head 83 of the stake 79 is formed with a channel 85 having at its free edges opposed, inwardly projecting lips 87 which are slidingly received in the grooves defined by opposed ridges 73B, 75B of the foot 27B to connect the stake to the foot. The lips 87 have a generally "L" shape in cross section and present a flat surface to the bottom of the groove. The flat surfaces each have three holes which are in registration with the three holes 77B in the bridge wall. The number of holes may be other than three without departing form the scope of the present invention. Further connection is achieved by passing bolts 89 through the holes in the lips 87 and bridge wall 55B. The bolts 89 can be secured by nuts (not shown) or by internally threading the holes in one of the lips 87, or in another suitable manner.

Figure 12:
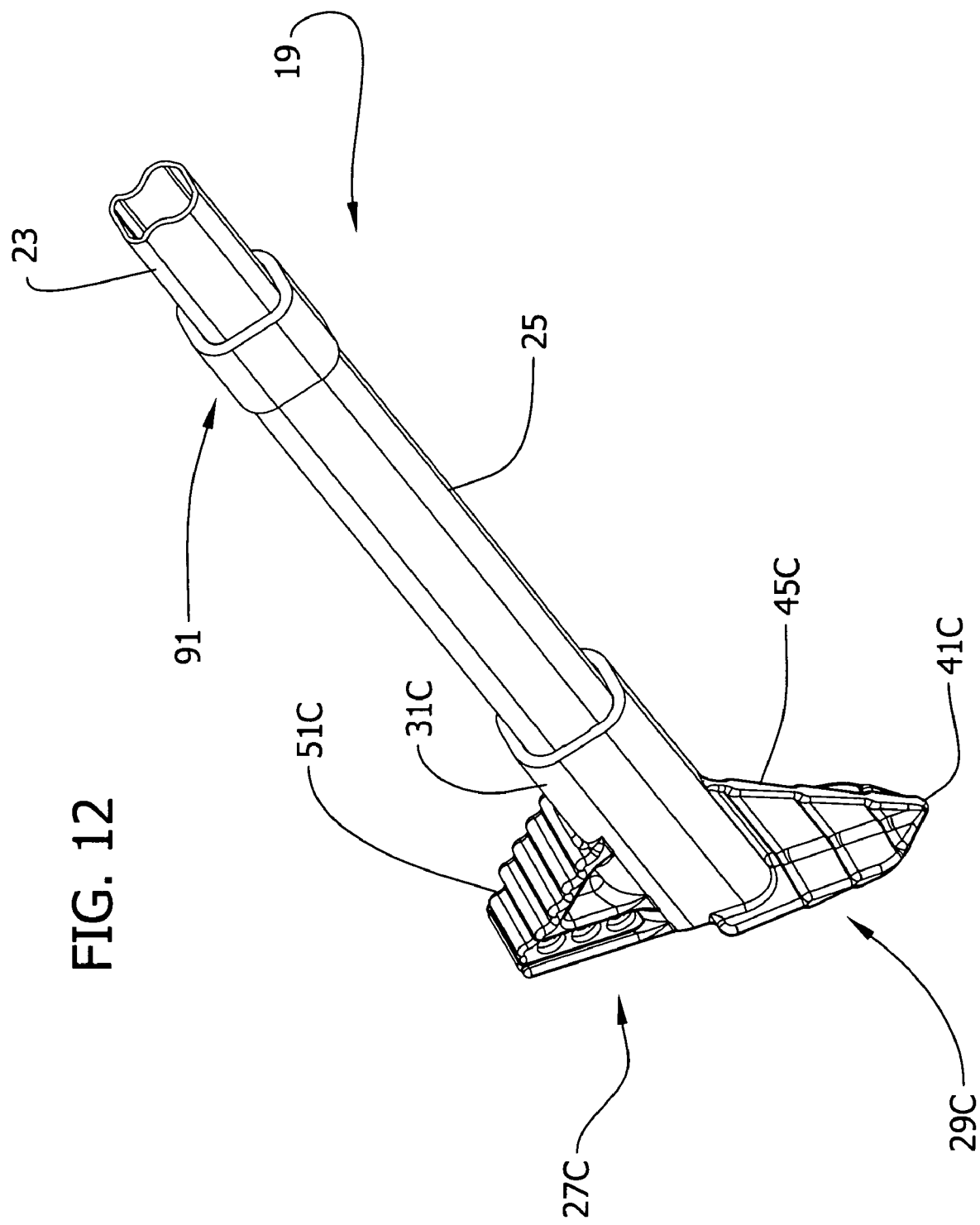
FIG. 12 is a fragmentary perspective of a bipod support leg including the foot of FIG. 11.

A modified form of the foot 27B shown in FIG. 9 is shown in FIG. 12 and indicated generally by reference character 27C. The foot 27C has a closely similar construction to the foot 27B. However, there is no mount corresponding to mount 35B of FIG. 9. The foot 27C will not be further described herein. Parts of the foot 27C corresponding to those of foot 27B will be indicated by the same reference number, but with the suffix "C".

Figure 29:
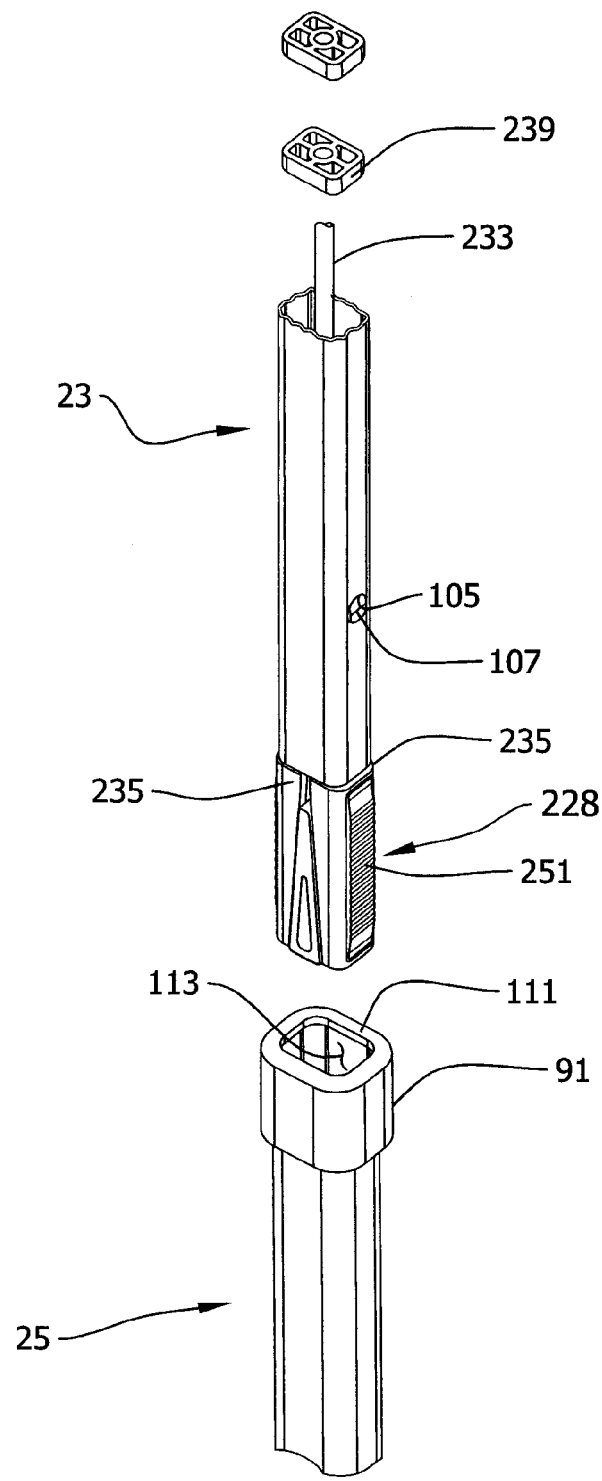
FIG. 29 is the perspective of FIG. 28 with a first leg section of the leg exploded from a second leg section.
Figure 30:
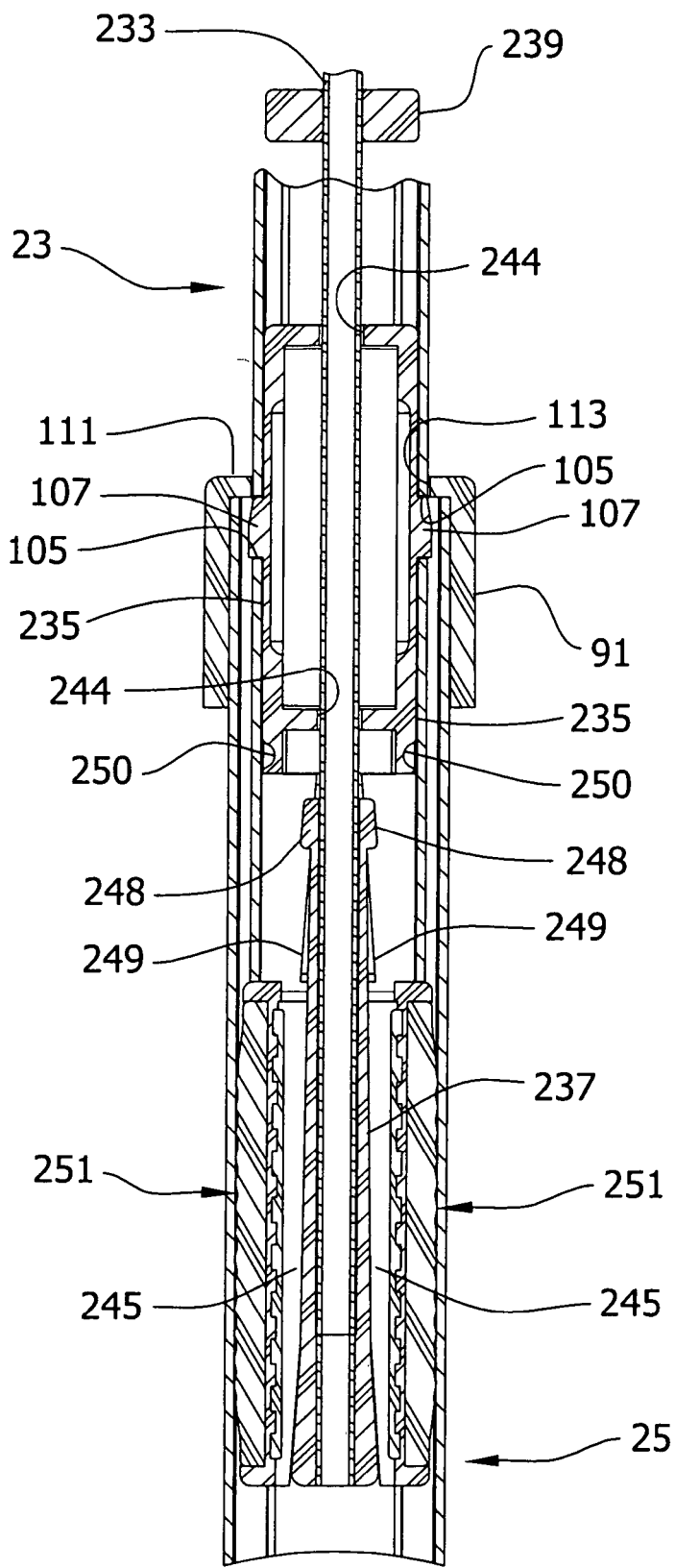
FIG. 30 is a section taken in the plane including line 30-30 of FIG. 28.
Figure 31A:
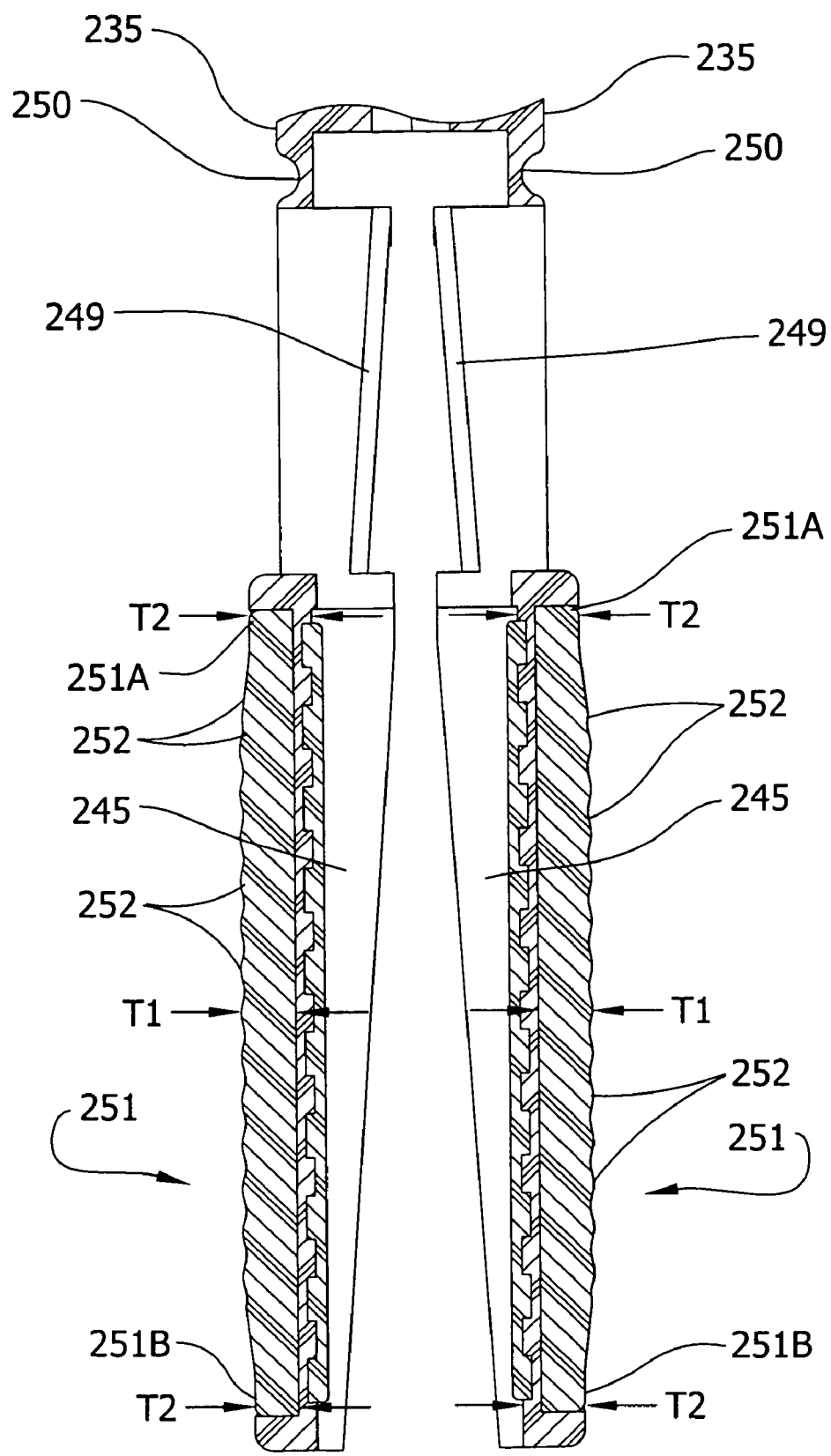
FIG. 31A is an enlarged, fragmentary vertical section of lock members and a wedge of the locking device illustrating the construction of resilient members of the locking device.

A retainer 91 located at the joint of the first and second leg sections 23, 25 releasably retains the lower end of the first leg section 23 in the second leg section 25. Although not shown, a retainer could be formed with structure for mounting accessories onto the leg 19. Referring to FIGS. 29 and 30 illustrating the leg sections 23, 25 at the joint, the leg sections are formed to be snapped together and apart as needed for cleaning, repair or replacement. For example, a second leg section (not shown) having a different foot or mounting structure could be attached to the support 1 in place of the second leg section 25. The lower part of the first leg section 23 has apertures 105 through which respective ears 107 project, extending out to the sides of the first leg section. The ears 107 are made of a resiliently deformable material. Deformation or flexing is enhanced by weakening regions around the ears 107. As shown in FIG. 31, slots 109 are formed around the ears 107 to facilitate inward flexing of the ears. In the illustrated embodiment, the ears 107 are formed as part of a locking device described below, and also function to attach the device to the first leg section 23. It is not necessary for the ears 107 to be formed as a part of another leg structure to fall within the scope of the present invention. For instance, the ears 107 could be formed as a single piece separate from the locking device.

When the first leg section 23 is telescopingly received in the second leg section 25 (as shown in FIG. 30), the ears 107 engage the inner surface of the second leg section, helping to center the first and second leg sections and helping to eliminate relative lateral movement ("slop") between the leg sections. The ears 107 are engageable with a rim 111 of the retainer 91 attached at the joint to prevent inadvertent withdrawal of the first leg section 23 from the second leg section 25. The rim 111 of the retainer 91 extends inwardly from an inner wall of the second leg section 25 forming an opening 113 which is about the same size (or only slightly larger) than the outer dimensions of the first leg section 23. Thus, because the ears 107 project outwardly from the first leg section 23, they cannot fit through the opening 113 without deforming. Alternatively, the ears 107 could be relatively rigid and the rim 111 could be deformable, or both the ears and the rim could be deformable to permit the ears to move past the rim out of the opening. FIG. 30 shows the first leg section 23 fully extended from the second leg section 25 with the ears 107 engaging the underside of the rim 111 preventing further extension of the first leg section. In normal operation of the bipod support leg 19 the first and second leg sections 23, 25 will be prevented from separating by the ears 107. Because the ears are deformable, application of sufficient force to the first and second leg sections 23, 25 in an axial direction will cause the ears 107 to resiliently deform inwardly into the second leg section 25 and allow the first leg section 23 to snap past the rim 111 and out of the second leg section 25. Reconnection of the leg sections 23, 25 can be made by applying a force to the leg sections in opposite directions so that the ears 107 deform and snap past the rim 111 in the other direction. The ears 107 return to their undeformed condition inside the second leg section 25 to again inhibit inadvertent separation.

The first and second leg sections 23, 25 are also preferably held against rotation relative to each other about the center line C of the leg 19. The first and second leg sections 23, 25 have corresponding cross sectional shapes which are not round so that relative rotation is not permitted when the leg sections are engaged with each other. Accordingly, the foot 27B is held in position with the ground penetrating portion 29B projecting inwardly. In this way, the foot 27B is prepared to be pushed into the ground G without having to manually position the foot about the axis of the leg 19. However, it is envisioned that leg sections of round cross section (not shown) could be used. In that event, the foot pad of the pedal is preferably formed substantially wider and with traction features (not shown) arranged to enhance traction both lengthwise and widthwise of the foot pad so that it is possible using one's foot to position the ground penetrating portion about the center line of the leg before pushing it into the ground G.

Another feature of the present invention can work in conjunction with the foot (27, 27A, 27B, 27C) of the present invention to increase stability of the bipod support 1. More particularly, and with reference to FIGS. 13-18, each leg 19, 21 can be locked by hinge locks (generally indicated at 115) against pivoting angularly with respect to the head 17 to prevent the leg from swinging inward if the leg momentarily loses gripping engagement with the ground G. Thus, the weight of the leg (19 or 21) is always maximally applied to resist tipping of the bipod support 1 and surveying pole 3 in a direction which would cause the leg to lift off the ground. It will be understood that this feature, while useful independently, acts beneficially in conjunction with the gripping action of the ground penetrating portion (29, 29A, 29B, 29C) of the foot (27, 27A, 27B, 27C) to resist such tipping motion.

Figure 13:
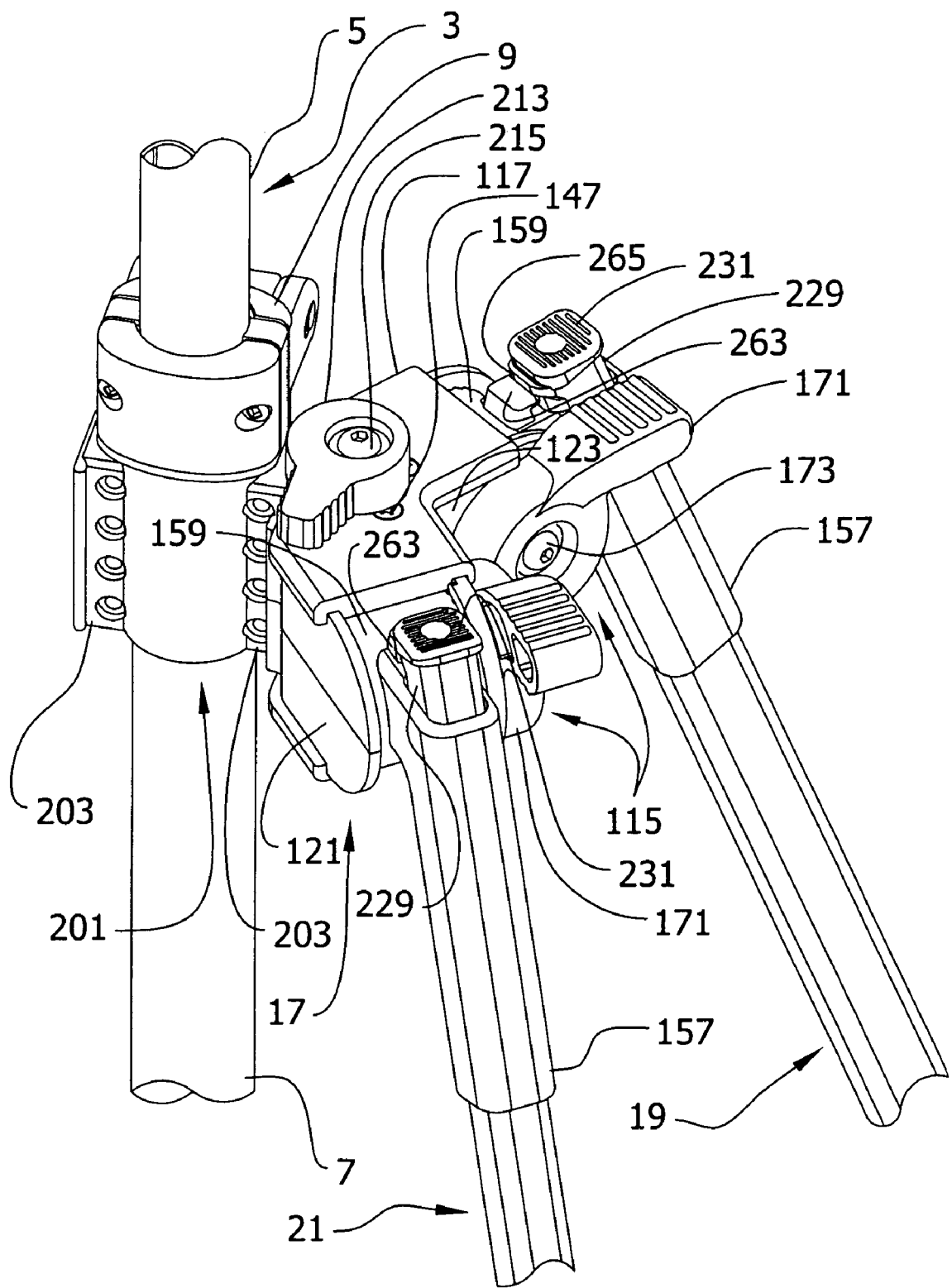
FIG. 13 is an enlarged, fragmentary perspective of the bipod support and surveying pole of FIG. 1 showing a connection of the bipod support to the surveying pole.
Figure 14:
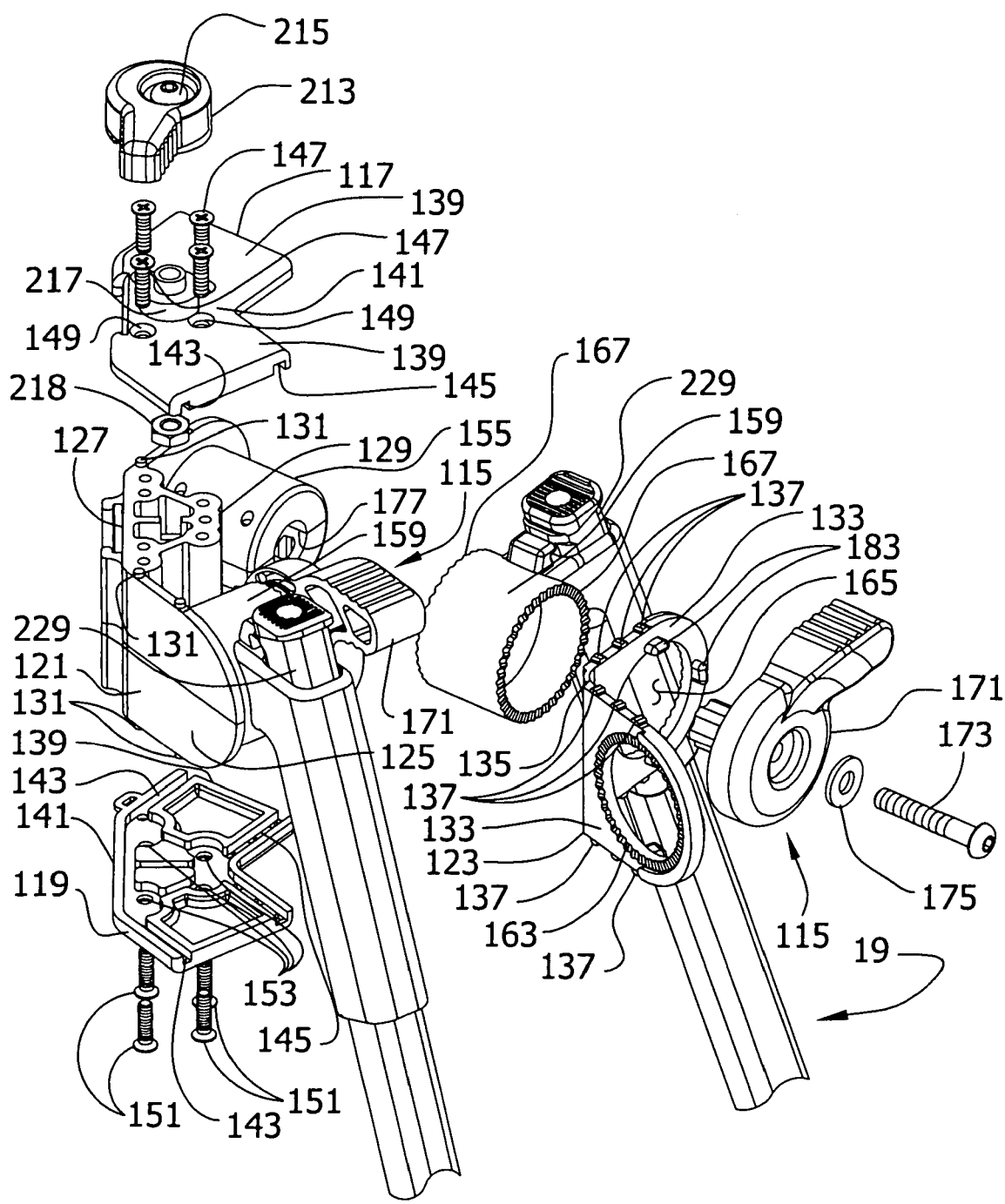
FIG. 14 is a fragmentary perspective of the bipod support showing a head of the support partially exploded.

The head 17 has one of the hinge locks 115 for each leg to lock the leg in a fixed angular position relative to the head. Referring generally to FIGS. 13 and 14, the head 17 comprises a top wall 117, a bottom wall 119, a back (or "first") wall 121 and a front (or "second") wall 123 which are connected together to form a box structure. The back wall 121 is formed by three generally planar members, including outer members 125 arranged at angles to a center member 127 for setting the angle of separation of the legs 19, 21. A roughly triangular brace 129 connected to the center member 127 strengthens the head 17 and provides a location for securing the top and bottom walls 117, 119 to the back wall 121. The outer members 125 each have tangs 131 two of which project upward from an upper edge of the member and two of which project downward from a lower edge of the member (all four of the tangs 131 of only one of the outer members may be seen in FIG. 14). The front wall 123 has two outer members 133 and a thin center member 135. The outer members 133 of the front wall 123 also have tangs 137 projecting upwardly from their upper edges and projecting downward from their lower edges. The top wall 117 and bottom wall 119 each have angled outer members 139 and a pie-shaped center member 141. The interior faces of the top and bottom walls 117, 119 are formed with channels 143 along their inner edges and channels 145 along their outer edges which receive and retain the tangs 131 of the back wall 121 and tangs 137 of the front wall 123, respectively. The top wall 117, bottom wall 119, back wall 121 and front wall 123 are secured together by three screws 147 which are received through holes 149 in the top wall into threaded holes in the top of the brace 129, and by three screws 151 received through holes 153 in the bottom wall into threaded holes (not shown) in the bottom of the brace. As connected together, the walls 117, 119, 121 and 123 form a box giving the head 17 strength.

A large diameter hinge pin 155 projects forward from each of the outer members 125 of the back wall 121. The hinge pin 155 provides a relatively large cylindrical surface on which the leg 19 may pivot. For example the diameter of the hinge pin 155 may be 1½ inches and the length of the hinge pin may be 1⅞ inches. A cap 157 mounted on an upper end of the head 17 of each leg 19, 21 is joined to a tubular sleeve 159 sized to slide onto the hinge pin 155 in close fitting relation. The tubular sleeves 159 (and hence the legs 19, 21) are capable of free pivoting motion on their respective hinge pins 155. The sleeves 159 are retained on the hinge pins 155 by the back wall 121 and the front wall 123 of the head 17.

Figure 15:
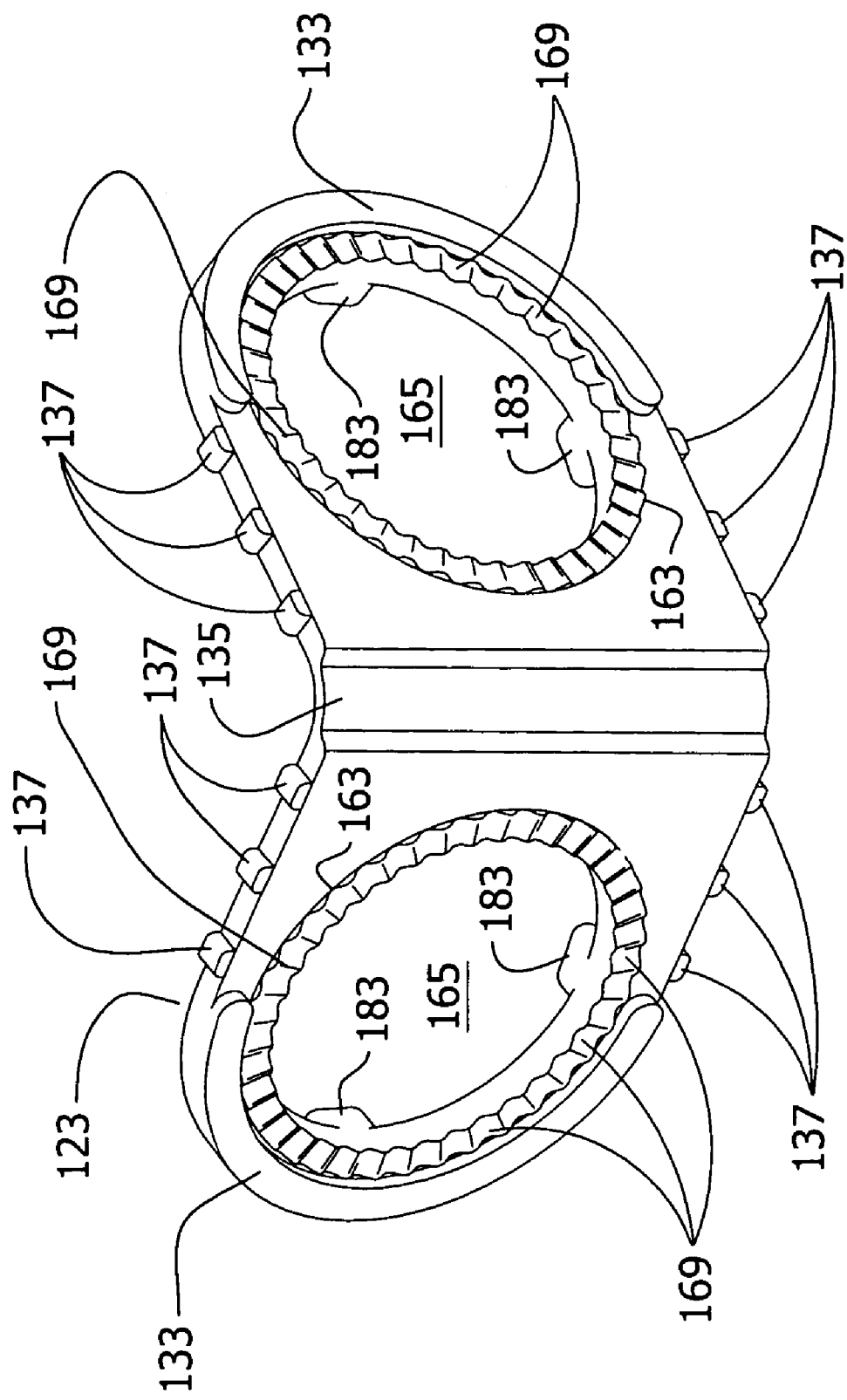
FIG. 15 is an enlarged perspective of a front wall of the head showing an inner surface thereof.

Referring particularly to FIG. 14, the hinge lock 115 includes first detents associated with the head 17 and second detents associated with the leg (19 or 21). Only one of the hinge locks 115 of the bipod support 1 will be described, the other being identical. The first detents comprise a set of detents 163 formed on the interior surface of the outer member 133 of the front wall 123 and extending around an opening 165 in the front wall (FIG. 15). The second detents include a set of detents 167 on each of the axially facing ends of the sleeve 159. The detents in each of the sets 163, 167 are in the form of ridges 169 (see FIG. 15) extending generally radially of the pivot axis of the leg 19. The ridges 169 are spaced apart a distance slightly more than the width of each ridge so that a ridge of one set of detents 163, 167 may fit between adjacent ridges of another set. Collectively, the ridges 169 give each of the detent sets a serrated appearance. The set 167 of second detents on one side of the sleeve 159 opposes the back wall 121 of the head 17, and the set 167 of second detents on the opposite end of the sleeve opposes the set 163 of first detents on the front wall 123. The opposing sets of detents (167 and 163) can be brought into engagement so that the detents mesh with each other, preventing rotation of the sleeve 159 relative to the back and front walls 121, 123 of the head 17 and locking the leg 19 in place.

Figure 18:
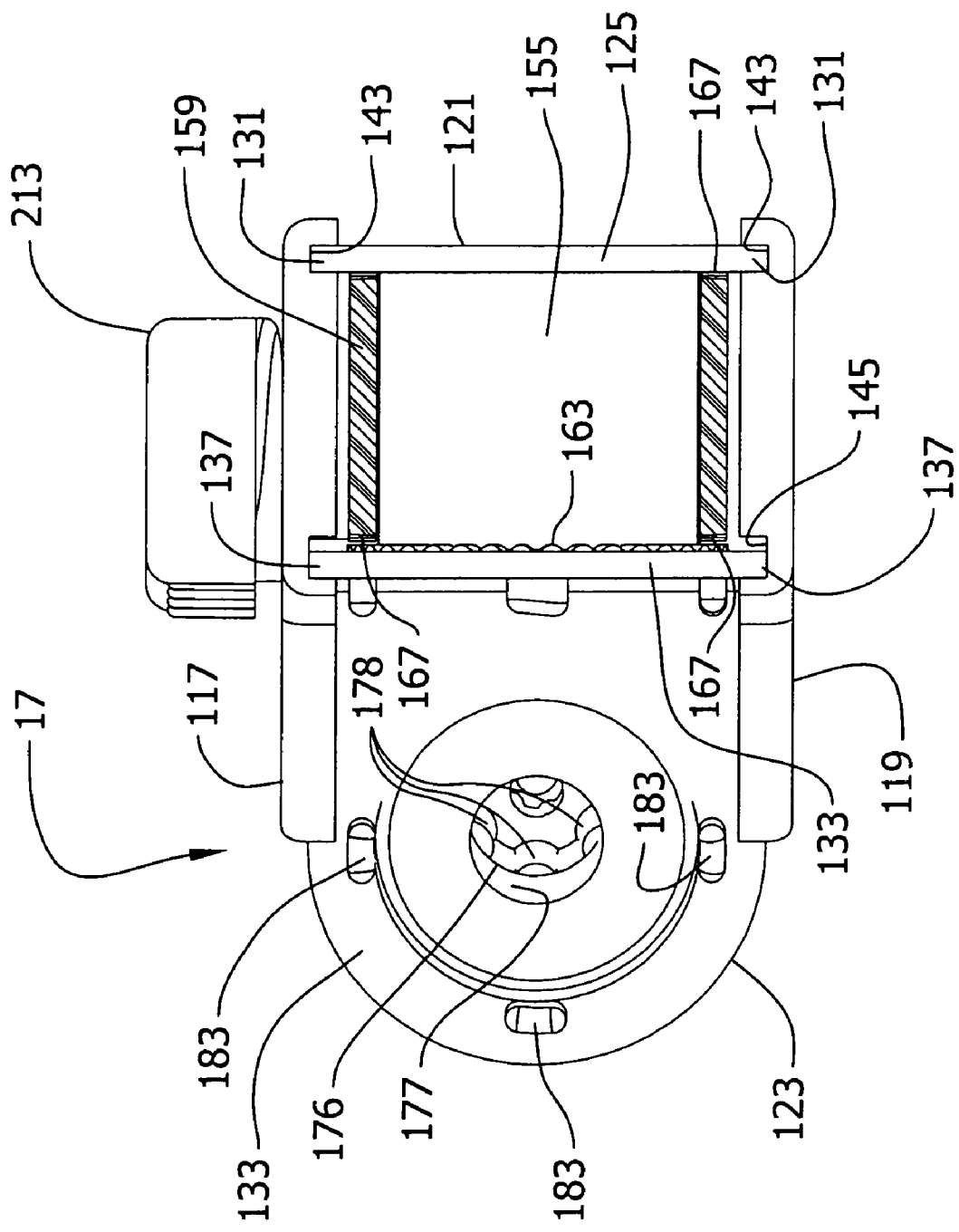
FIG. 18 is an elevation of the head with the rotary actuators removed and showing a fragmentary portion of one leg as received in the head for hinged connection therein.

Meshing and releasing of the detents 169 is permitted because the front wall 123 is capable of moving to change the distance between the opposing outer members 125, 133 of the back and front walls 121, 123. FIG. 18 illustrates the head 17 and a sectioned portion of the sleeve 159 received on the hinge pin 155. The width of the back wall tang 131 received in the channels 143 of the top and bottom walls 117, 119 is substantially identical to the width of the channels so that the back wall 121 is held against movement toward or away from the front wall 123. However, the tangs 137 of the front wall 123 and the front wall itself are thinner than the width of the channels 145 in the top and bottom walls 117, 119 receiving those tangs. As a result, the front wall 123 may move toward and away from the back wall 121. Movement of the outer member 133 of the front wall 123 away from the outer member 125 of the back wall 121 causes the opposing sets of detents (167 and 163) to release from each other, permitting the leg 19 to pivot freely on the hinge pin 155. This is the position illustrated in FIG. 18. Movement of the outer member 133 of the front wall 123 toward the outer member 125 of the back wall 121 meshes the opposing detent sets, locking the leg 19 in a selected angular position.

Figure 17A:
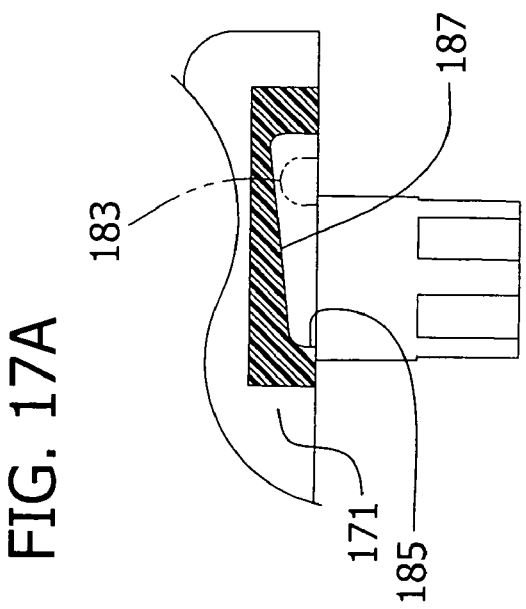
FIG. 17A is a fragmentary side elevation of the rotary actuator with a portion broken away to show a ramp at the bottom of a slot on the underside of the rotary actuator.
Figure 17:
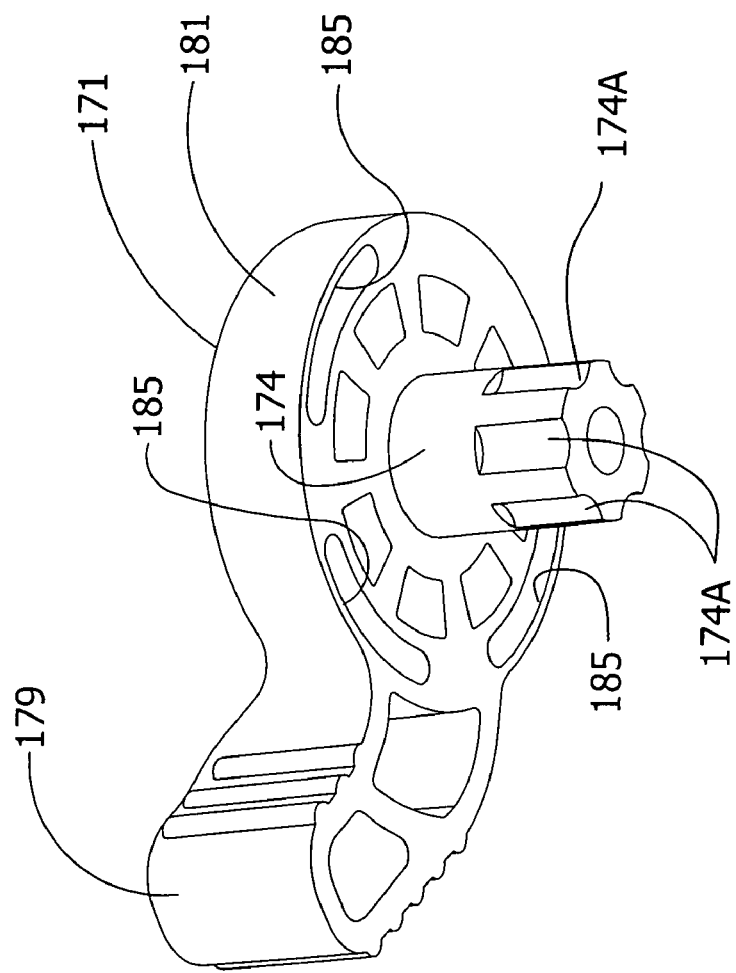
FIG. 17 is an enlarged perspective of a rotary actuator of the head.

To selectively mesh and release the opposing sets of detents, a handle 171 (broadly, "actuator") is provided which is mounted on an end of the hinge pin 155 by a screw 173 and washer 175 for rotation about the pivot axis of the leg 19. As shown in FIG. 17, the handle 171 further includes a tubular spindle 174 having axially extending channels 174A on its exterior surface. The spindle 174 is received through the front wall opening 165 into an axial passage 177 of the hinge pin 155 and into a bearing 176 (see FIG. 18) rotatably mounted inside the axial opening 177. The bearing 176 has axially extending bungs 178 which are received in the channels 174A of the spindle 174 and have a releasable, interference fit with the spindle so that the bearing turns with the spindle. The screw 173 passes through the front wall opening 165, out of the spindle 174, through the bearing 178 into a threaded hole (not shown) at a closed end of the axial passage 177 opposite the open end. A finger grip 179 extending outwardly from a round central portion 181 of the handle 171 facilitates gripping the handle to turn it (FIG. 17).

Referring to FIG. 16, the front wall 123 is formed with tabs 183. Three tabs are spaced around each of the openings 165 in the front wall 123 and project forward from the front wall. The tabs 183 are received in respective arcuate slots 185 on the underside of the handle 171 (see FIG. 17). The bottom of the slots 185 are formed as arcuate ramps 187, as may be seen in FIG. 17A. Thus, the slots 185 are shallower at one end and deeper at the opposite end. As mounted on the hinge pin 155, the tabs 183 engage and ride on the arcuate ramps 187 in the slots 185 of the handle 171. One of the tabs 183 as received in the slot into engagement with the ramp 187 is illustrated in phantom in FIG. 17A. In the position of the handle 171 shown in FIGS. 13 and 14, the tabs 183 are in the deepest part of the slots 185. In this position, the front wall 123 is allowed to move away from the back wall 121 releasing the opposing detents (167 and 163) from their meshing engagement. Thus, the locking device is unlocked and the leg 19 may be pivoted freely. Turning the finger grip 179 of the handle 171 downward, causes the tabs 183 to slide up the arcuate ramp 187 to a shallow portion of the slot. The handle 171 is fixed by the screw 173 from movement along the pivot axis of the leg 19 toward or away from the back wall 121, so the outer member 133 of the front wall 123 is pushed toward the outer member 125 of the back wall, enmeshing the opposing sets of detents (167 and 163). Thus, it may be seen that the legs 19, 21 are locked and unlocked with a small turn of the handle 171. Other constructions for producing movement of the front wall 123 may be employed without departing from the scope of the present invention. For instance, a handle and front wall may be formed with interengaging ramps (not shown).

Figure 19:
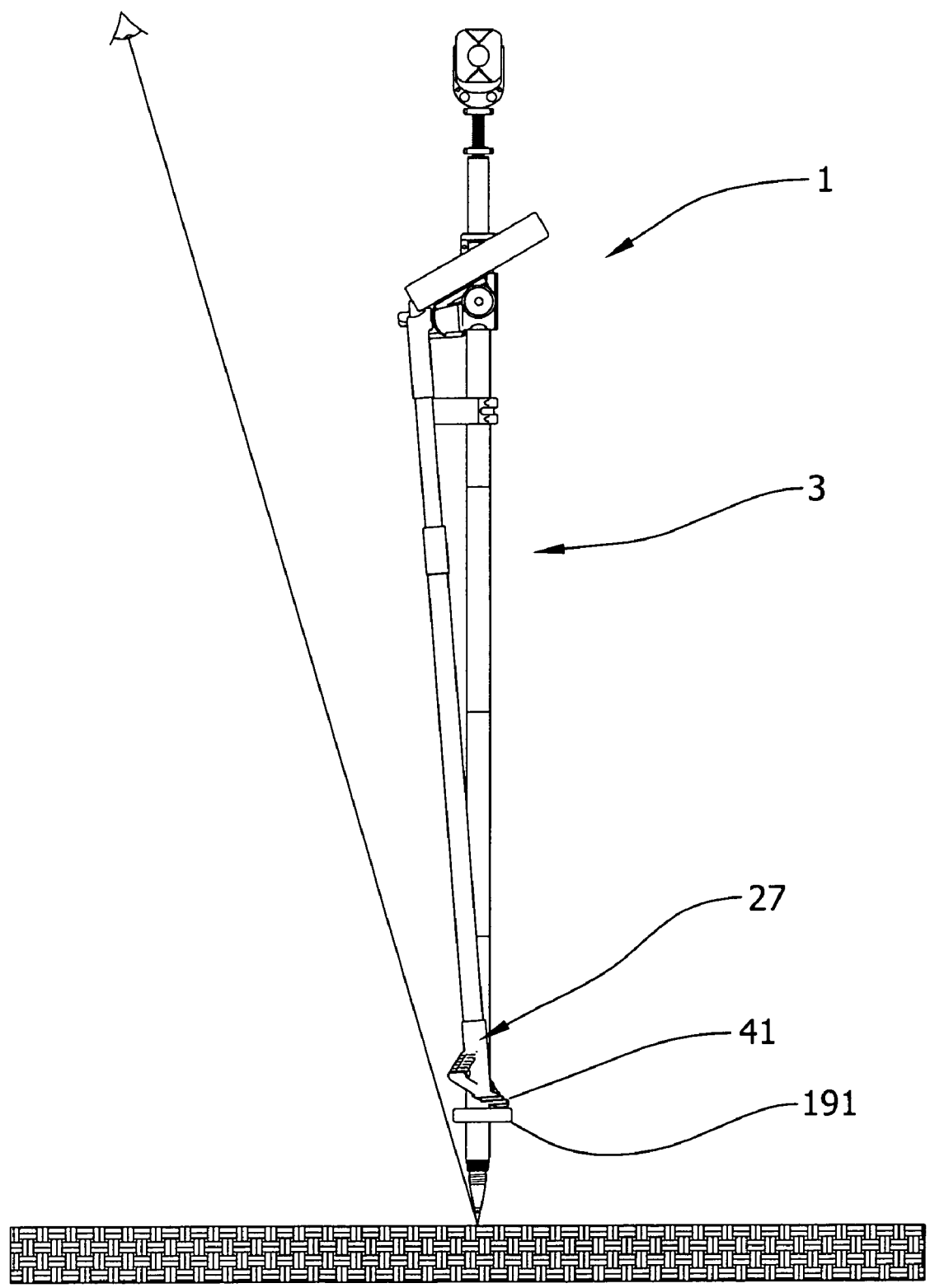
FIG. 19 is an elevation of the bipod support and a surveying pole in a collapsed position and illustrating a line of sight to a bottom point of the surveying pole.
Figure 20:
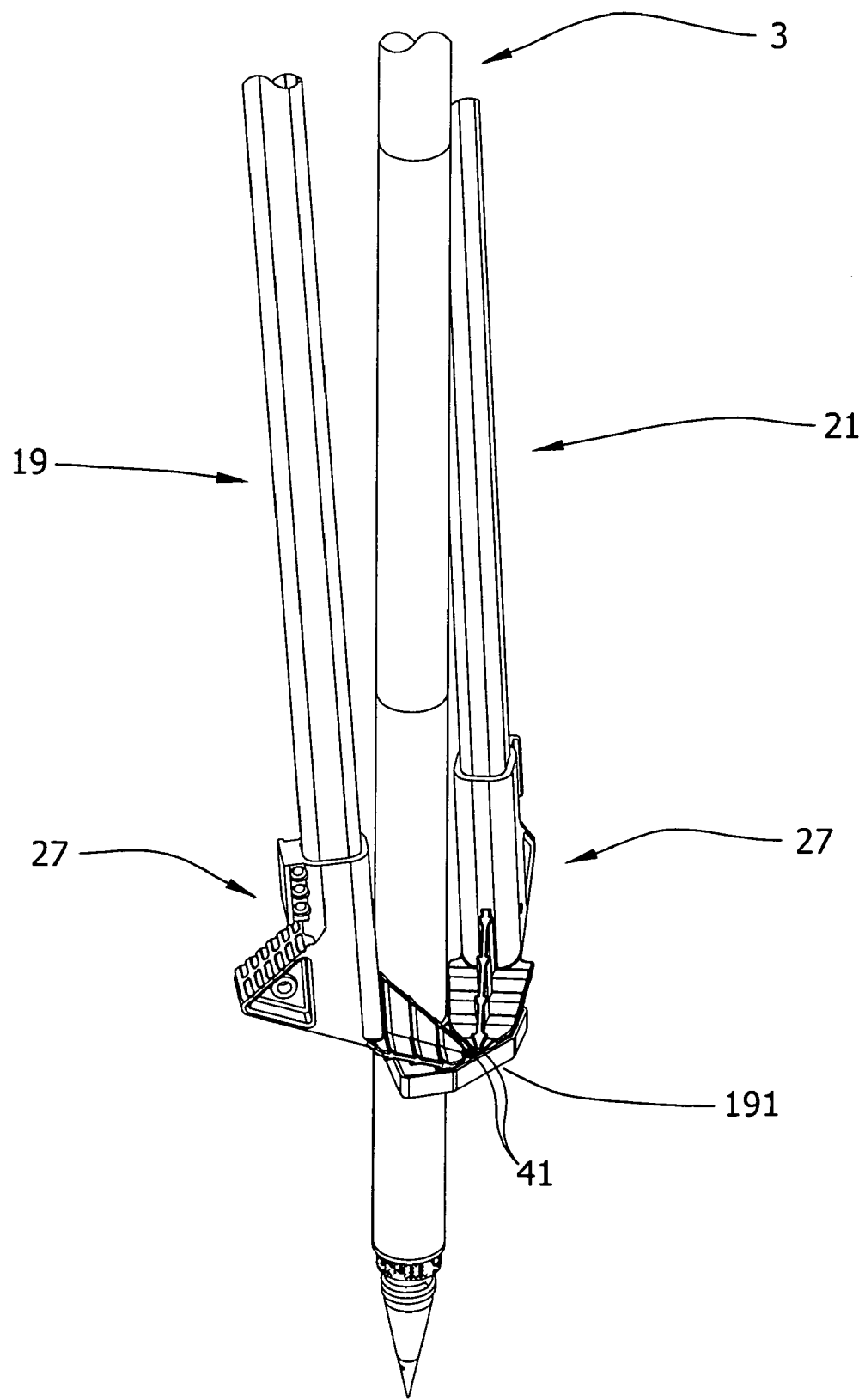
FIG. 20 is an enlarged, fragmentary perspective of the support and pole of FIG. 19.
Figure 21:
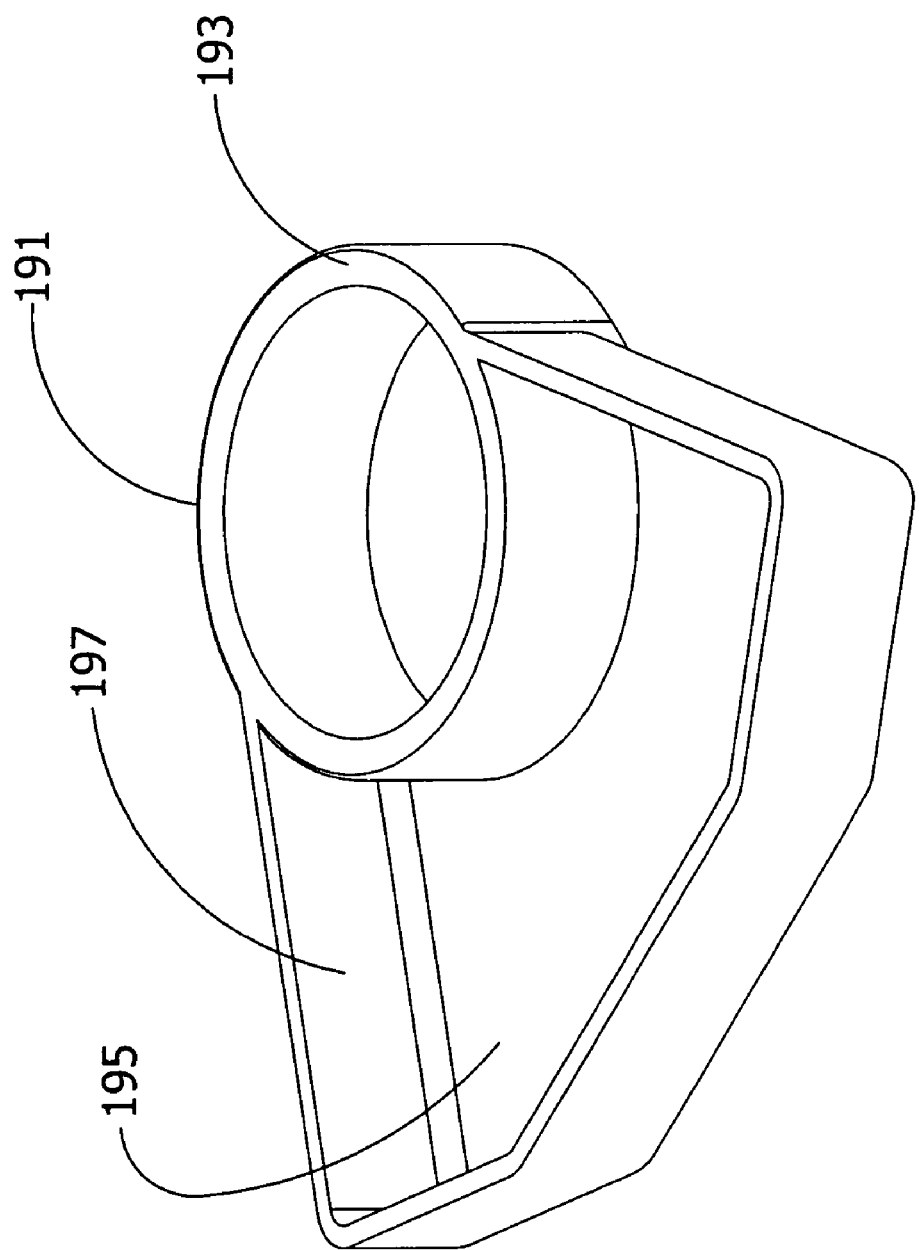
FIG. 21 is a further enlarged perspective of a leg retainer of the surveying pole.

Use of the bipod support 1 as attached to the surveying pole 3 is further facilitated by a leg retainer 191 mounted on the lower pole section 7 of the surveying pole, as illustrated in FIGS. 19-21. The leg retainer 191 comprises a ring 193 which is capable of being attached to the surveying pole 3 such as by gluing, or in a less permanent fashion. A shelf 195 projecting outwardly from the ring 193 is enclosed by the ring and a retaining wall 197 extending around the peripheral edge of the shelf and projecting upwardly therefrom. The leg retainer 191 is mounted on the pole 3 so that the shelf 195 extends outwardly from the pole on the opposite side of the pole from the head 17 of the bipod support 1. In a stowed position of the bipod legs 19, 21, the legs are retracted and the tips 41 of the ground penetrating portions 29 are received on the shelf 195 within the retaining wall 197 so that the feet 27 are held in place by the leg retainer 191. To place the tip 41 of the ground penetrating portion 29 of one leg (e.g., leg 19), the leg is first retracted to a length where the tip is higher than the retaining wall 197 of the leg retainer 191. The leg 19 is pivoted so that the tip 41 is over the shelf 195, and the leg is extended to bring the tip into engagement with the shelf within the retaining wall 197. The other leg 21 is stowed in the same way. The head 17 is preferably made of a resilient polymeric material. The position of the legs 19, 21 as stowed departs somewhat from the pivot path of the legs allowed by the hinge pin 155. Accordingly, the head 17 and/or legs 19, 21 are slightly resiliently deflected in the stowed position. In another version of the bipod support (not shown), the leg retainer 191 is omitted and the legs 19, 21 are retained in a stowed position (substantially as shown in FIG. 19) by locking the hinge locks 115 of each leg.

Figure 35:
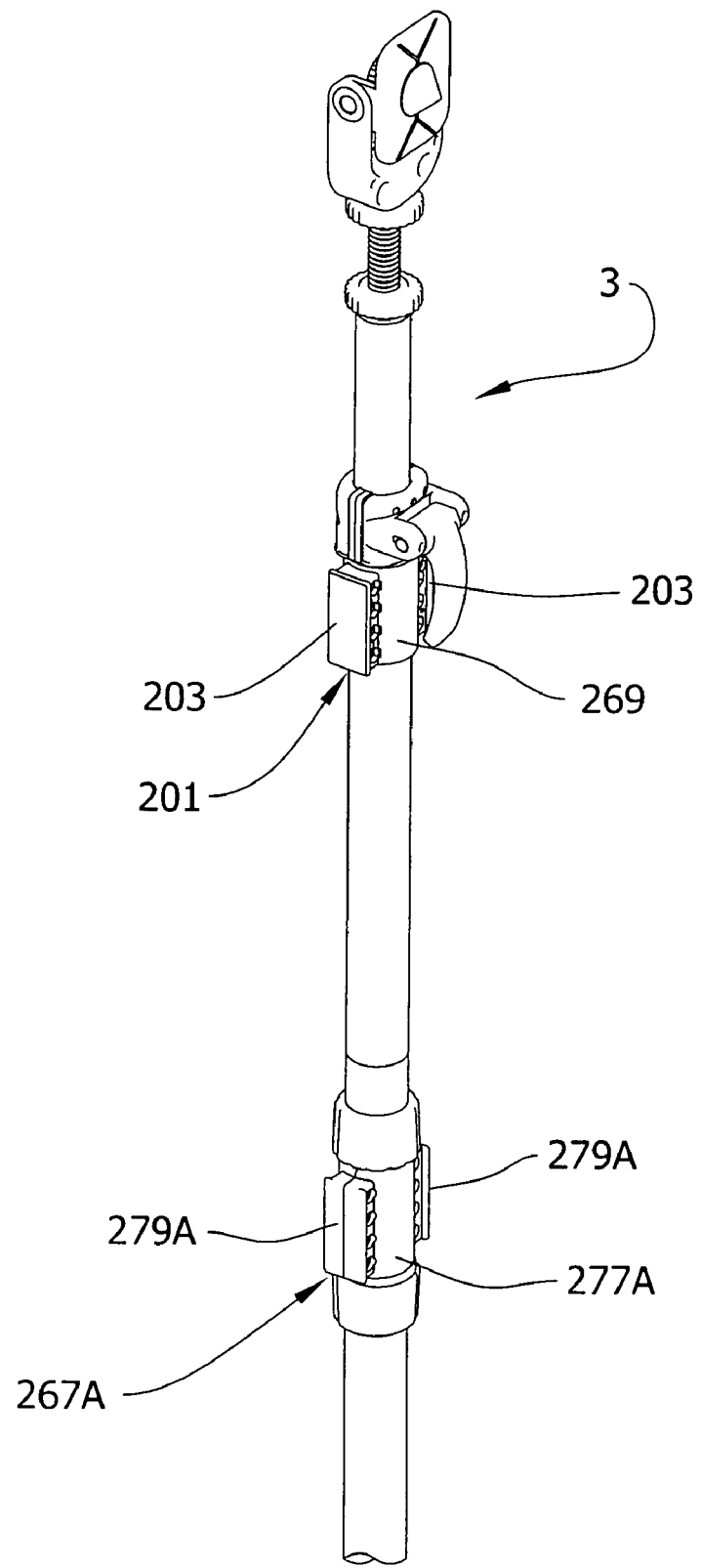
FIG. 35 is a fragmentary perspective of a surveying pole having a modular mounting system of the present invention.

The bipod support 1 is constructed for quick attachment and release from the surveying pole 3. Referring to FIG. 13, the surveying pole 3 is equipped with a mount, generally indicated at 201, affixed to the pole at the upper end of the lower pole section 7. The mount 201 includes two identical undercut formations 203 on opposite, outer and inner sides of the mount. The formations 203 are both capable of sliding, tongue in groove connection to an item, such as the bipod support 1. The mount 201 will be more fully described hereinafter. Reference is made to FIG. 35, showing the mount 201 on a surveying pole 3 on a larger scale.

Figure 22:
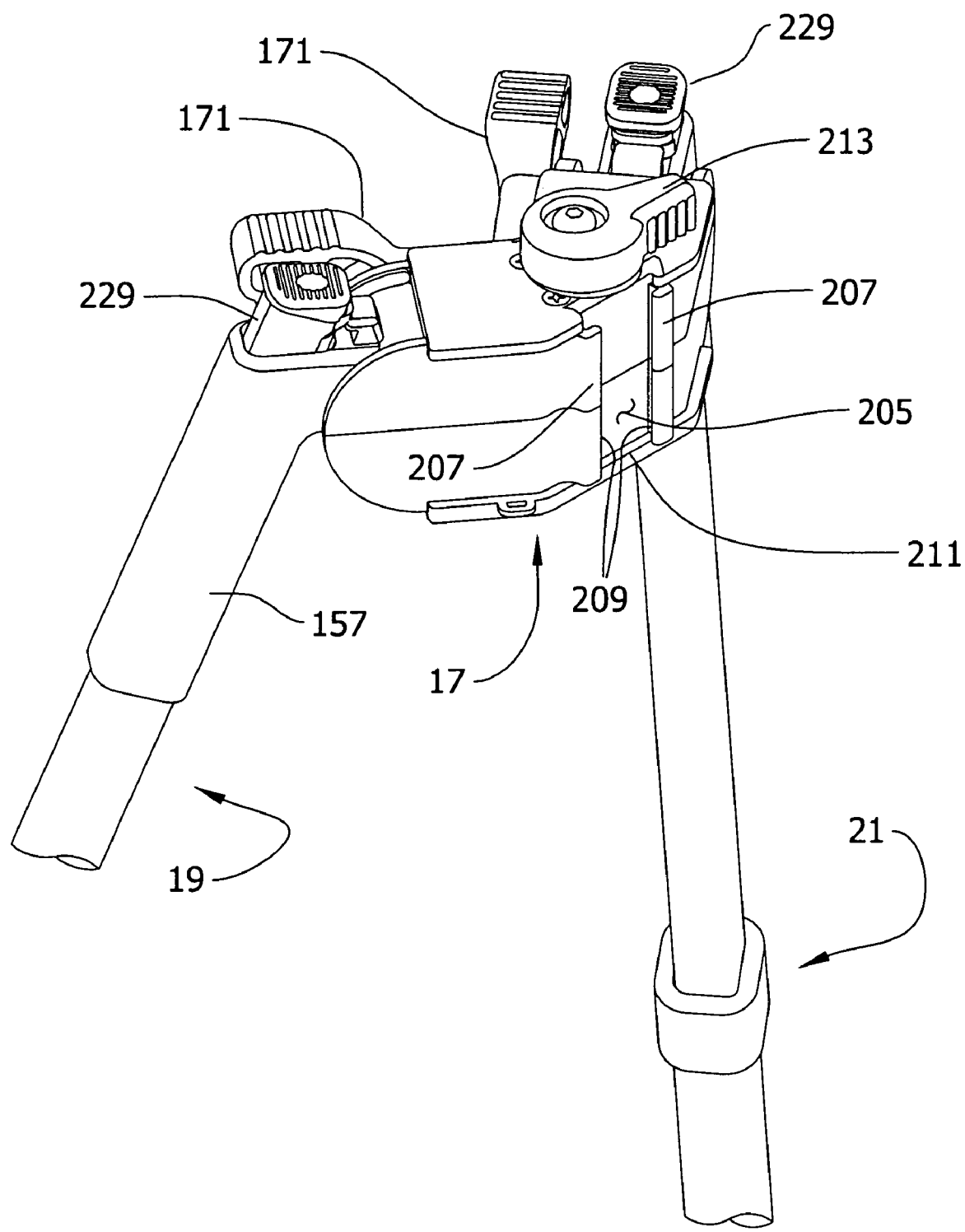
FIG. 22 is a fragmentary perspective of an upper end of the bipod support from a vantage above the support.
Figure 23:
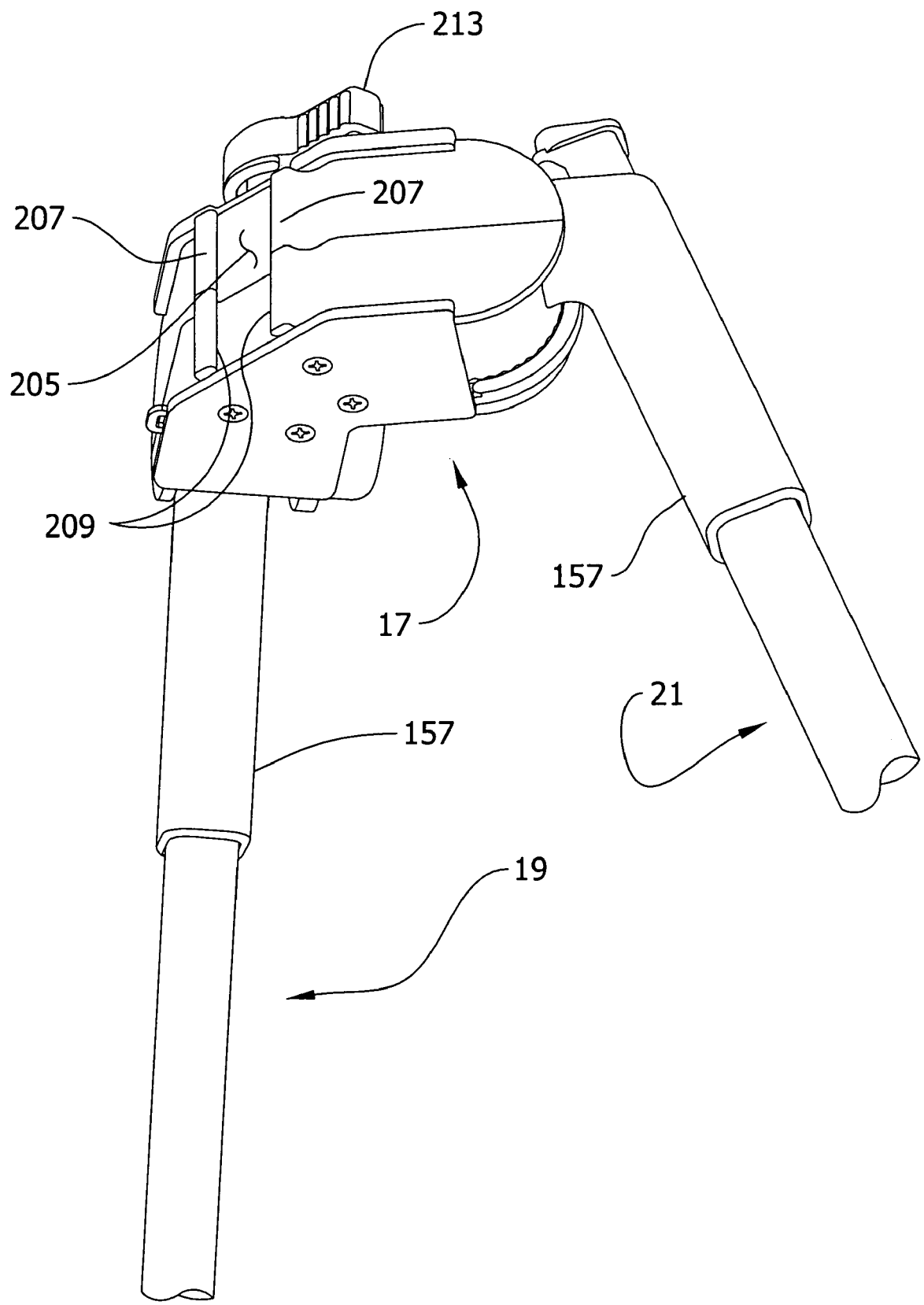
FIG. 23 is a fragmentary perspective of an upper end of the bipod support from a vantage below the support.

The head 17 of the bipod support 1 has a channel 205 defined by opposite, vertically extending walls 207 having lips 209 projecting toward each other over the channel (see FIGS. 22 and 23). The upper end of the channel 205 is open, but an end wall 211 constituting an extension of the bottom wall 119 of the head 17 closes the lower end of the channel. The bipod support 1 is attached to the surveying pole 3 by aligning the grooves on the mounting formation 203 with the lips 209 on the channel walls 207 of the head 17 and sliding the mounting formation down into the channel 205 until the mounting formation engages the end wall 211 closing the lower end of the channel. The mounting formation 203 is restrained from moving out of the channel 205 by a gate knob 213 rotatable about a vertical axis to frictionally engage the upper mounting formation to hold it in place relative to the head 17, and to move away from the channel to permit the mounting formation to be removed from or inserted into the channel. The gate knob 213 is mounted for rotation by a bolt 215 received in a circular base 217 on the top wall 117 of the head 17 (FIG. 14). The bolt 215 is threaded into a nut 218 on the underside of the top wall 117 so that the gate knob 213 may rotate relative to the head 17. Other devices to hold the head 17 on the surveying pole 3 (not shown) are contemplated. For instance, a lever to actuate the gate knob could be located remotely from the knob, or the knob could also hook the mounting formation in the fashion of a window lock.

Figure 24:
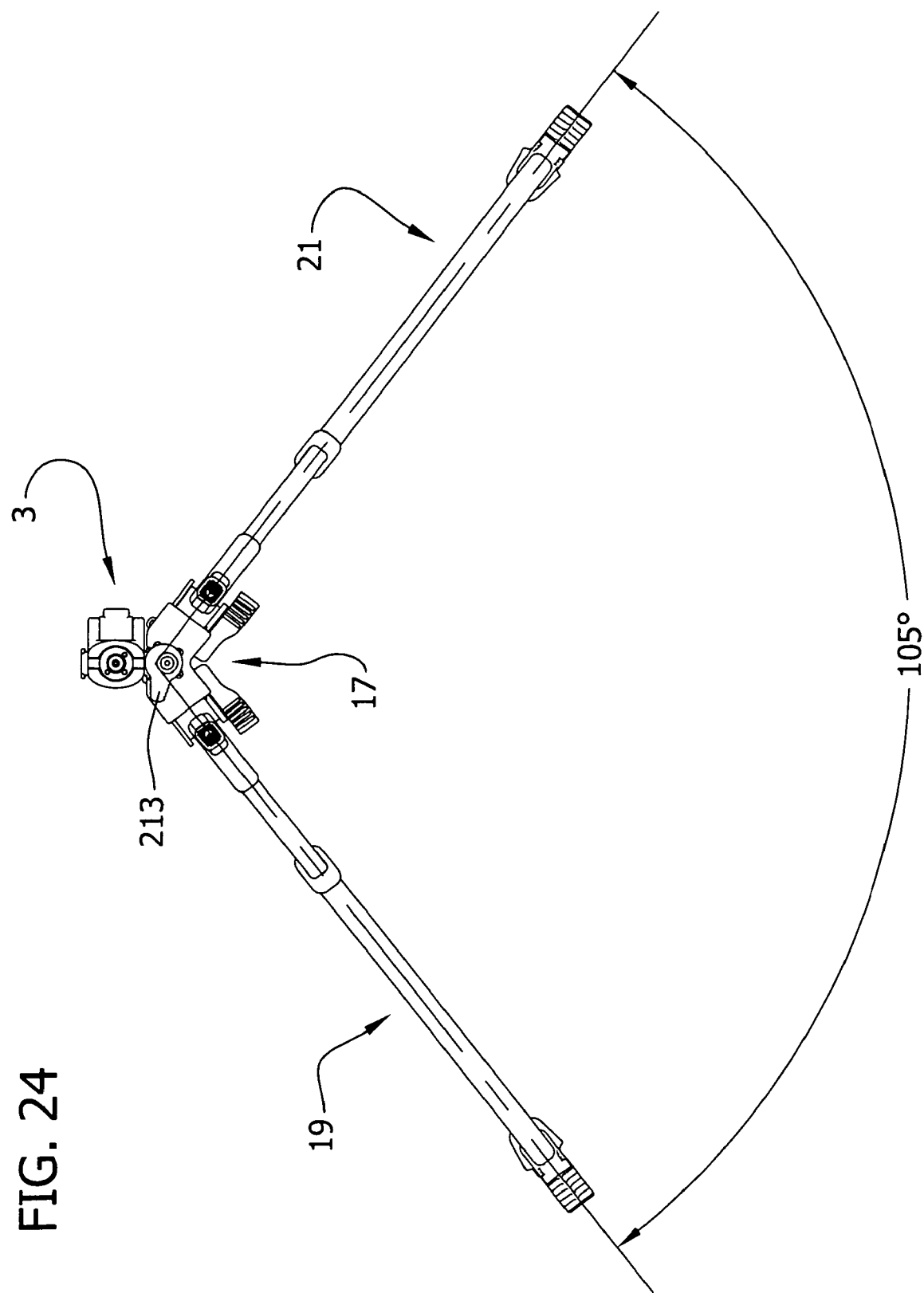
FIG. 24 is a top plan view of the bipod support and a surveying pole.
Figure 25:
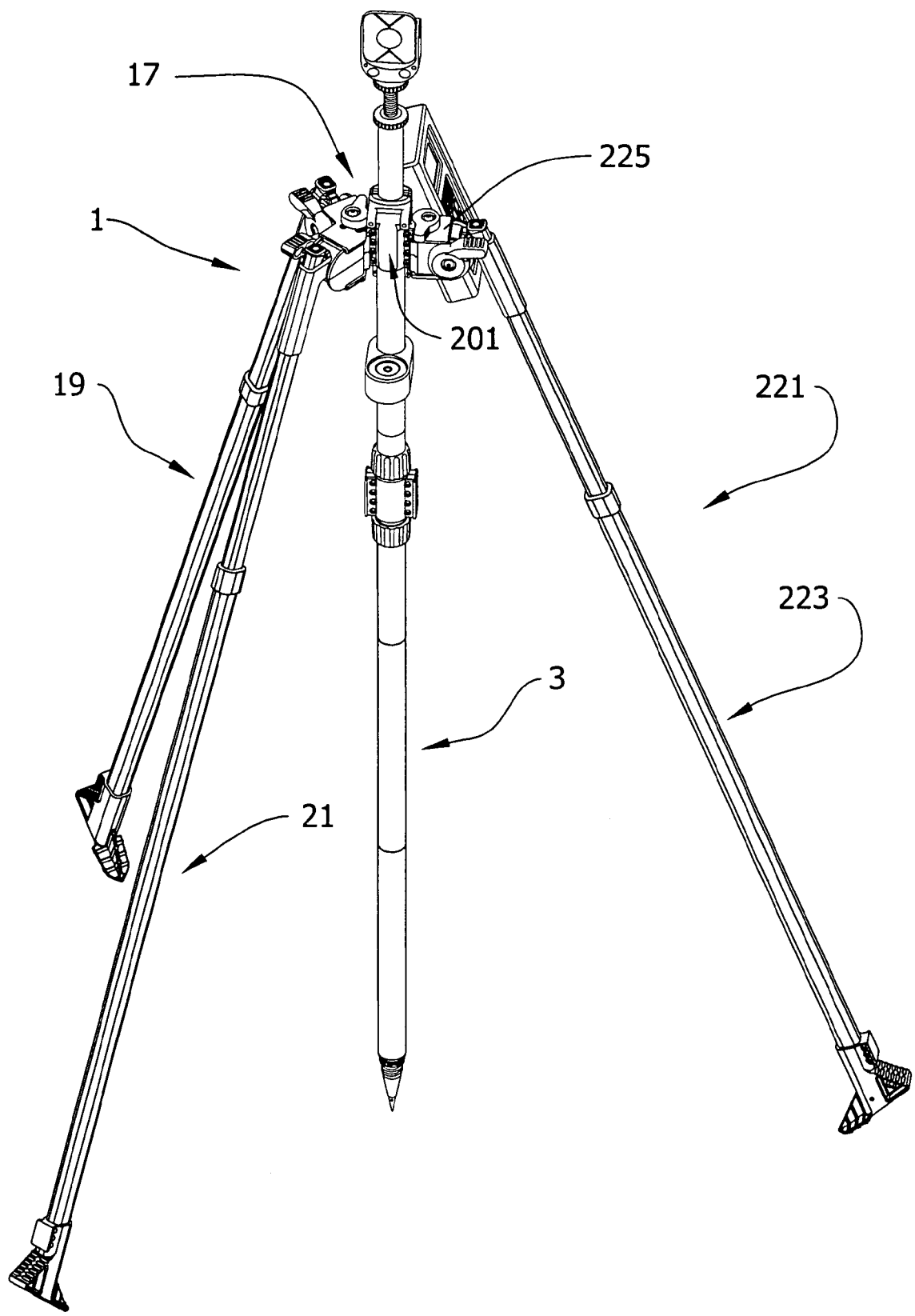
FIG. 25 is a perspective of a tripod support, a surveying pole and accessories.
Figure 26:
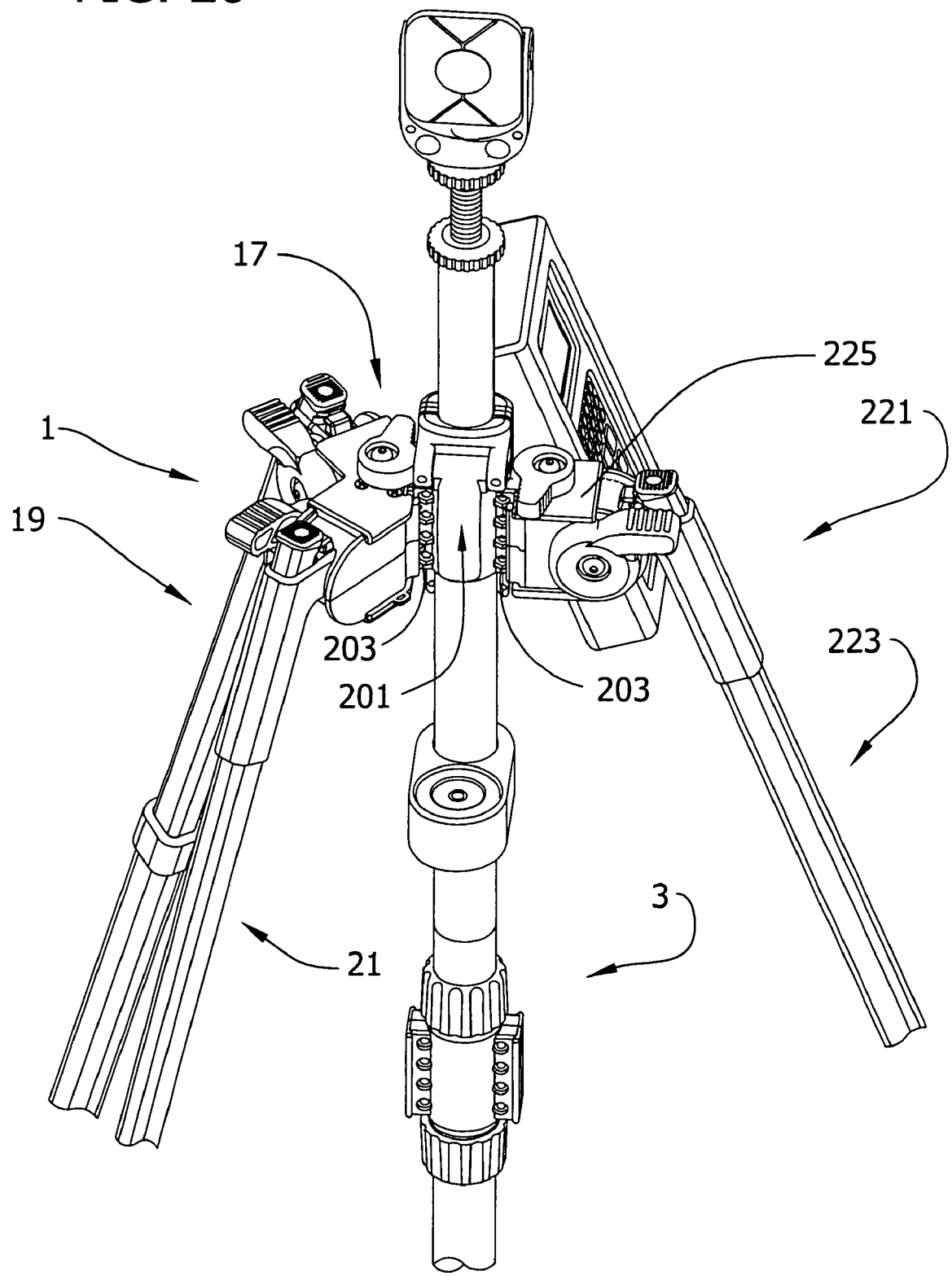
FIG. 26 is an enlarged fragmentary perspective of an upper end of the tripod support, surveying pole and accessories.
Figure 27:
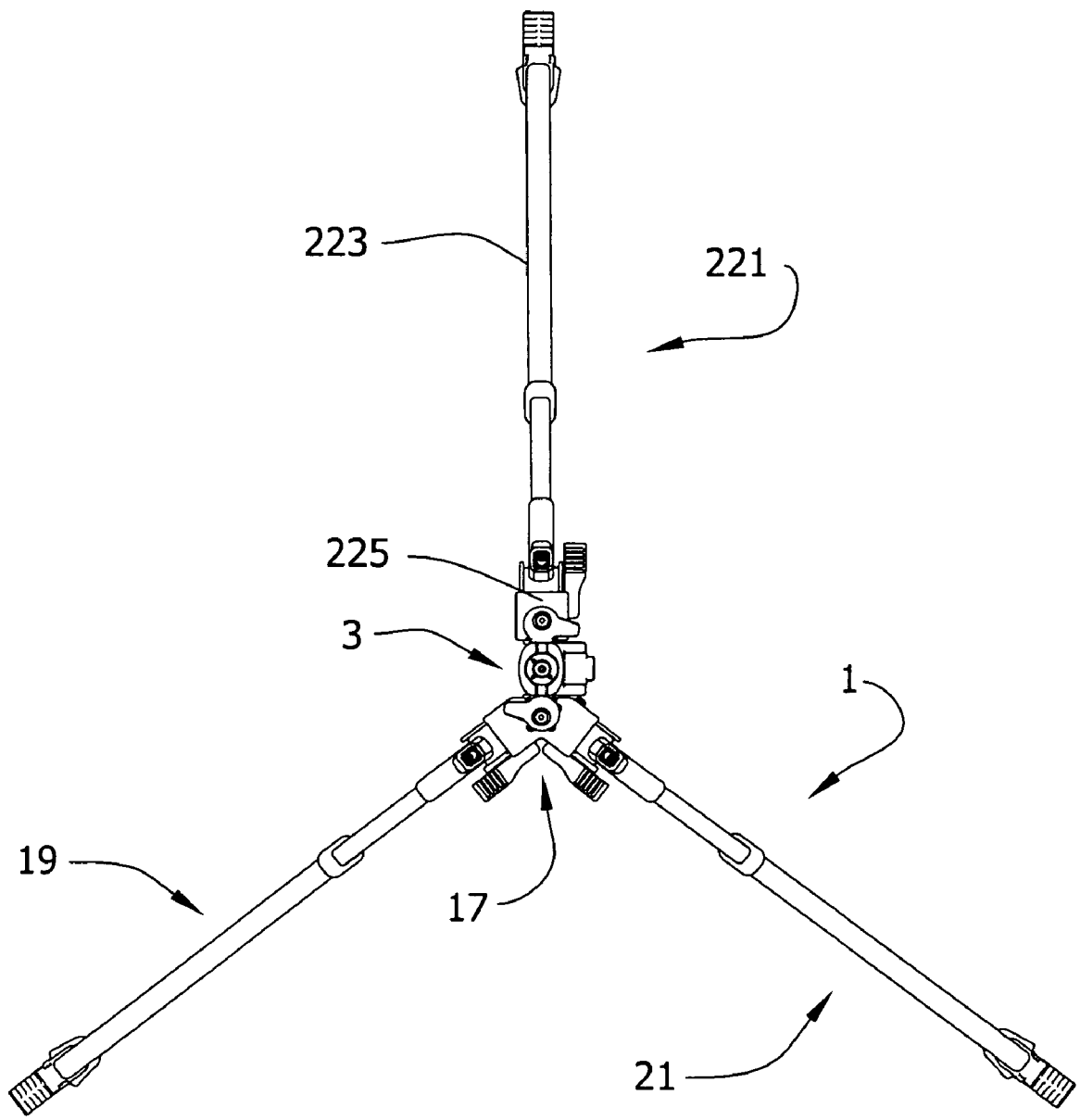
FIG. 27 is a top plan view of the tripod support and the surveying pole with accessories removed.
Figure 28:
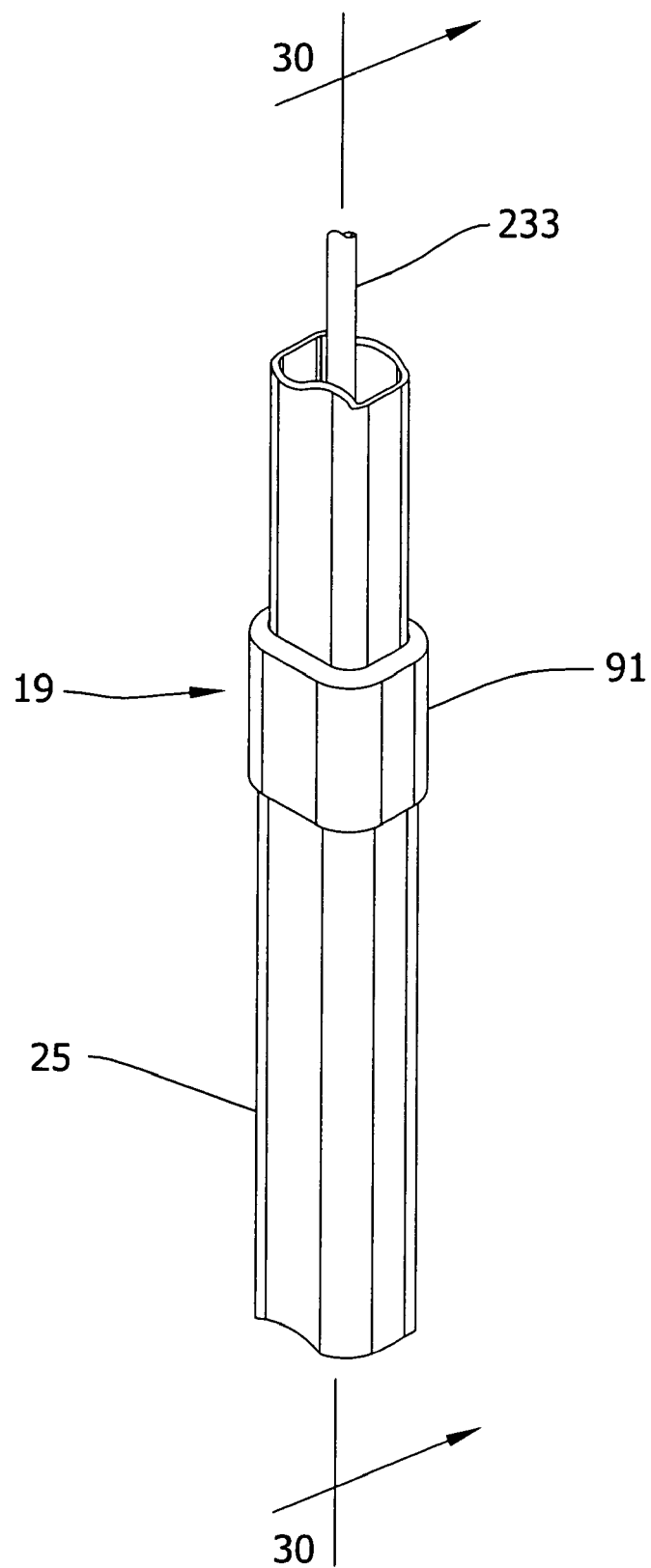
FIG. 28 is an enlarged fragmentary perspective of a joint of a support leg.

In one preferred embodiment, the bipod support 1 is part of a support system which can be converted from two legged support of the surveying pole 3 (or other supported item) to a three legged or tripod support. For that reason, the legs 19 and 21 are best arranged so that they are spread apart farther than a conventional bipod. However, a conventional spacing of the legs 19 and 21 could be used without departing for the scope of the present invention. As shown in FIG. 24, the legs 19, 21 are separated by an angle of about 105°, but could be arranged at an angle greater than 90° and less than 120° for use in the support system. This positioning facilitates support of the surveying pole 3 both when the bipod support 1 is used by itself and when used with a single leg support (generally indicated at 221) collectively to form a tripod support, as shown in FIG. 27. The angle between a leg 223 of the single leg support 221 and each of the legs 19, 21 of the bipod support is approximately 127.5°, providing opposition of the legs 19, 21 and 223 to support the surveying pole 3.

In the context of the support system, the head 17 of the bipod support 1 constitutes a "head element". The single leg support 221 includes a head element 225 having a similar construction to the head element 17 of the bipod support 1, but sized as needed for a single leg 223. The head elements 17, 225 of the bipod support 1 and the single leg support 221 collectively constitute a "head" of the support system. The single leg support 221 is attached to the mount in a manner substantially identical to the bipod support 1. However, it is to be understood that a single leg support could be attached to a bipod support which is in turn attached to the pole 3 (not shown). In that event, the leg support would still be considered capable of independent, or separate attachment to the pole 3, even though the attachment is indirect through the bipod support. Moreover, the pivoting connection of the leg 223 to the head element 225 is the same except for sizing, and will not be further described. It is noted that the leg 223 can be releasable locked both in a selected angular position relative to the head element 225 and in a position of telescoping extension just as described above for leg 19 of the bipod support 1. Although the bipod support 1 and the single leg support 221 are shown, other arrangements are possible. For example, all of the supports in the system could be single leg supports 221, or two bipod supports 1 could be used at the same time. The number of supports and legs can be other than two or three without departing from the scope of the present invention. Moreover, the supports 1, 221 could be used to hold an item (not shown) which does not itself contact the ground.

A locking device (generally designated at 228) for locking the first and second leg sections 23, 25 in a fixed position of extension (or retraction) is illustrated in FIGS. 28-34. The description of the locking device 228 will be made with reference to one of the legs 19, the locking devices in the other legs (21, 223) being identical. The locking device 228 is configured for easy operation by depressing a button 229 located at the upper end of the first leg section 23 to release the locking device, as will be explained more fully. An upper surface 231 of the button 229 is slanted so that even though the leg 19 extends at an angle to vertical, the upper surface faces substantially upward for ease of access to press down (see. e.g., FIG. 13). This ergonomic construction helps the button 229 to be accessible no matter on what side of the support a user is standing.

As shown in FIGS. 33 and 34, the button 229 is connected by a screw 232 to a tubular rod 233, which is internally threaded at the top to receive the screw. The screw 232 is fixed (such as by gluing) to the rod 233 so that the two are fixed rotationally. The button 229 is secured between the head of the screw 232 and an upper end of the rod 233 so that the button, screw and rod move conjointly in translation, but the screw and rod are allowed to rotate relative to the button The rod 233 extends down through the hollow interior of the first leg section 23, between lock members 235 to a wedge 237 connected to the bottom end of the rod below the lower end of the head 17. The rod 233 and wedge 237 move with the button 229 conjointly up and down along the axis of the leg 19. The lower end of the rod 233 is externally threaded and attached by threads to the wedge 237. Rotation of the screw 232 rotates the rod 233 and, depending upon the direction of rotation, draws the wedge 237 nearer to the button 229 or moves it farther away. Two spaced apart bushings 239 (FIG. 29) are located in and supported by the first leg section 23. The bushings 239 receive the rod 233 through them to guide the rod and support it against buckling.

Figure 32:
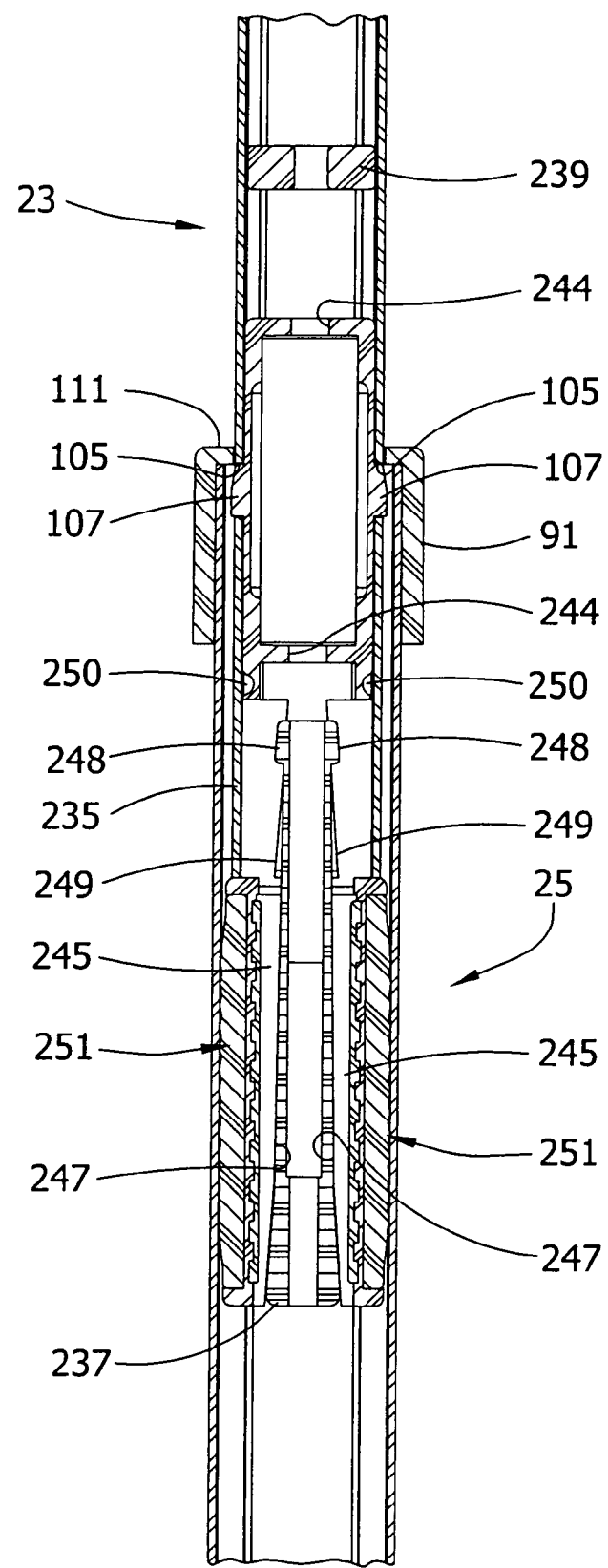
FIG. 32 is a section like FIG. 30 but with parts removed to show additional details of construction.

As may be seen in FIGS. 30 and 31, the lock members 235 are opposed to each other and each have tabs 241 which fit in slots 243 of the opposing lock member to loosely connect the lock members together. The lock members 235 together define two close fitting guide openings 244 in an upper guide portion of the lock members. The guide openings 244 receive the rod 233 between the lock members 235 to center the rod and wedge 237 in the second leg section 25. The lock members 235 each include the ears 107, described above, which permit the first and second leg sections 23, 25 to be snapped together and apart, but also fix the lock members to the head 17. Each lock member 235 is generally channel shaped, and includes lower wall sections 245 having inner edges 247 inclined relative to the center line C of the leg. As best seen in FIG. 32, the edges 247 converge toward the center line C from the lower end of the lock members 235 upward. As the wedge 237 is drawn up into the lock members 235, the sides of the wedge engage the inclined inner edges 247 of the lower wall sections 245 so that the lower ends of the lock members are forced apart.

Figure 32A:
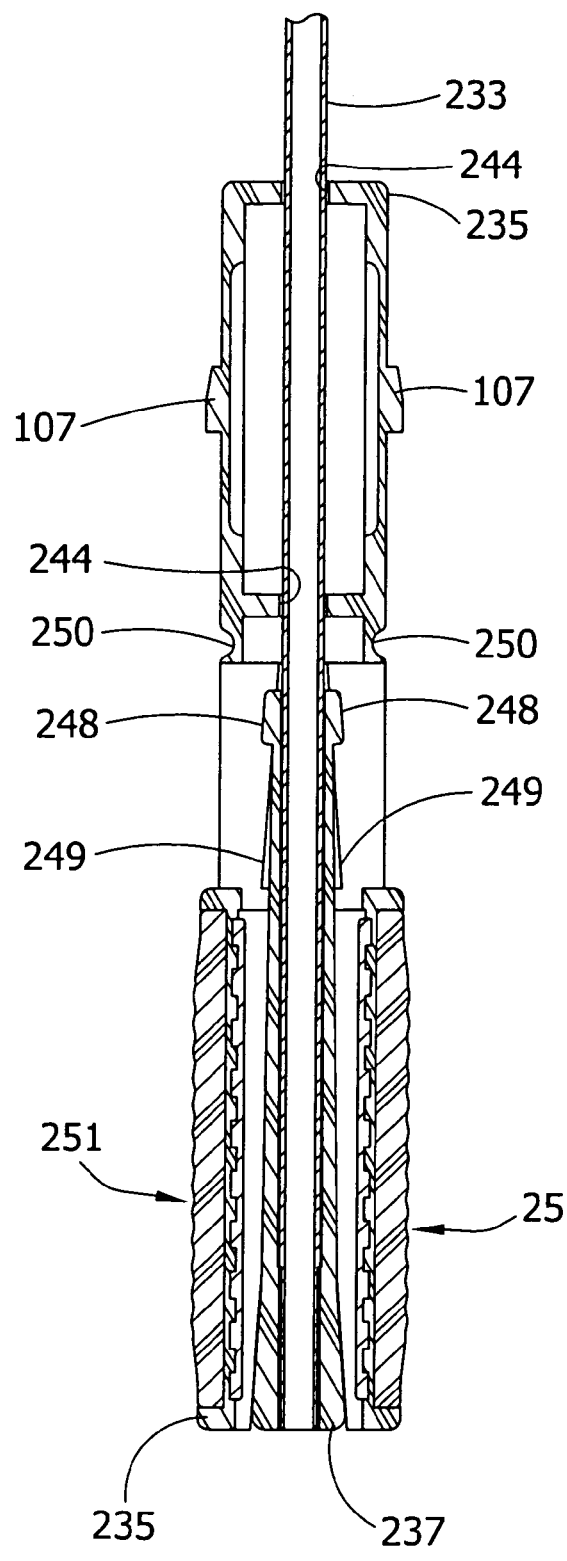
FIGS. 32A and 32B are enlarged, fragmentary sections of the locking devices illustrating both locked and unlocked positions.
Figure 32B:
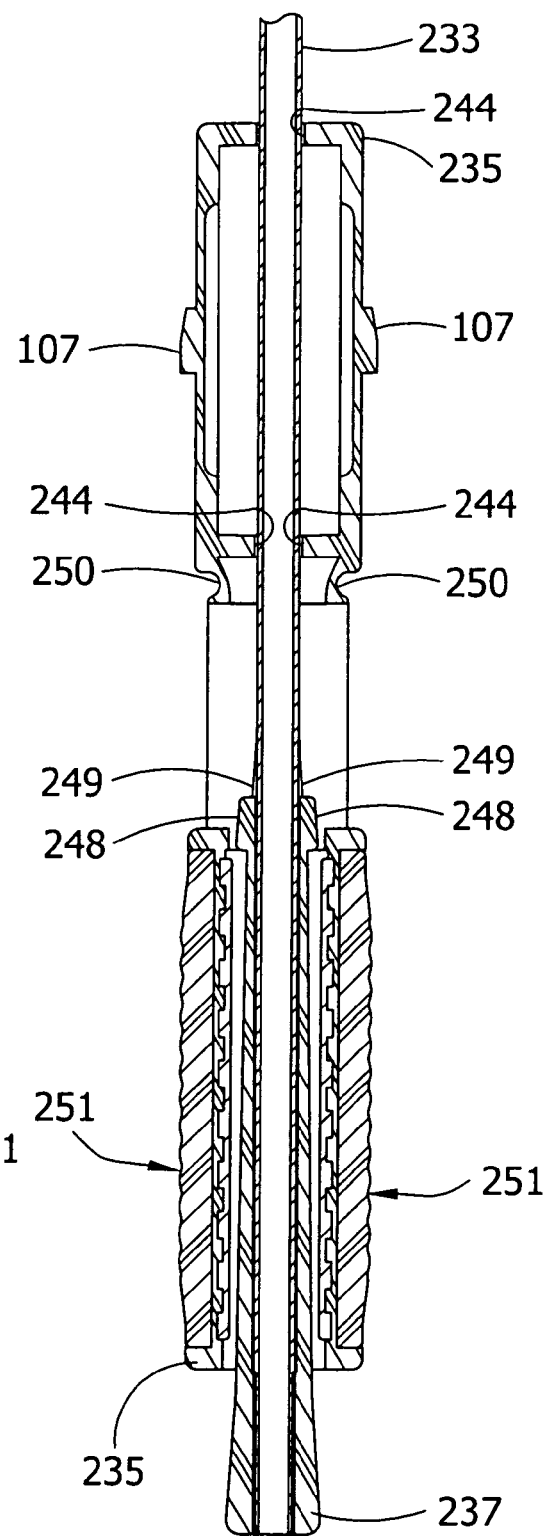

The lock members 235 are also positively drawn together by action of the wedge 237 in the unlock position of the locking device 228. In that regard, an upward extension of the wedge 237 is formed with undercut cams 248 engageable with respective lock members 235 to pull them toward each other in the unlock position. Each of the lock members 235 has a roughly channel shaped construction, with the open portion of each channel facing the open portion of the opposite lock member channel. In a mid-section of the lock members 235, ramps 249 project inwardly from the sides of the channel toward each other. These ramps 249 are received under the undercut portions of the cams 248 such that they are captured by the cams. The ramps 249 angle inwardly from the bottom to the top of the lock member mid-section. Thus, it will be understood that as the wedge 237 is moved down from the position shown in FIG. 32A by depressing the button 229, the cams 248 move along the ramps 249 drawing the lower portions of the lock members toward each other, as shown in FIG. 32B, and away from the inner surface of the second leg section 25. The wedge 237 moves down so that only a thinner portion of the wedge remains between the lock members 235, allowing the lower portions of the lock members to move toward each other. The action of the cams 248, and centering of the rod 233 and wedge 237 in the second leg section 25 facilitate complete disengagement of the lower portion of the locking device 228 from the second leg section. Thus, the leg section 23, 25 slide freely relative to each other and wear on the locking device 228 is reduced.

The lock members 235 are configured so that only lower portions of the lock members move under influence of the wedge 237. A hinge 250 is formed at a location of each lock member 235 where sides of the channel are cut away and the remaining wall is thinned (see FIG. 31A). Thus, the lower portion of each lock member 235 may pivot about an axis perpendicular to the longitudinal axis of the leg 19 between the lock and unlock positions. The lower portions are farther away from each other in the lock position and closer together in the unlock position. An engagement portion of each lock member 235 for engaging the inner surface of the second leg section 25 to grip the second leg section and lock the first leg section 23 in a fixed position of extension relative to the second leg section is defined by a resilient member (generally indicated at 251) overmolded onto the lower portion of the lock member. The resilient member 251 is formed of a softer elastomer and has a first or upper edge 251A and a second or lower edge 251B. The resilient member 251 tapers in thickness from its center toward the edges 251A, 251B. In other words, a thickness T1 at the center of the resilient member 251 is greater than the thickness T2 at the edges 251A, 251B. It is to be understood that the thickness edge 251A, 251B does not have to be the same. This curvature of the resilient member 251 reduces wear of the resilient member. However, wear can be accommodated by rotating the screw 232 as mentioned above to move the wedge 237 nearer to the button 229 so that the lock members 235 are driven further apart by the wedge in the lock position. The locking device 228 is also capable of automatically compensating for wear of the resilient members 251 which will occur over time. The inclined inner edges 247 of the lower wall sections 245 and the sides of the wedge 237 interact to drive the lower portions of the lock member 235 further apart as the resilient members 251 wear to assure continued tight gripping of the second leg section 25 in the lock position. In other words, the wedge 237 is drawn farther into the lock member as the resilient members 251 wear.

In addition, each resilient member 251 has laterally extending serrations 252 which facilitate both the gripping action of the resilient member with the inner surface of the second leg section 25 and the release from the second leg section. Gripping is enhanced because in the lock position any moisture between the resilient member 251 and the inner surface of the second leg section 25 can be channeled to the sides of the resilient member and out from between the two surfaces so that it does not interfere with gripping. Release is facilitated because the soft elastomer of the resilient member 251 has a tendency to cup and form a vacuum between the resilient member 25 and the inner surface of the second wall, making release difficult. The serrations 252 break the vacuum because they communicate air from the side of the resilient member 251 so that a vacuum is not drawn.

It is envisioned that frictional engagement portions other than the resilient members 251 could be used, such as multiple O-rings (not shown) received around both lock members 235. In that case, the O-rings could also serve to bias the lock members 235 to the unlock position. A separate spring or the like (not shown) could be used to bias the lock members 235 toward each other for positive release disconnect in the unlock position. Each lock member 235, including the upper and lower portions, the ears 107, lower wall sections 245, ramps 249, is molded as one piece from low friction material, such as nylon or another polymer. Molding from one piece eliminates relative movement and possible loss of alignment between parts of the lock members 235 which otherwise helps to assure complete disengagement of the resilient members 251 from the inner surface of the second leg section 25 in the unlock position. Use of a synthetic material having a low coefficient of friction, such as nylon, allows the ears 107 to freely slide along the interior of the second leg section 25. It is to be understood that these could be formed as separate pieces without departing from the scope of the present invention.

Having described the construction of the locking device 228, its operation to lock and unlock the first and second leg sections 23, 25 will now be described with reference to FIGS. 33 and 34. Normally, a spring 257 located above an annular shoulder 259 in the cap 157 of the leg 19 biases the button 229 and rod 233 attached thereto upward (as indicated by the arrow) along the center line C of the leg to the lock position. Although the spring 257 is located in the cap 157 and is received into a passage in the button 229, the spring may be located anywhere along the length of the rod 233 without departing from the scope of the present invention. The wedge 237 is drawn into the lock members 235 by the spring 257 and the sides of the wedge engage the inclined inner edges 247 of the lower wall sections 245. The lower portions of the lock members 235 are forced apart (as indicated by arrows) so that the resilient members 251 grippingly engage the inner surface of the second leg section 25 (see also FIG. 32A). In this lock position, the first and second leg sections 23, 25 are held against telescoping movement to extend or retract the leg 19.

To unlock the leg sections 23, 25, the button 229 is depressed (as indicated by the downward arrow in FIG. 34) forcing the button and rod 233 down against the bias of the spring 257. The wedge 237 moves down and partially out from between the lock members 235. At the same time, the cams 248 slide down the ramps 249 drawing the lower portions of the lock members 235 together and disengaging the resilient members 251 from the inner surface of the second leg section 25 (se also FIG. 32A). This action does not rely on any material retaining its resiliency over a period of time as the cams 248 pull the lock members 235 to the unlock position every time. The guide openings 244 in the upper guide portion of the locking members 235 center the rod 233 and lock members so that the resilient members 251 disengage the inner wall of the second leg section 25. The first and second leg sections 23, 25 are free to slide relative to each other without interference from the locking device 228.

As shown in FIG. 34, a cavity 261 in the cap 157 in which the button 229 is received is wider than the button, permitting some side-to-side movement of the button within the cavity relative to the cap. A catch 263 formed on the cap 157 generally adjacent to the cavity 261 opens on one side toward the button 229. A toe 265 formed on the lower end of the button 229 can be inserted into the open side of the catch 263 by moving the button sideways in its fully depressed position (FIG. 34). The force of the spring 257 holds the toe 265 in the catch 263 so that the locking device 228 is retained in the unlock position without continuing to apply thumb pressure to the button 229. The toe 265 and underside of the catch 263 are angled upwardly to enhance retention of the button 229 in the unlock position. The first and second leg sections 23, 25 are thus freely movable relative to one another without holding the button 229 down. By moving the button 229 sideways away from the catch 263, the toe 265 can be removed, and the locking device returned to the lock position of FIG. 33. The manipulations necessary to engage the button 229 with the catch 263 to hold it in the unlock position and to release the button from the catch can be performed with the thumb of one hand. However, other ways of manipulating the holding the locking device 228 in the unlock position may be employed without departing from the scope of the present invention.

Figure 36:
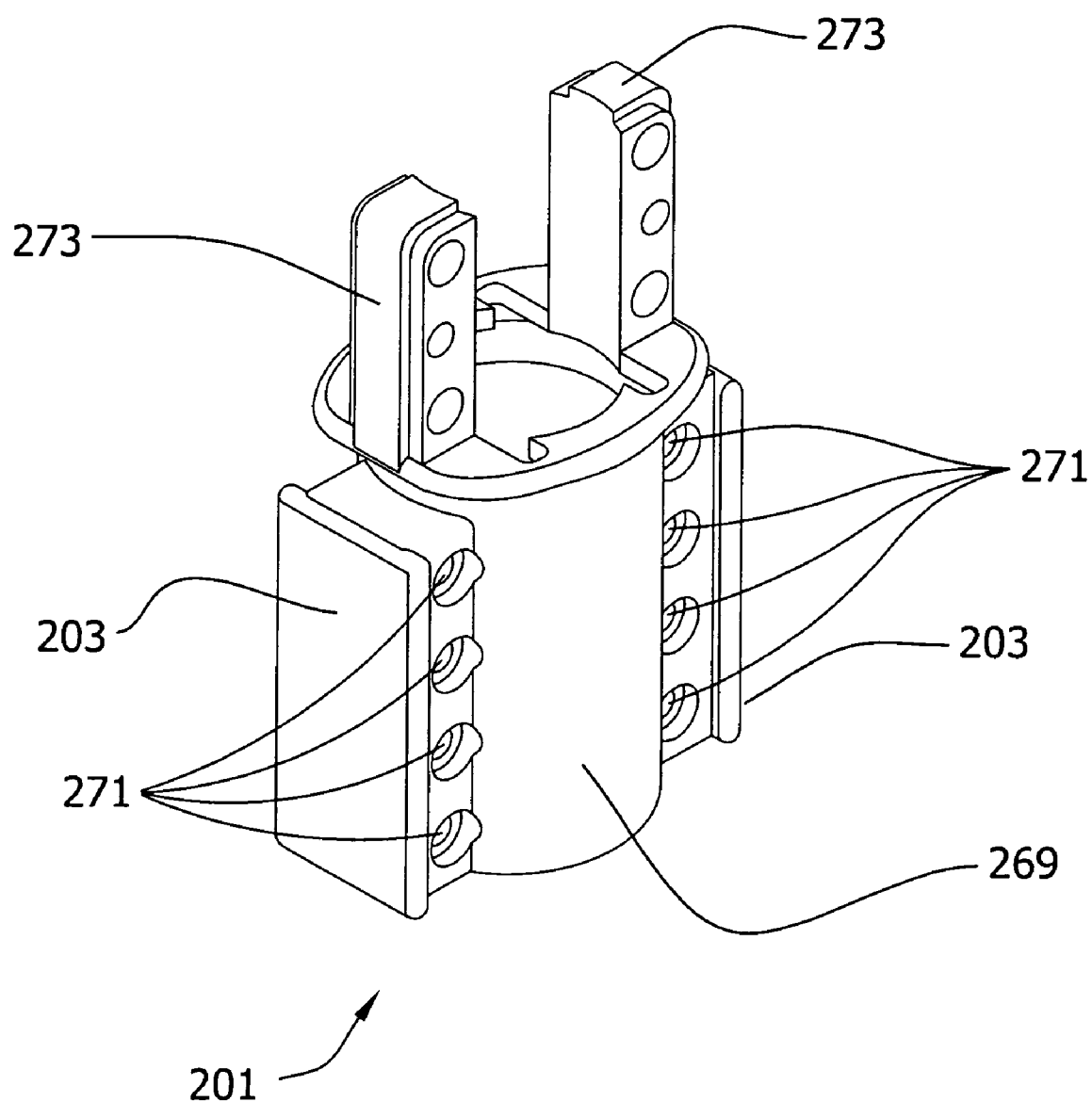
FIG. 36 is a perspective of a modular mount of a first embodiment.

Mounts 35, 35A, 35B, 201 of the present invention have previously been described in association with the foot (27, 27A, 27B), the joint of the leg sections 23, 25 and in the context of mounting the support(s) to the surveying pole 3. These mounts permit a tongue in groove connection, or a bolted on connection, or both. It to be understood that the mounts do not need to be capable of accepting both bolted and tongue in groove connections. Referring to FIG. 35, a first and a third embodiment of modular mounts are shown, including the fixed mount 201 and a selectively positionable mount 267A. The mount 201 located at the upper end of the lower pole section 7 was partially described in regard to attachment of the support 1 to the pole 3. Mount 201 includes a tubular body 269 permanently attached to the surveying pole 3 such as by gluing. The mount 201 is shown separate from the surveying pole 3 in FIG. 36. It may be seen that in addition to the mounting formations 203 and bolt holes 271, the mount 201 incorporates spaced apart posts 273 which attach the clamp 9 used to fix the axial position of the upper and lower pole sections 5, 7. However, such additional structure is not necessary to the present invention.

Figure 37:
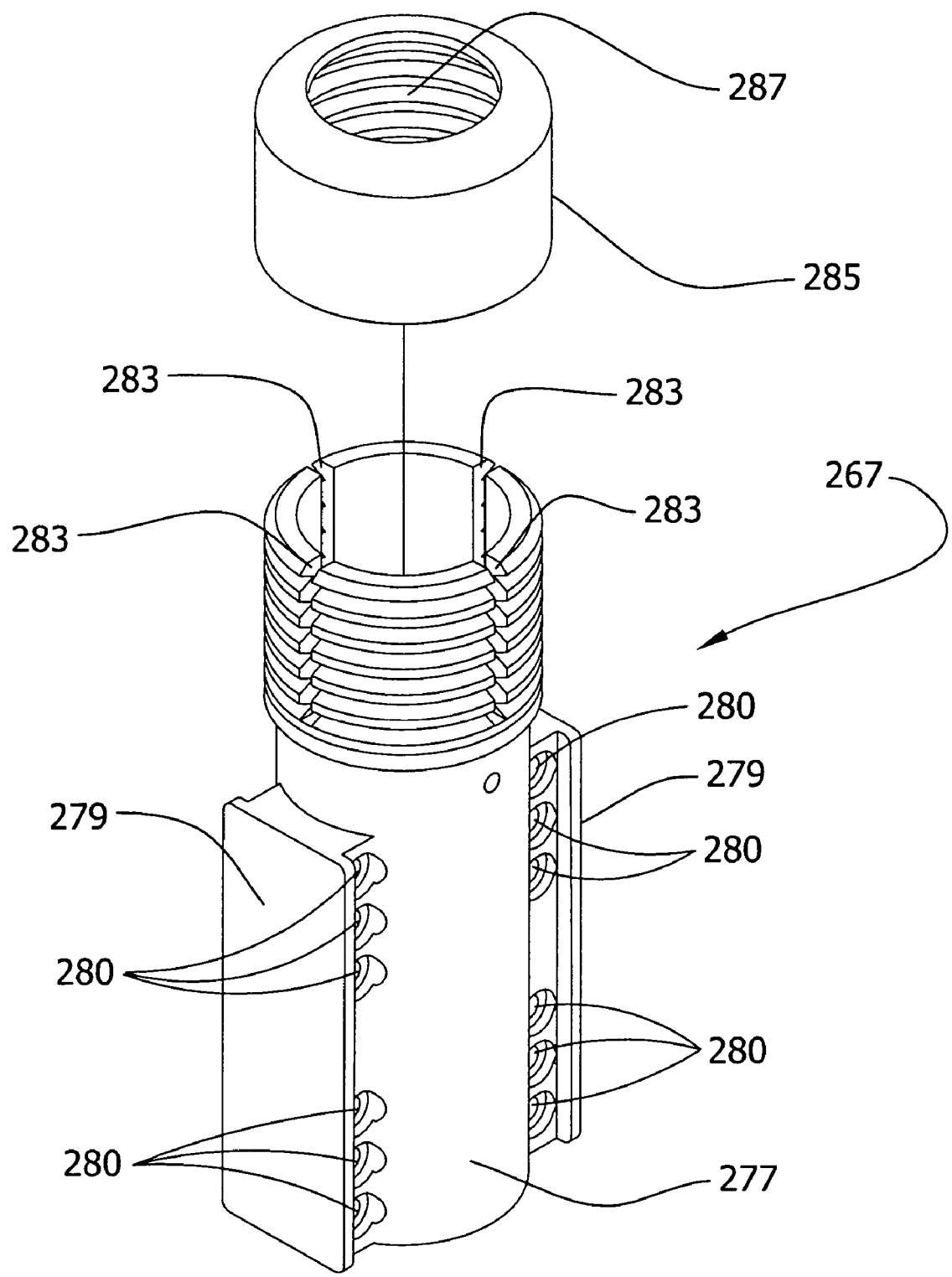
FIG. 37 is a perspective of a modular mount, partially exploded, of a second embodiment.

A selectively positionable mount 267 (see FIG. 37) of a second embodiment includes a tubular body 277, mounting formations 279 having bolt holes 280 like the mount 201 of the first embodiment. However, the internal diameter of the positionable mount 267 is larger than the diameter of the lower pole section 7 so that the body 277 may slide onto and along the lower section. The upper end of the tubular body 277 is threaded and has four axially extending slots 283 which permit the threaded portions of the body to flex inwardly relative to the remainder of the body 277. A compression nut 285 has a central opening 287 larger than the diameter of the lower pole section 7. Threads formed internally of the compression nut 285 are diametrically closer at the top end of the nut than at the bottom, thereby forming a wedge. When screwed onto the upper end of the tubular body 277, the compression nut 285 forces the threaded portions to bend inwardly into gripping engagement with the lower pole section 7 to releasably fix the positionable mount 267 on the lower pole section.

Figure 38:
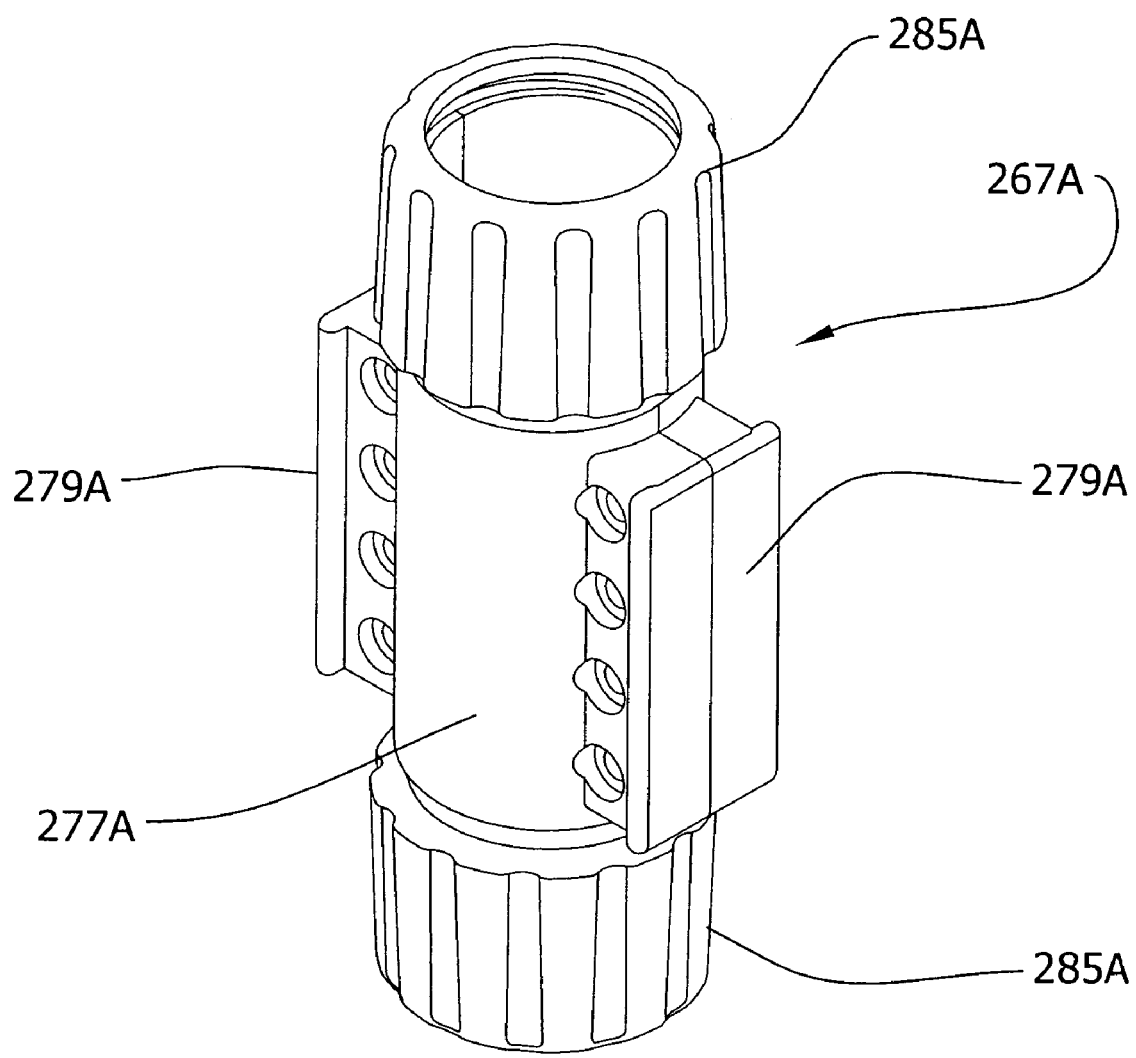
FIG. 38 is a perspective of a modular mount of a third embodiment.
Figure 38A:
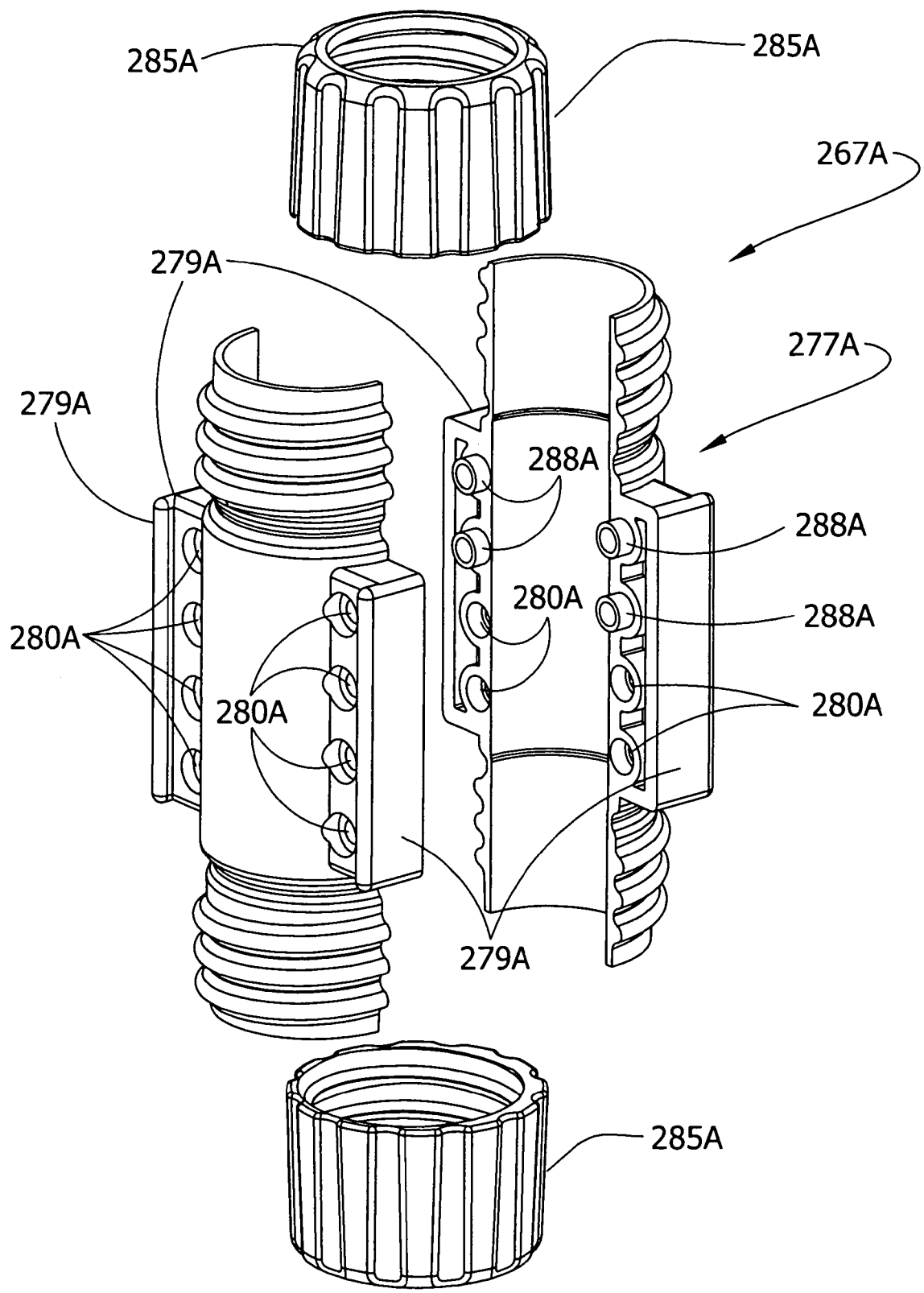
FIG. 38A is an exploded perspective of the modular mount of FIG. 38.
Figure 39:
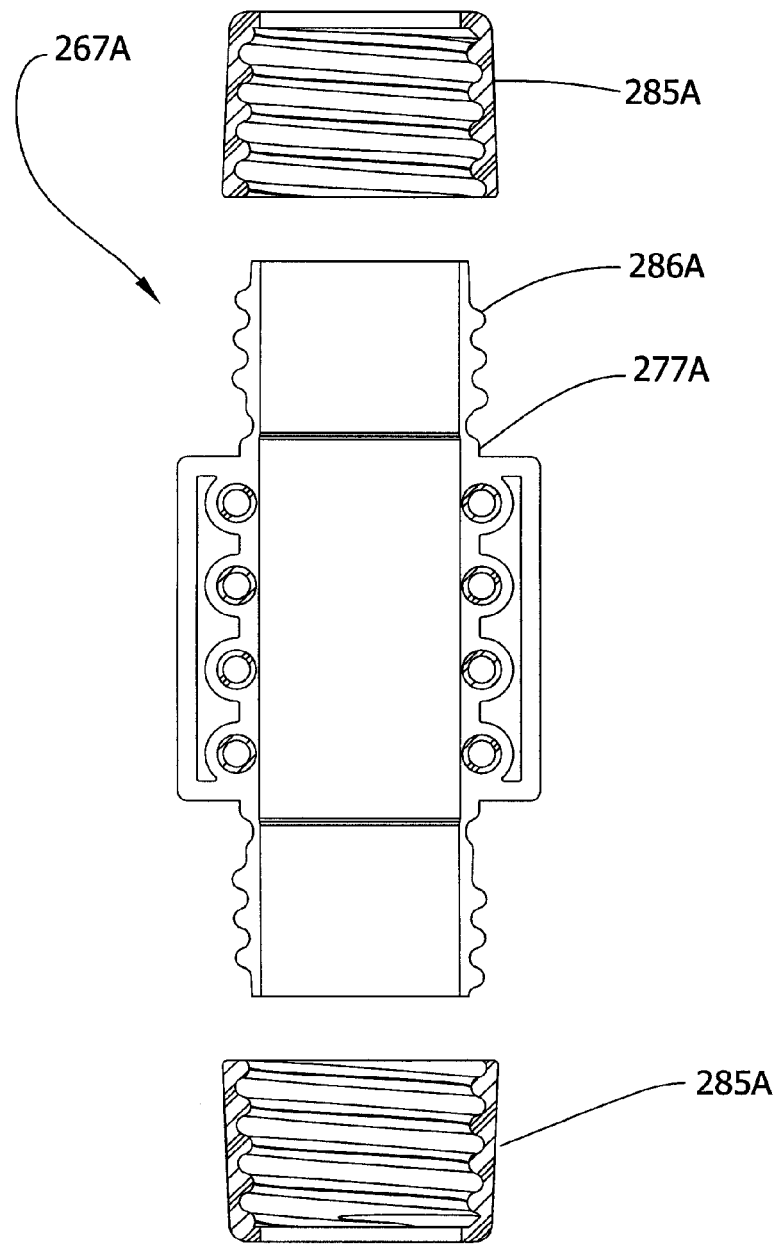
FIG. 39 is a longitudinal section of the modular mount of FIG. 38 with compression nuts thereof exploded from a tubular mount body.

The mount 267A constitutes a third embodiment of the mount, and is shown in FIGS. 38, 38A and 39. The mount 267A has threaded portions at both ends of the tubular body 277A and a second compression nut 285A for screwing onto the lower threaded portion for more secure attachment. The tubular body 277A of the mount 267A is formed of two semi-cylindrical parts 286A capable of being fitted together. Each body part 286A receives a circumferential portion of the pole 3. It is to be understood that the mount 267A could be formed as a single piece, or in more than two parts within the scope of the present invention. As shown, the parts 286A are identical to each other. Each body part 286A includes four tubular projections 288A which can be received in openings 280A of the opposite body part. A loose connection may be achieved in this manner. The parts 286A are secured together by the compression nuts 285A which simultaneously secure the mount 267A to the pole 3. The projections 288A of only one of the parts 286A can be seen in FIG. 38A, the other body part having projections in registration with the bottom four openings 280A of the body part on which the projections 288A can be seen. The projections 288A and openings 280A are capable of receiving bolts (not shown) or the like through the mounting formations 279A for mounting items on the modular mount 267A.

Figure 38B:
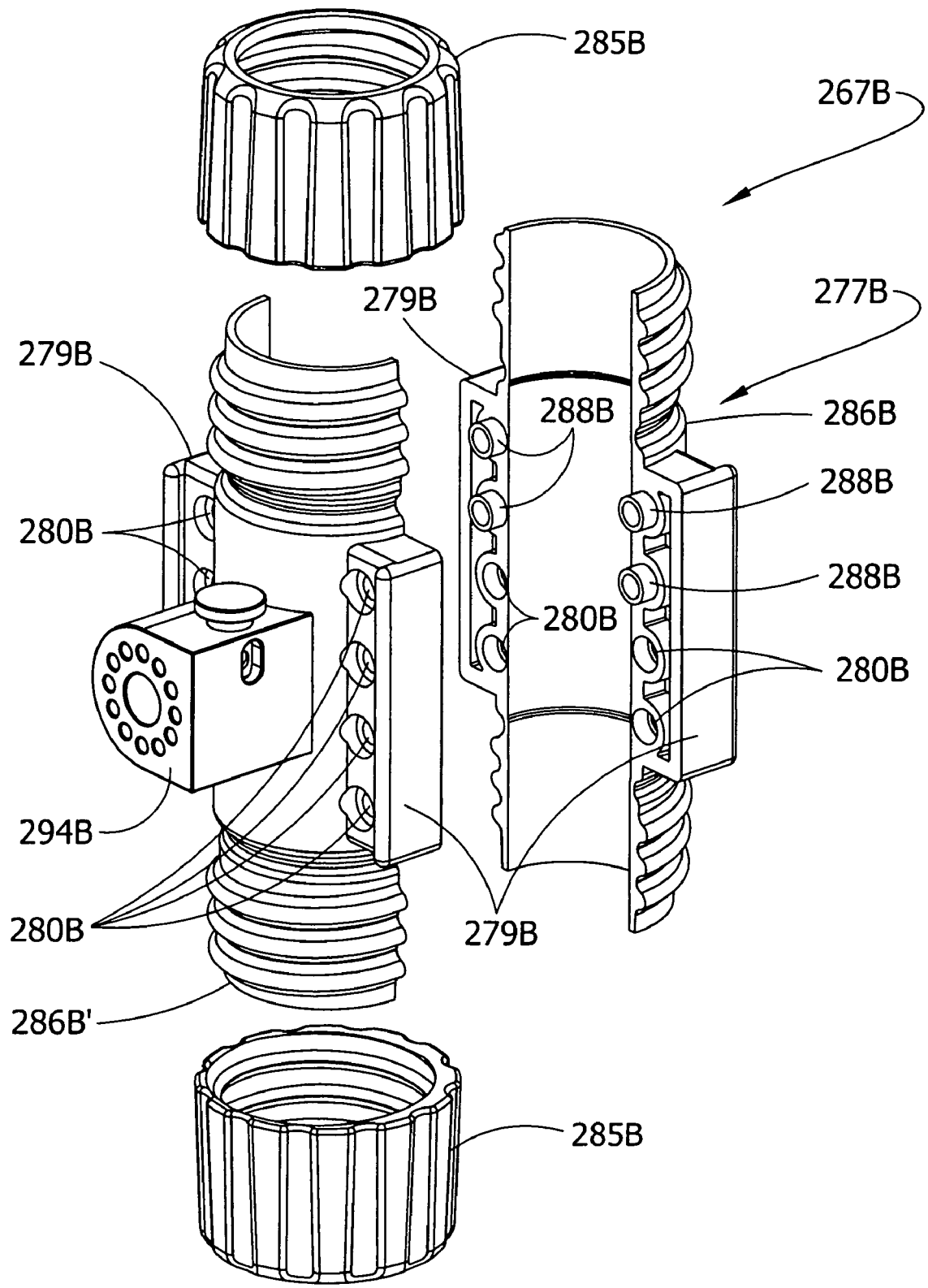
FIG. 38B is an exploded perspective of a modular mount of a fourth embodiment.

A modular mount 267B of a fourth embodiment shown in FIG. 38B is of similar construction to the modular mount 267A of the third embodiment. Corresponding parts of the modular mount 267B will be indicated by the same reference numbers as for 267A, but with the suffix "B". The modular mount 267B comprises a tubular body 277B having two parts 286B and 286B'. Unlike the parts 286A of the third embodiment, the parts 286B and 286B' are not identical. Instead, the part 286B' has a socket member 294B which is like the socket member 341 described hereinafter in relation to FIGS. 52 and 53.

Figure 38C:
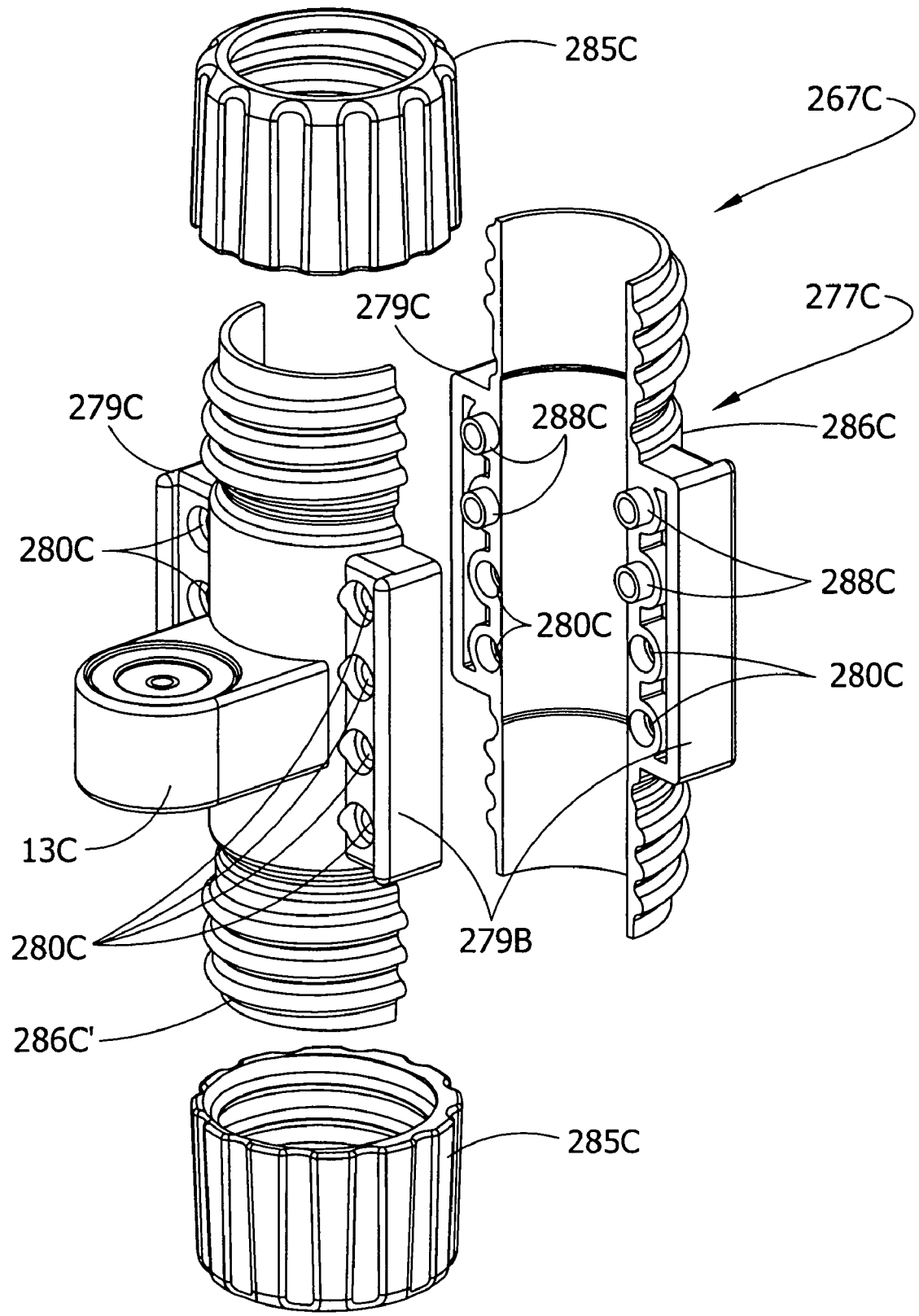
FIG. 38C is an exploded perspective of a modular mount of a fifth embodiment.

The fifth embodiment of the mount is shown in FIG. 38C and designated generally at 267C. The modular mount 267C is of similar construction to the modular mount 267B of the fourth embodiment. Corresponding parts of the modular mount 267C will be indicated by the same reference numbers as for 267B, but with the suffix "C". The modular mount 267C differs from the mount 267B in that in place of the socket member 294B, a level vial holder 13C is formed on part 286C' of the modular mount. It will be understood that various forms of mounts or other structures may be formed on modular mounts (not shown) without departing from the scope of the present invention.

Figure 40:
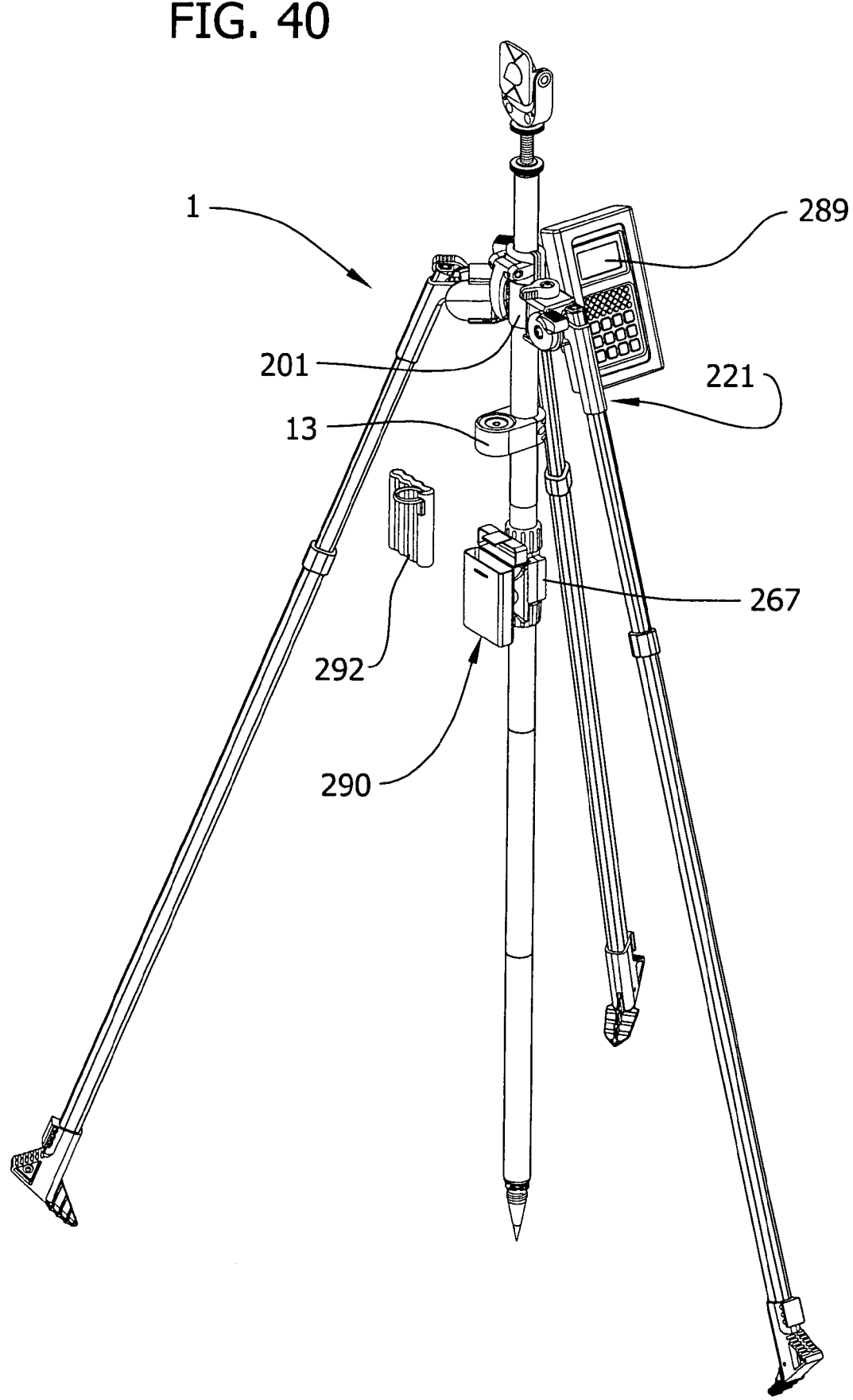
FIG. 40 is a perspective of a tripod support and surveying pole with accessories mounted thereon.
Figure 41:
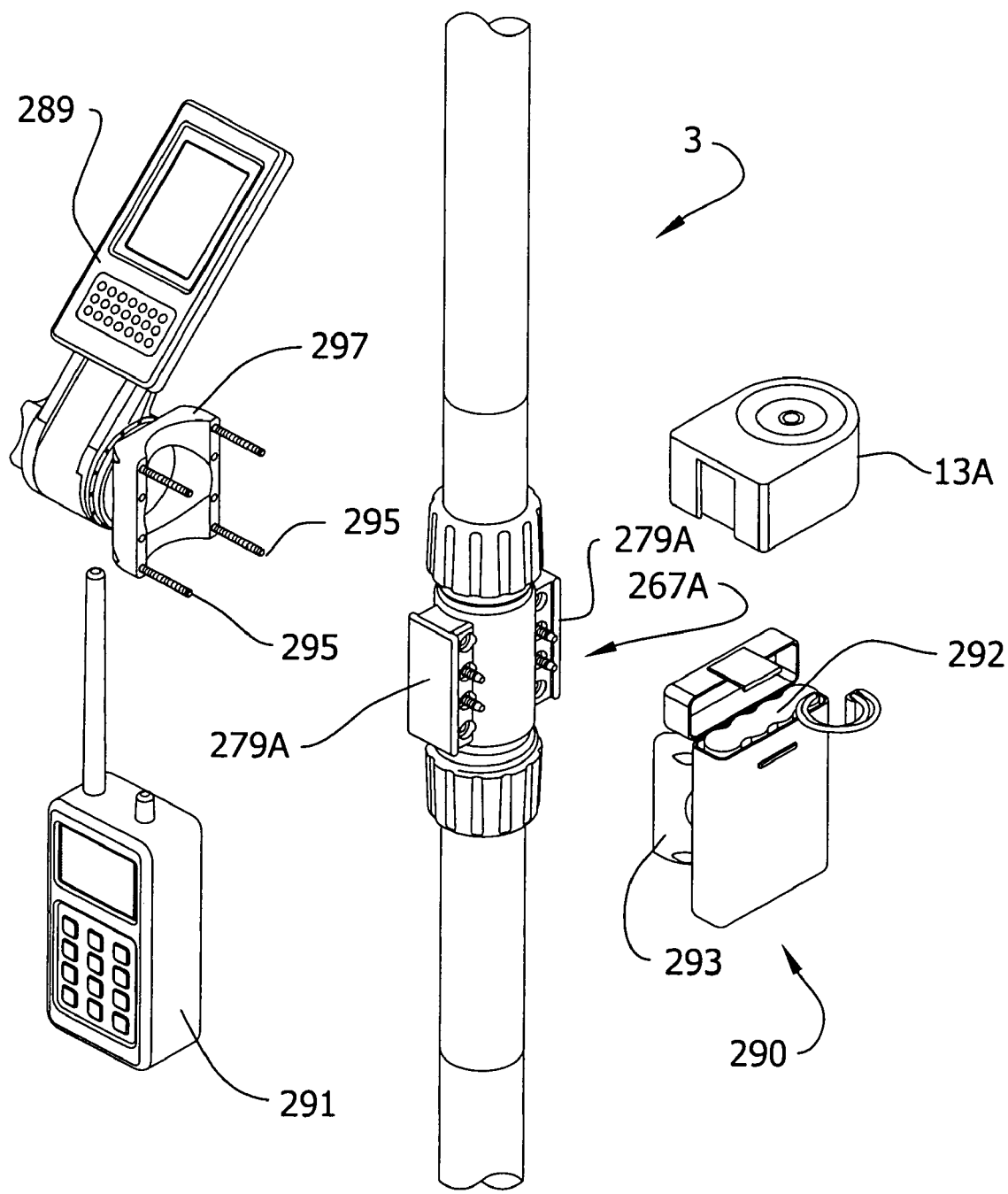
FIG. 41 is an enlarged, fragmentary perspective of a surveying pole having a modular mount thereon illustrating attachment of four items at one level.

Some uses of these modular mounts are shown in FIGS. 40 and 41. In FIG. 40, the fixed mount 201 attaches the bipod support 1, the single leg support 221 and a data collector 289 at the same level. Moreover, a battery pack 290 is mounted on the positionable mount 267. Batteries 292 held in the pack 290 are shown exploded from the pack in FIG. 40. The articles are exemplary only, as other articles could be mounted in a similar fashion. The level 13 is shown mounted on the surveying pole 3 independently of the modular mounts 201, 267. However, as shown in FIG. 41, a modified level 13A can be constructed for tongue in groove connection to the mounting formation 279A of the modified positionable mount 267A. A walkie talkie 291 can be attached by tongue in groove connection to the mounting formation 279A on the opposite side. Meanwhile, the data collector 289 and a battery pack 290 can be bolted to the mount 267A. In this case, the battery pack 290 includes an attachment member 293 formed with internally threaded holes (not shown) which threadably receive the ends of the bolts 295 passing through an attachment member 297 of the data collector. Thus, it may be seen that up to four items can be mounted at the same height on the surveying pole 3 with the embodiments of the modular mounts 201, 267, 267A illustrated.

Figure 42:
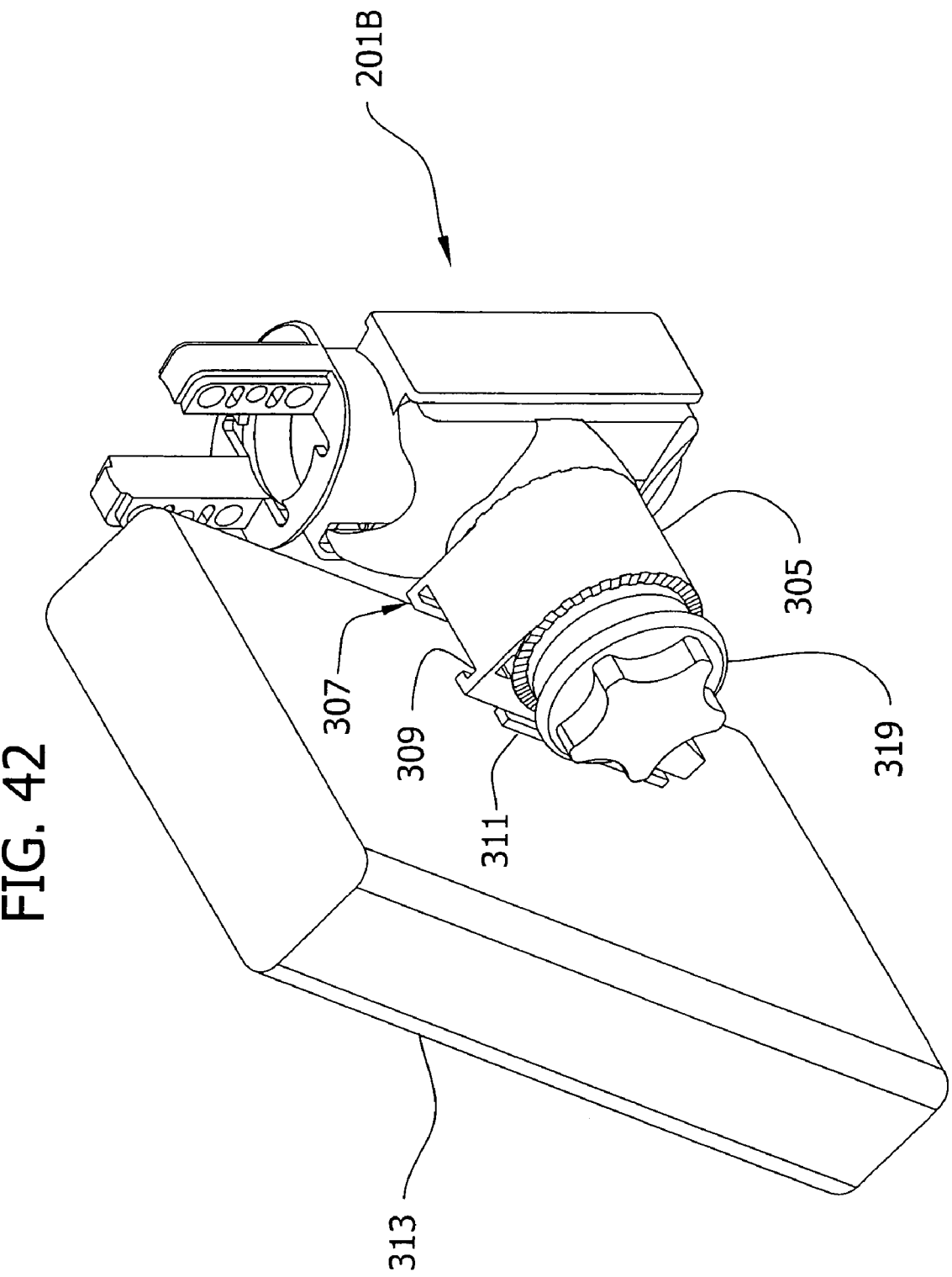
FIG. 42 is a perspective of a modified mount for adjustable support of an article from generally as seen from the rear of the article.
Figure 43:
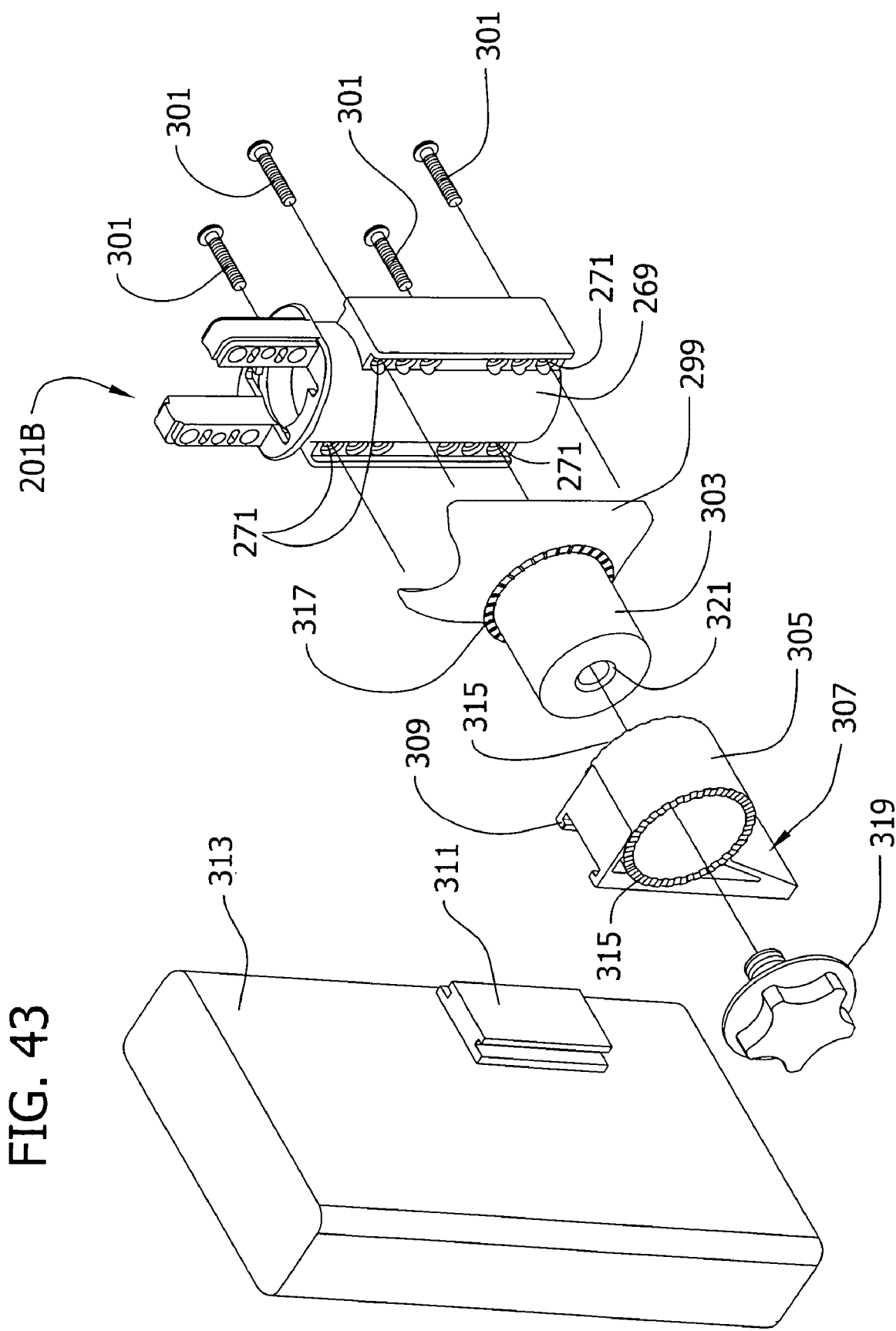
FIG. 43 is an exploded perspective of the modified mount and article of FIG. 42.
Figure 44:
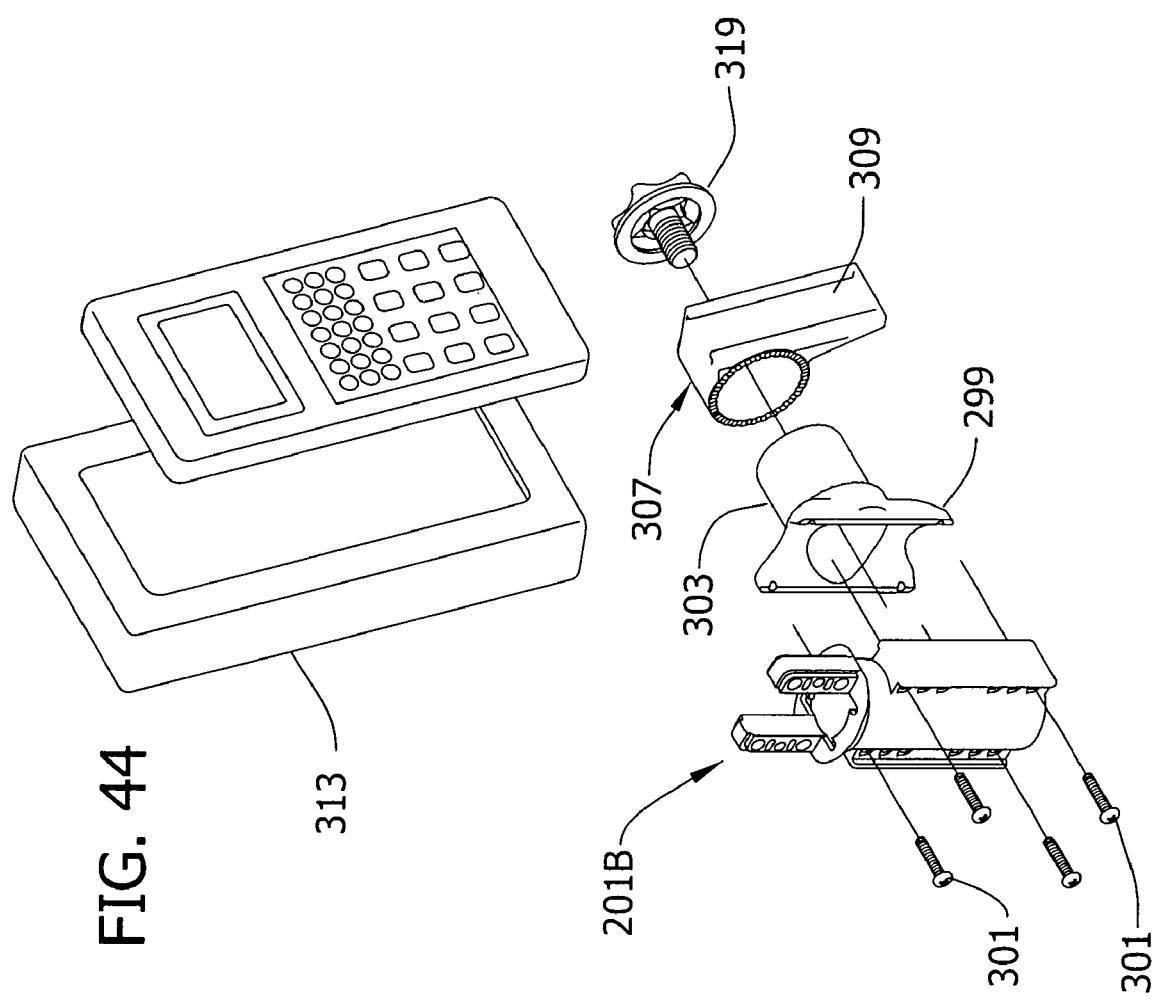
FIG. 44 is an exploded perspective like FIG. 43, but from a front vantage.

An adjustable support for a data collector case is shown in FIGS. 42-44 to comprise an attachment member 299 attached by bolts 301 (FIG. 43) to a fixed mount 201B. A cylinder 303 projects outwardly from the attachment member 299 and receives a sleeve 305 of a bracket (generally indicated at 307) thereon. The bracket further includes a channel 309 having an open upper end and a closed lower end (FIG. 44) for receiving a slide 311 attached to a data collector case 313 through the open end into the channel to connect the case to the bracket 307. The cylinder 303 has a relatively large diameter in relation to its length, for example the length of the cylinder may be 1½ inches and its diameter 1 7⁄16 inches. It is noted that the length of the body 269 of the fixed mount 201B helps to distribute loads over the larger surface area of the lower pole section 7.

The position of the bracket 307 about the axis of the cylinder 303 can be changed by turning the bracket on the cylinder. To secure the bracket 307 in selected angular position, first sets of detents 315 are provided on the ends of the sleeve 305 and a second set of detents 317 is provided on the attachment member 299 extending circumferentially around the cylinder 303. A cap screw 319 may thread into a central threaded opening 321 of the cylinder 303 and be screwed into the cylinder. A flat, smooth underside of the head of the cap screw 319 engages one edge of the sleeve 305 and forces it against the attachment member 299. The detents of one of the first sets of detents 315 engage with the second set of detents 317 on the attachment member 299 to lock the bracket 307 in a fixed angular position. Unscrewing the cap screw 319 releases the first and second sets of detents 315, 317 from meshing, allowing the angle of the bracket 307 to be changed. By providing a first set of detents 315 on both ends of the sleeve, the bracket 307 can be placed on the cylinder 303 in either direction and still be capable of locking in selected angular positions.

Figure 45:
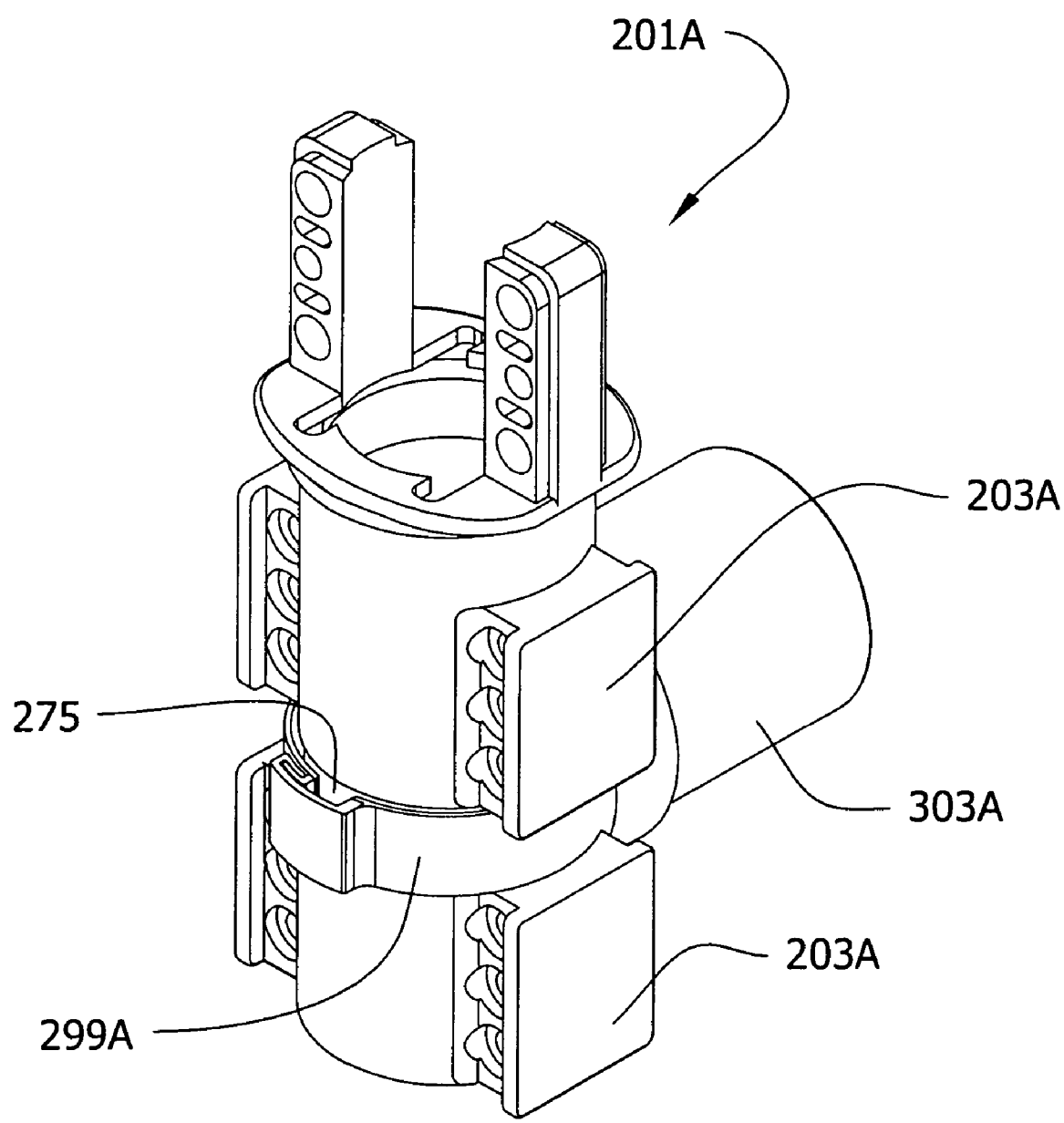
FIG. 45 is a perspective of a mount having a clipped on adjustable support.
Figure 46:
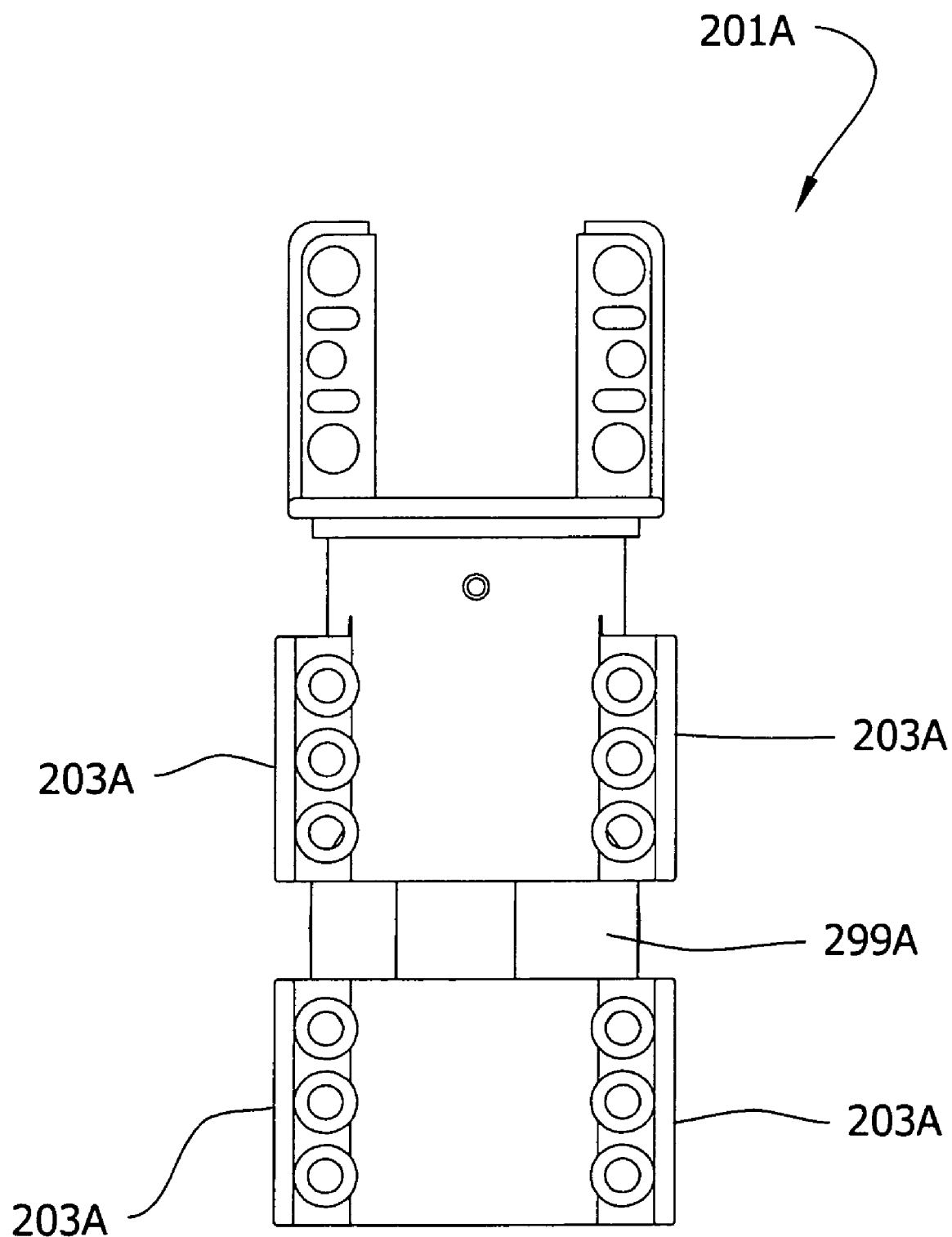
FIG. 46 is an elevation of the mount of FIG. 45.
Figure 47:
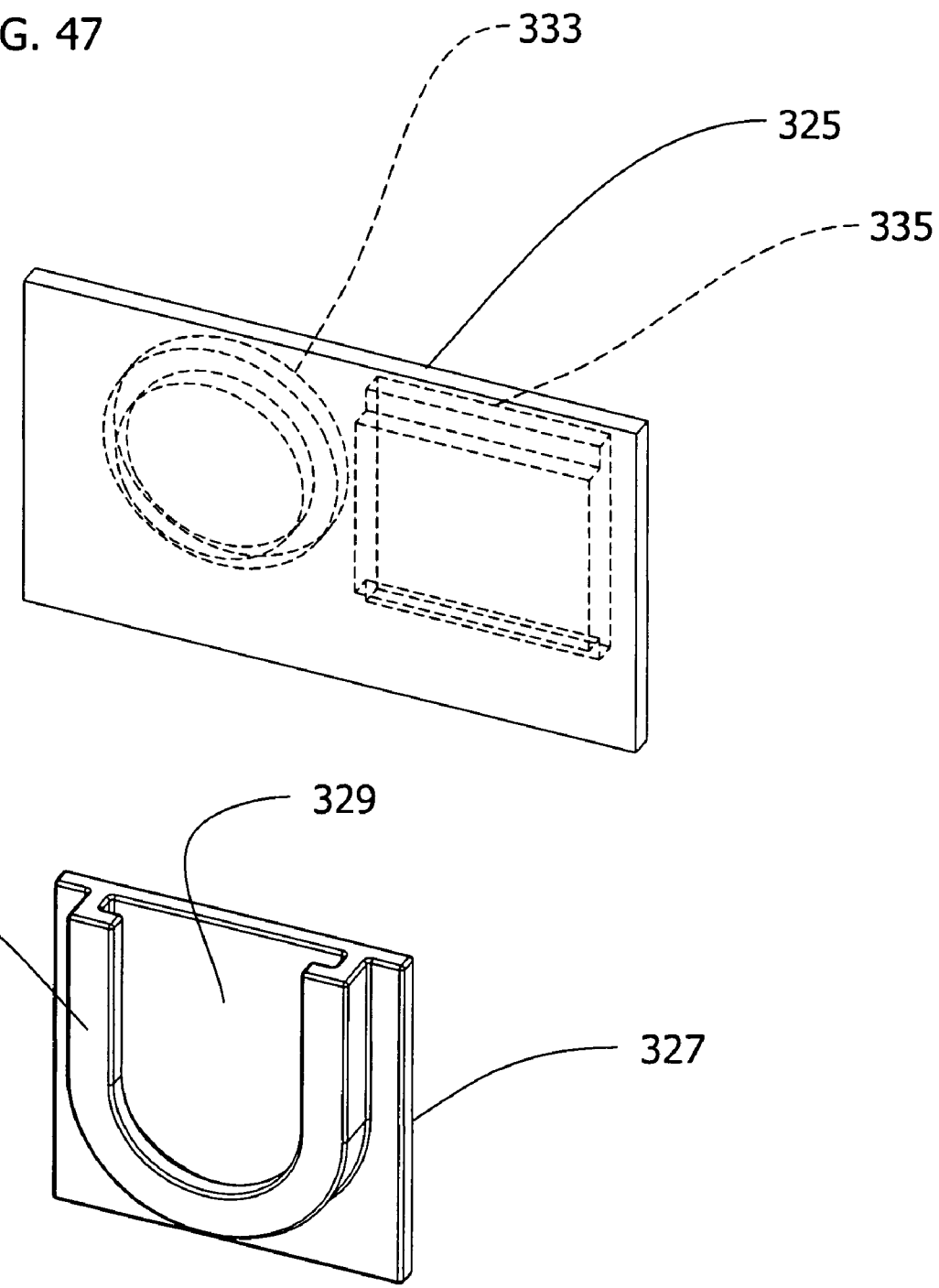
FIG. 47 is a perspective of two components of a connection system of the present invention.

A modified form of the attachment member and cylinder 303A are shown in FIGS. 45 and 46. The attachment member has the form of an elastic clip 299A which can snap onto a modified fixed mount 201A in a circumferential channel 275 separating mounting formations 203A on each side into two parts. The clip 299A allows for more rapid attachment (and disconnection) of the cylinder 303A. Thus, the cylinder may be readily moved from one side of the fixed mount 201A to the other.

Figure 49:
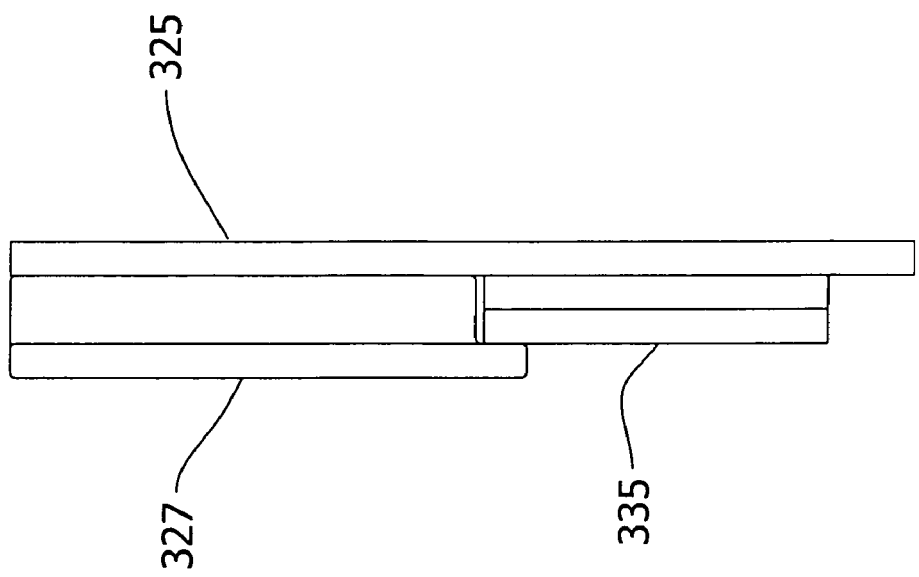
FIG. 49 is a side elevation of the connected components of FIG. 48.
Figure 48:
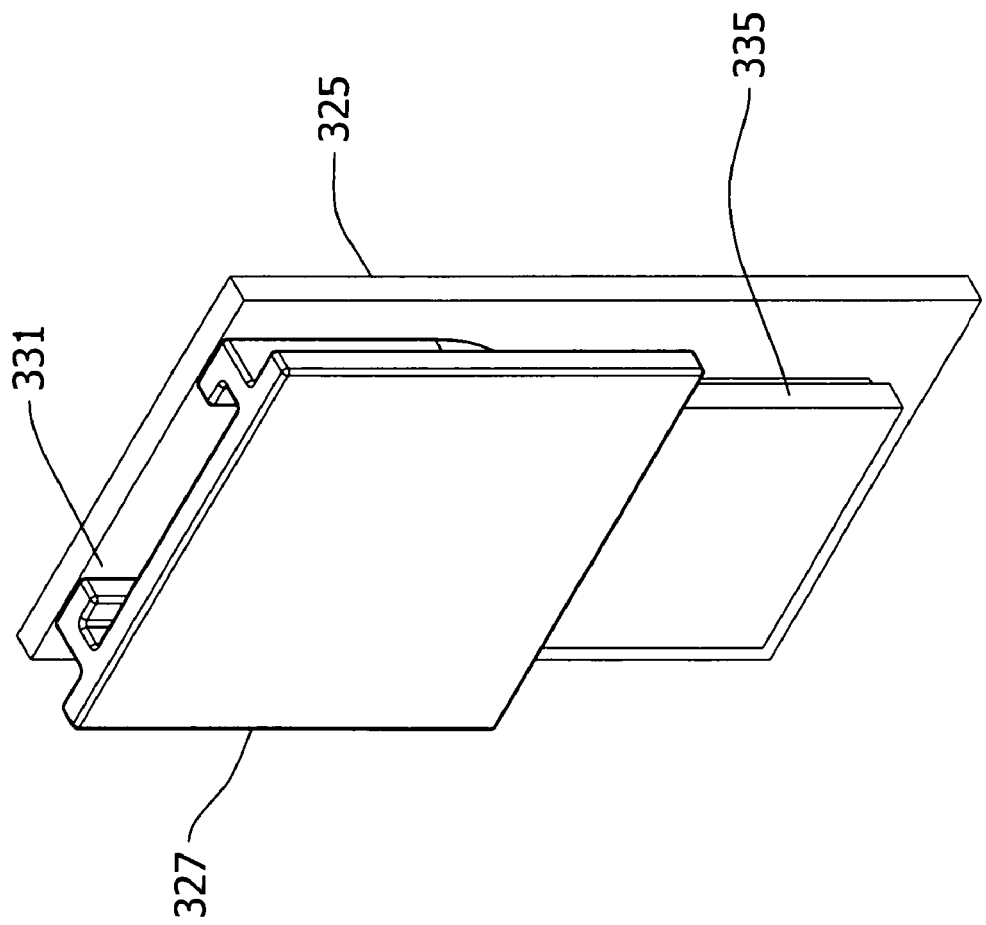
FIG. 48 is a perspective of the components of FIG. 47 in an engaged position from a vantage generally opposite to that of FIG. 47.
Figure 51:
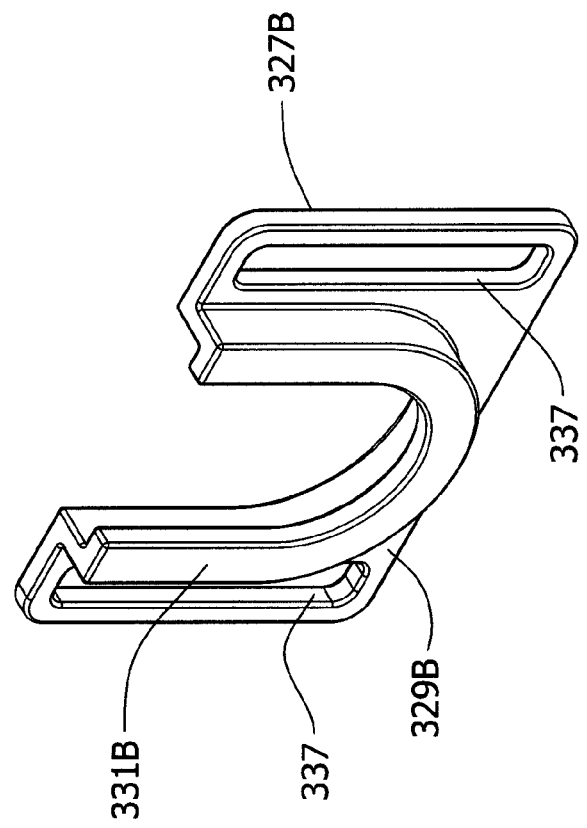
FIG. 51 is a perspective of a second modified version of a second modified version of the one connector component of the system.
Figure 50:
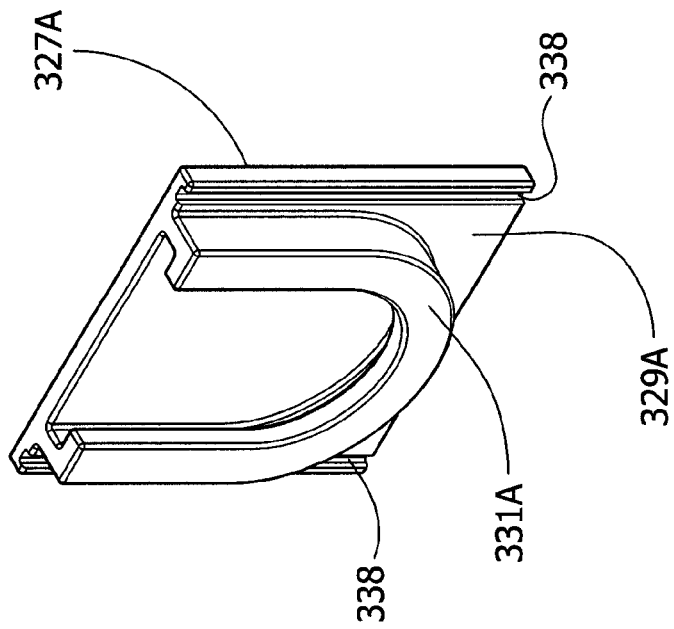
FIG. 50 is a perspective of a first modified version of one connector component of the system.

A connection system of the present invention is shown in FIGS. 47-51. The system includes a first connector 325 which is fixed to an article (e.g., a walkie talkie). The article is not shown in FIG. 47 for clarity. A second connector is not shown in FIGS. 47-51 but can be of the same general construction as the bracket 307 in as much as the bracket includes a channel having a floor, side walls and inwardly turned lips extending toward each other over the floor. A third connector 327 (FIG. 47) has a back 329 and a generally U-shaped receiver 331 having an open upper end. The third connector 327 may be attached to an object other than the surveying pole 3 such as a bag, another piece of equipment or a piece of clothing (not shown). The first connector 325 includes two connector components, a circular undercut slider 333 and a rectangular undercut slider 335 aligned so a longitudinal axis of the rectangular slider passes through the center of the circular slider. These components are shown in hidden lines in FIG. 47 because they are on the opposite side of the first connector 325. The diameter of the circular slider 333 is about the same as the width of the rectangular slider 335. When attached to the second connector (e.g., bracket 307), both the circular slider 333 and rectangular slider 335 are received in the channel (e.g., channel 309) with their undercut portions capturing the lips of the channel. To attach the first connector 325 to the third connector 327, the first and third connectors are turned so that the circular slider 333 is lined up with the open upper end of the U-shaped receiver 331 and the rectangular slider 335 is positioned to one side of the U-shaped receiver. The first connector 325 may then be moved so that the circular slider 333 only is received in the U-shaped receiver 331. The first connector 325 may then be rotated so that the rectangular slider 335 moves to a position under the U-shaped receiver. This configuration is illustrated in FIGS. 48 and 49. Modified forms of the third connector 327A, 327B are shown in FIGS. 50 and 51. FIG. 50 shows the third connector 327A having a U-shaped receiver 331A and a back 329A with two channels 338. A back 329B of the receiver 327B does not extend across a U-shaped receiver 331B in the version shown in FIG. 51. Slots 337 on either side of the U-shaped receiver 331B can receive, for instance a belt (not shown) worn by a person. Thus, an article can be removed from the bracket 307 on the surveying pole 3 and attached to the belt quickly and easily.

Figure 52:
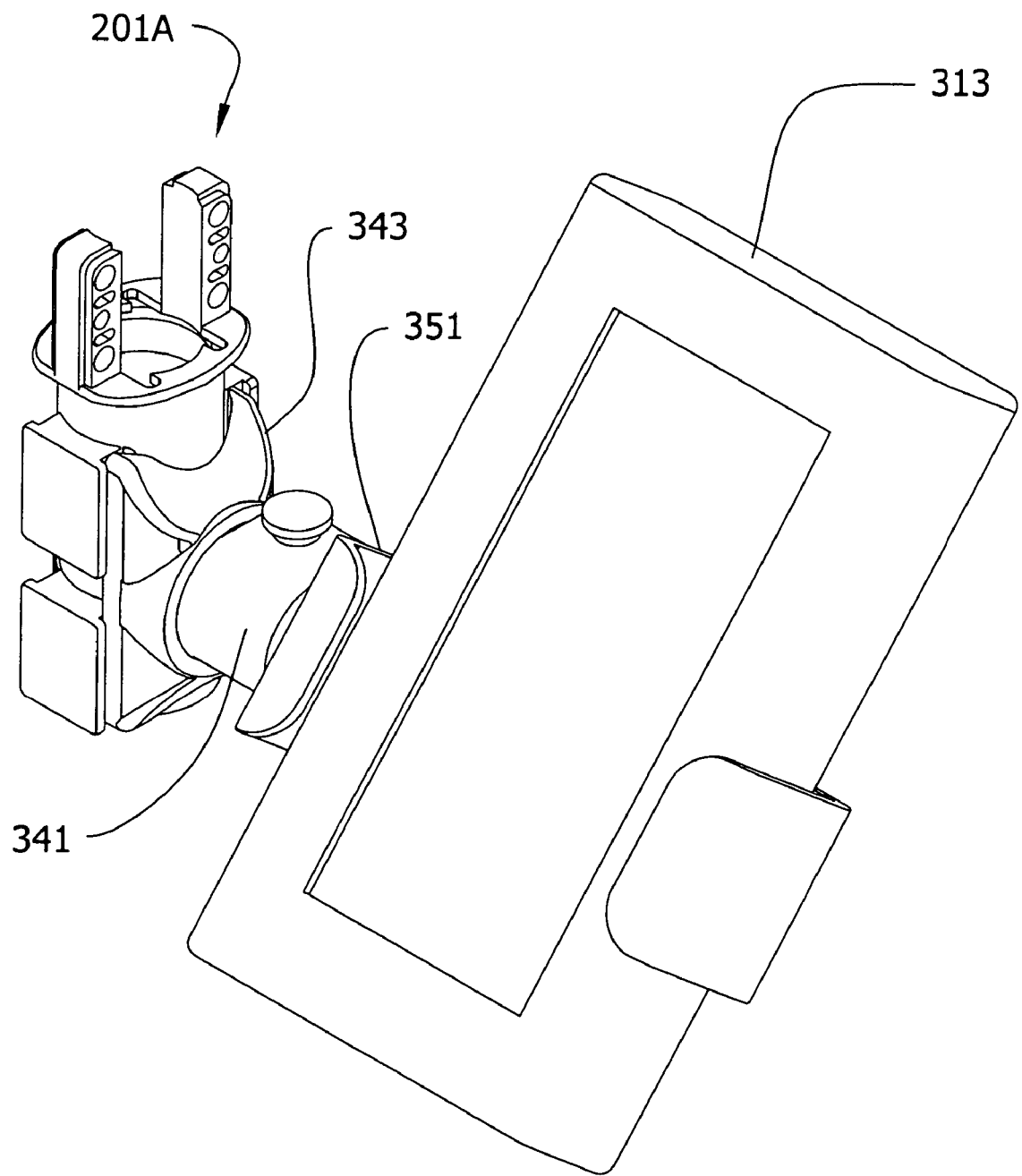
FIG. 52 is a perspective of a mount having an adjustable support of a second embodiment supporting an article.
Figure 53:
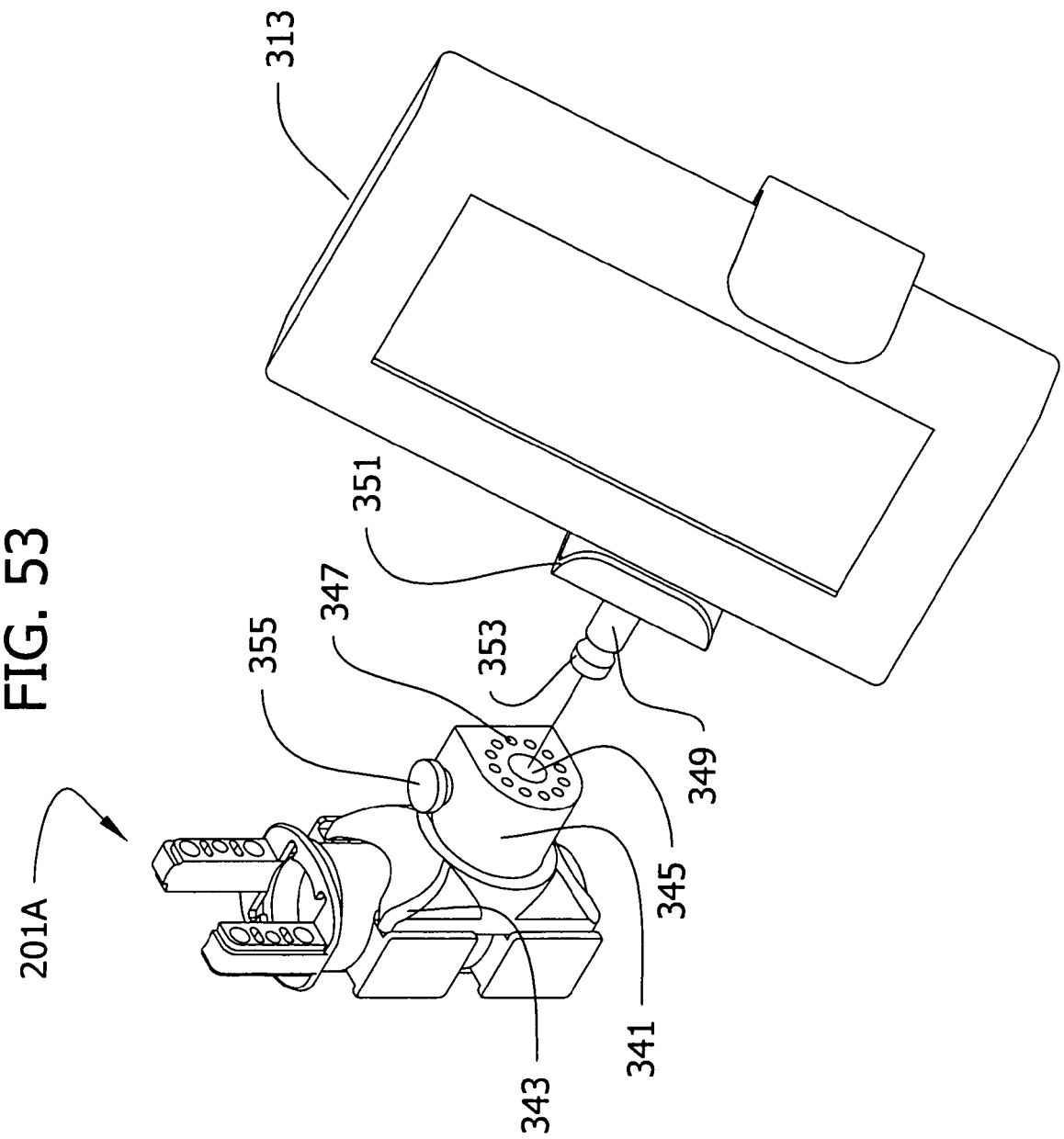
FIG. 53 is a perspective of the mount and article of FIG. 52, partially exploded.
Figure 54:
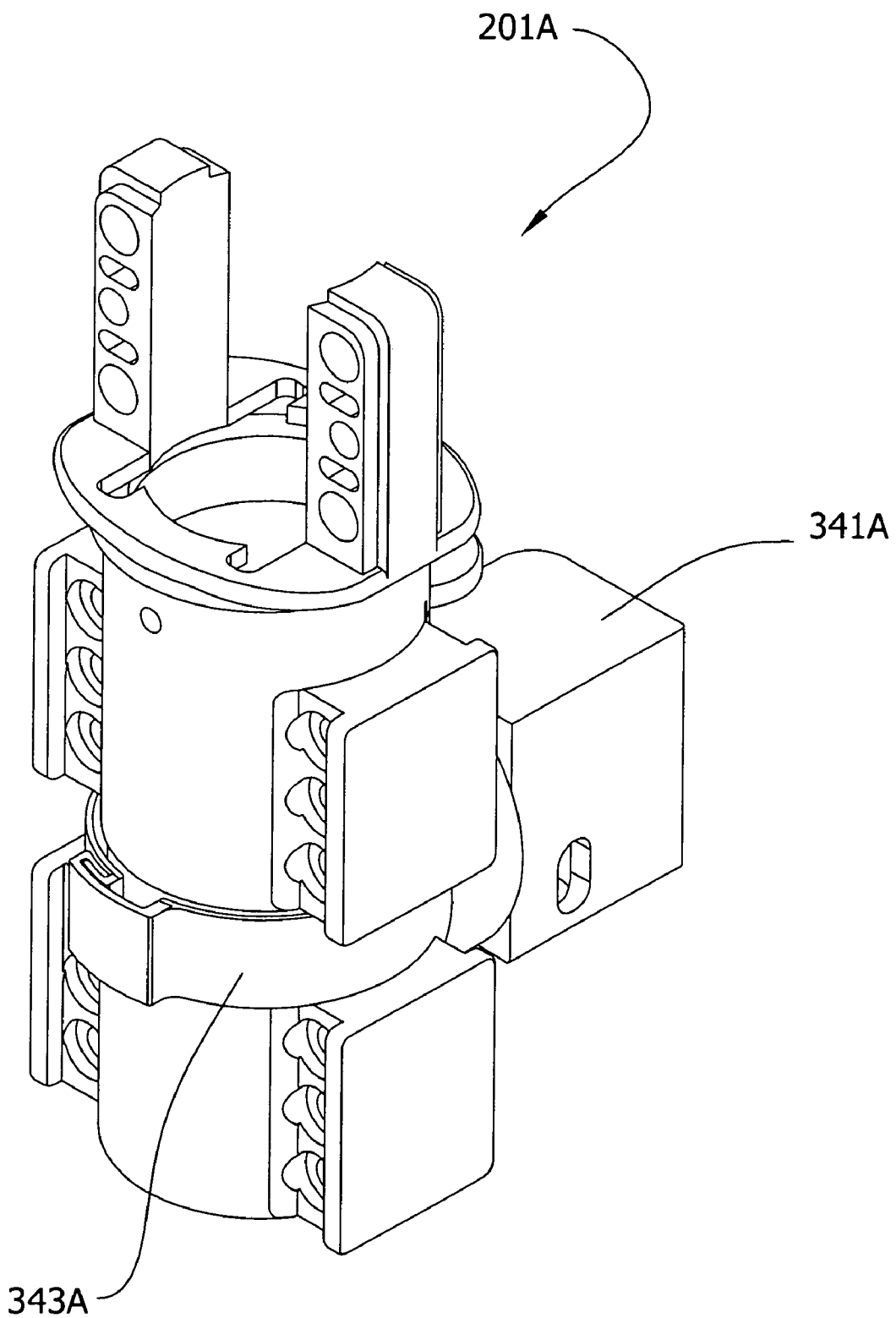
FIG. 54 is a perspective of the mount of FIG. 52 wherein the adjustable support is clipped onto a mount body.
Figure 55:
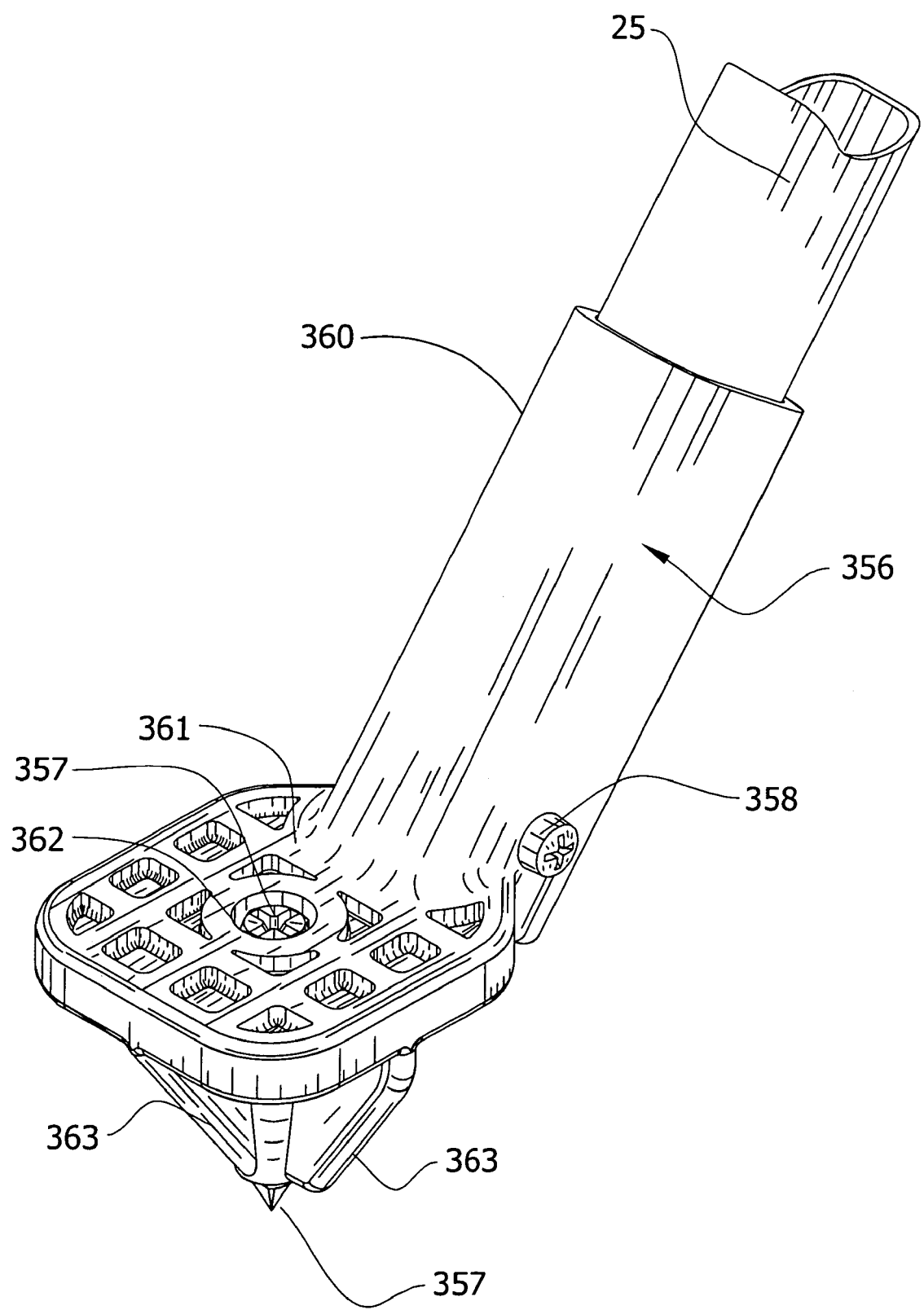
FIG. 55 is a fragmentary perspective of a leg including a modified foot assembly.
Figure 56:
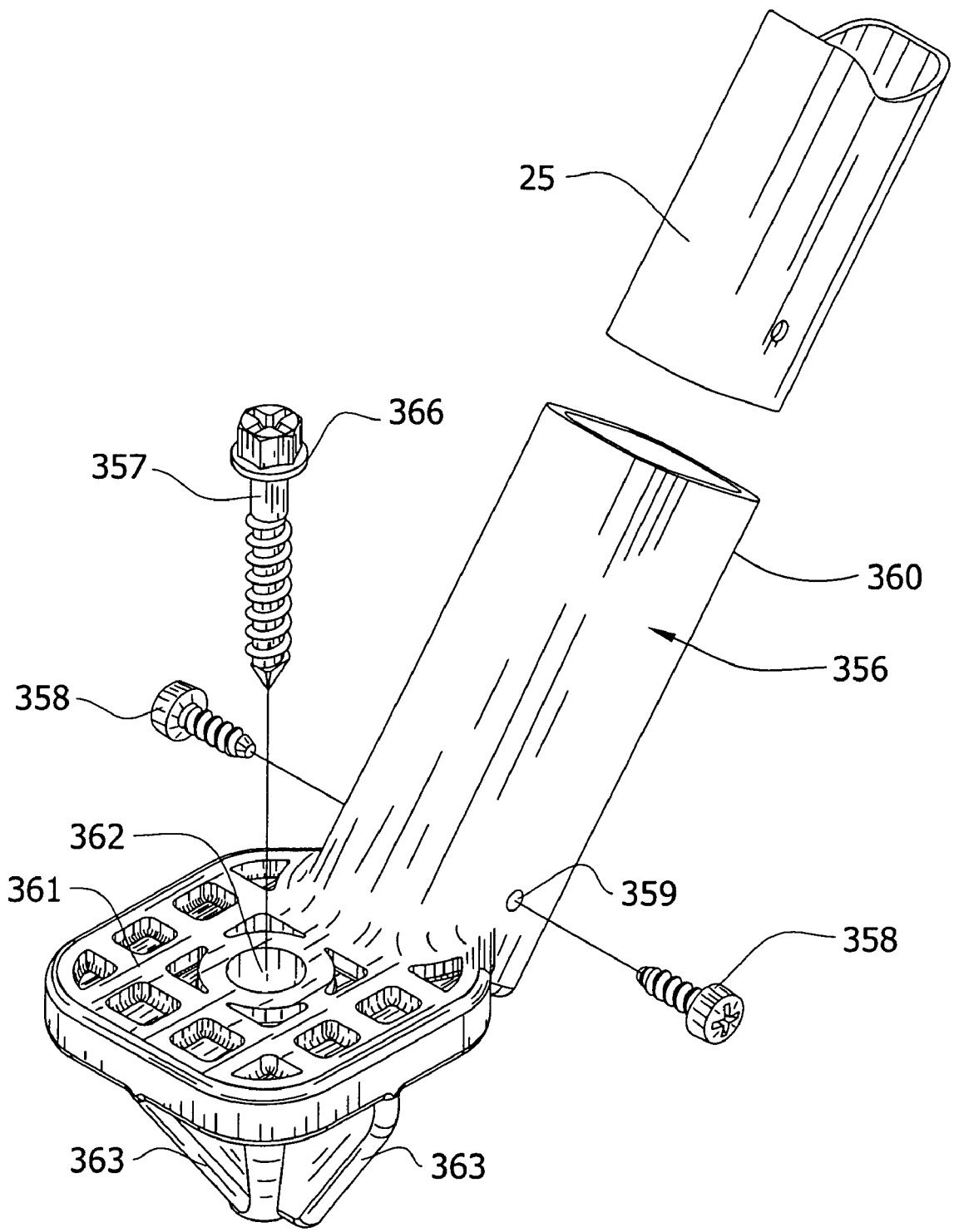
FIG. 56 the perspective of FIG. 55 with parts exploded.

A modified form of connecting an article such as the data collector case 313 to the modified mount 201A is shown in FIGS. 52 and 53. The modified version includes a socket member 341 extending outwardly from an attachment member 343 (of substantially the same construction as the attachment member 299). The socket member 341 includes a central hole 345 and multiple locator holes 347 extending in a circle around the central hole. The central hole 345 can receive a peg 349 attached to a C clamp holder 351 capable of gripping the case 313. The peg 349 has a circumferential groove 353 near its distal end which receives the end (not shown) of a hold pin 355 inside the socket member 341 to prevent inadvertent withdrawal of the peg from the socket member. A small stud (not shown) on the side of the C clamp holder 351 is selectively received in one of the locator holes 347 around the central hole 345. The angular position of the C clamp holder 351 and the case 313 is selected by choosing the locator hole 347 into which the stud is inserted. A further modified version of the socket member 341A and attachment member is shown in FIG. 54. As with the version shown in FIGS. 45 and 46, the attachment member 343 is replaced by an elastic clip 343A for snap on connection to the fixed mount 201A.

Referring now to FIGS. 55-63, a foot assembly of a second embodiment is designated generally at 356, and shown mounted on the lower end of the second leg section 25. The foot assembly 356 includes a receptacle 360 for receiving a lower end of the second leg section 25 onto a boss 365 at the bottom of the receptacle (FIG. 57) to orient and locate the foot assembly relative to the second leg section. Pan head screws 358 are received through respective openings 359 to secure the foot assembly 356 to the second leg section 25. A foot pad 361 formed as one piece with the receptacle 360 is used to apply foot pressure to drive the foot assembly into the ground. Two generally triangular webs 363 located under the foot pad 361 are arranged perpendicularly to each other in a "T" pattern. The webs 363 strengthen the foot pad 361 and provide stability as will be described.

The foot pad 361 has a counterbore 362 extending through it which receives a screw 357 used to secure the foot assembly 356 (and hence the support) to the ground. The foot assembly 356 is able to engage a variety of terrain surfaces of different densities. These commonly encountered terrain surfaces include concrete, asphalt, frozen ground, ice, loose soil, mud and sand. Stability of the survey support system is best achieved by a positive connection of the support with all of these varying terrains. More particularly, the foot assembly 356 should connectively resist several forces including upward/extraction of the foot and also side-to-side rolling (pivoting about the axis of the second leg section 25). The greatest force to resist is found in compression and tension along the centerline of the leg. Differing densities of the variously engaged terrains necessitate significantly differing sized bearing surface areas to attain the same degree of stability. The present invention provides penetration and sufficient bearing on all these surfaces. For instance, on asphalt or ice, sufficient bearing surface is provided solely by the screw's penetration, because a positive (threaded) connection with those surfaces can be made. However, on loose soil or sand where no positive connection can be made by the screw 357, a much larger bearing surface is provided by the webs 363 and underside of the foot pad 361.

Screw 357 may be a standard manufacture, metal screw-type masonry fastening anchoring product that is commercially available and is typically used to attach objects to masonry and concrete substrates. A suitable example of these fasteners is produced by Illinois Tool Works, Inc. of Glenview, Ill. and is marketed under the mark "TAPCON". In the case of survey supports, some terrain surfaces that are encountered are particularly hard and abrasive. The screw 357 still provides an advantage even though it may not make a threaded engagement with the surface. The screw is hardened and exceptionally resistant to wear. However, should wear ultimately occur, the exposed length of screw 357 below the foot may be advanced to accommodate some abrasive wear. Since the screw 357 is of standard manufacture and is widely available, field replacement of the screw itself is also possible. In fact, screws of the same type and diameter, but of different lengths are also available and therefore allow further adaptation of the support to specific field conditions.

Figure 57:
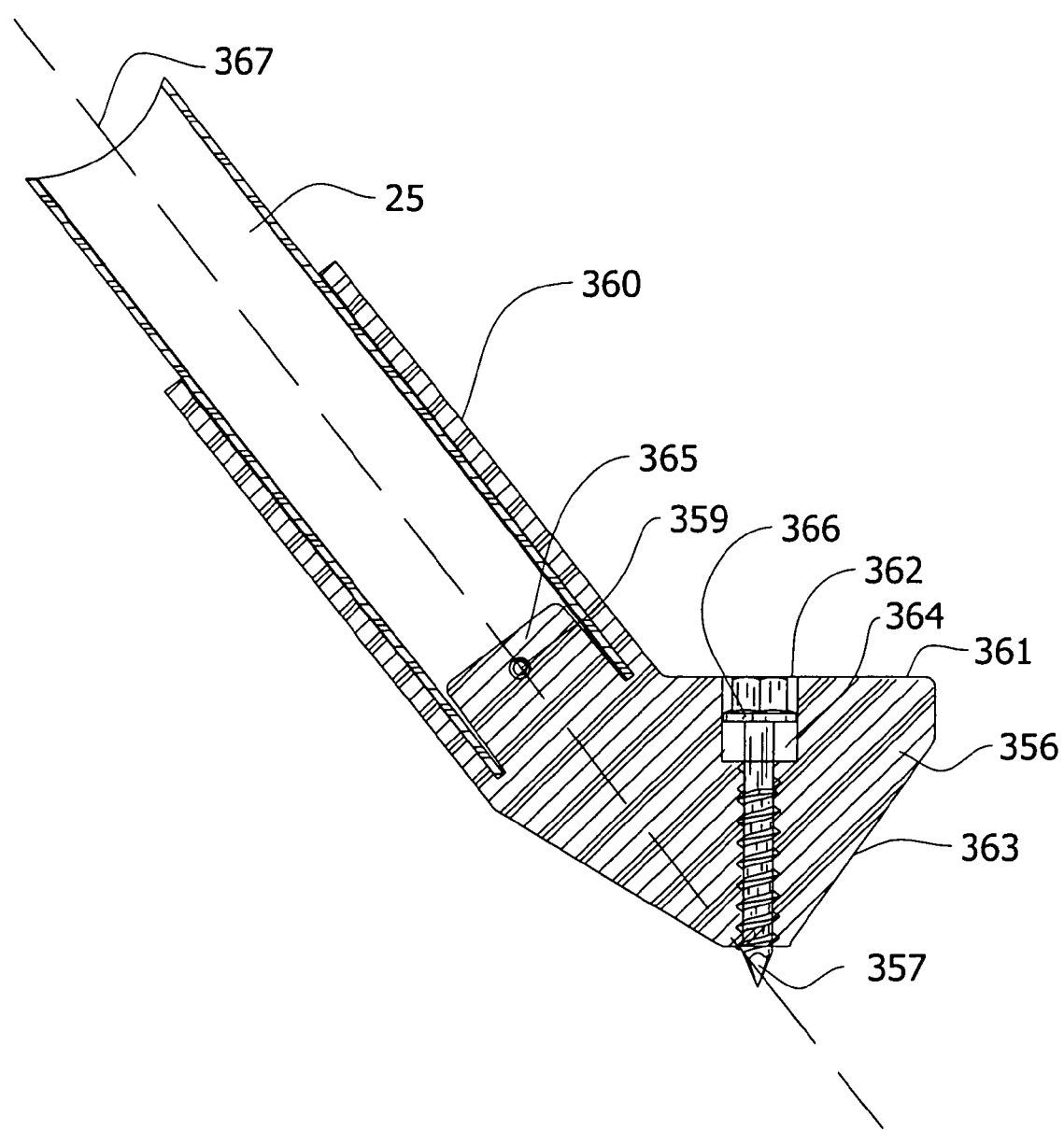
FIG. 57 is a section taken in the plane including line 57-57 of FIG. 58, a screw of the foot assembly not being sectioned and being shown in a retracted position.
Figure 58:
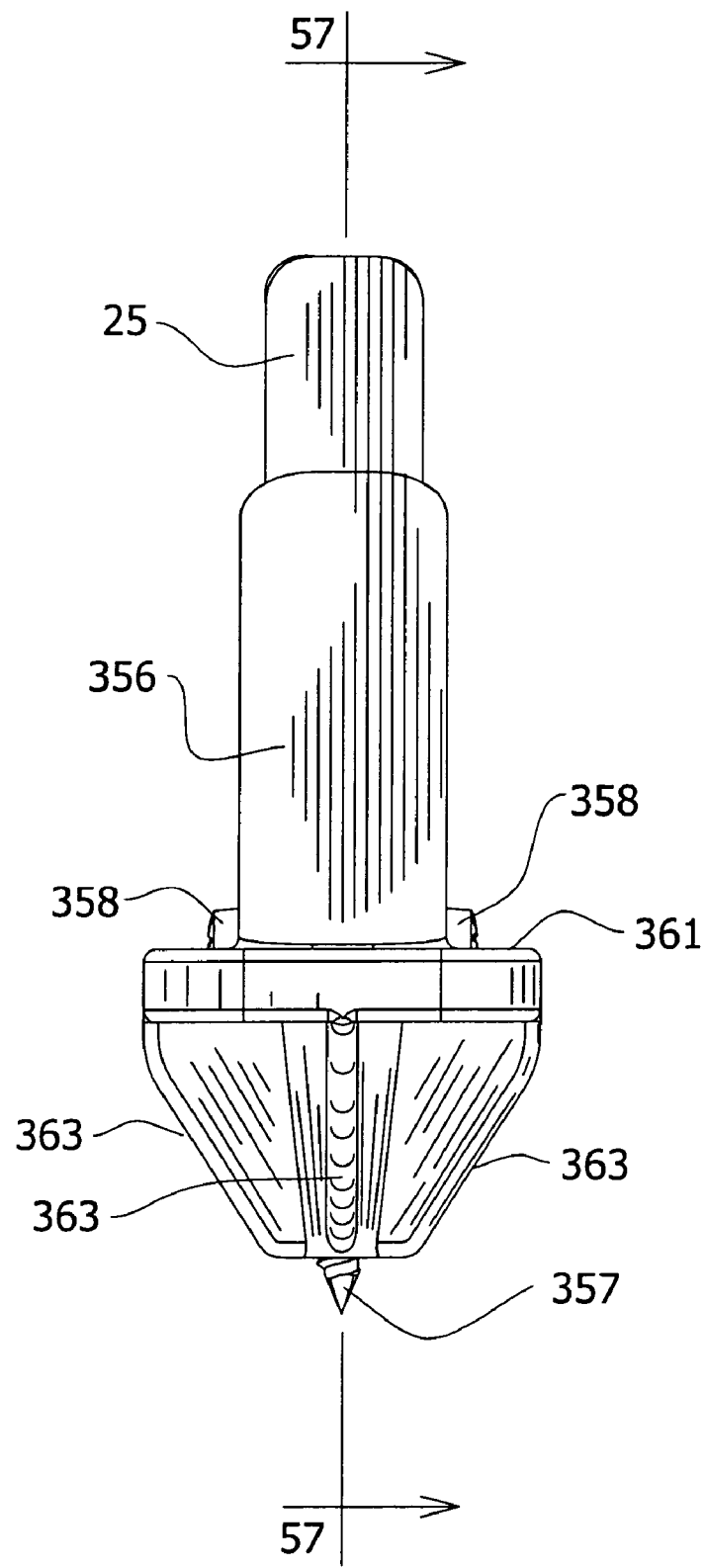
FIG. 58 is an inside elevation of the leg and foot assembly.
Figure 59:
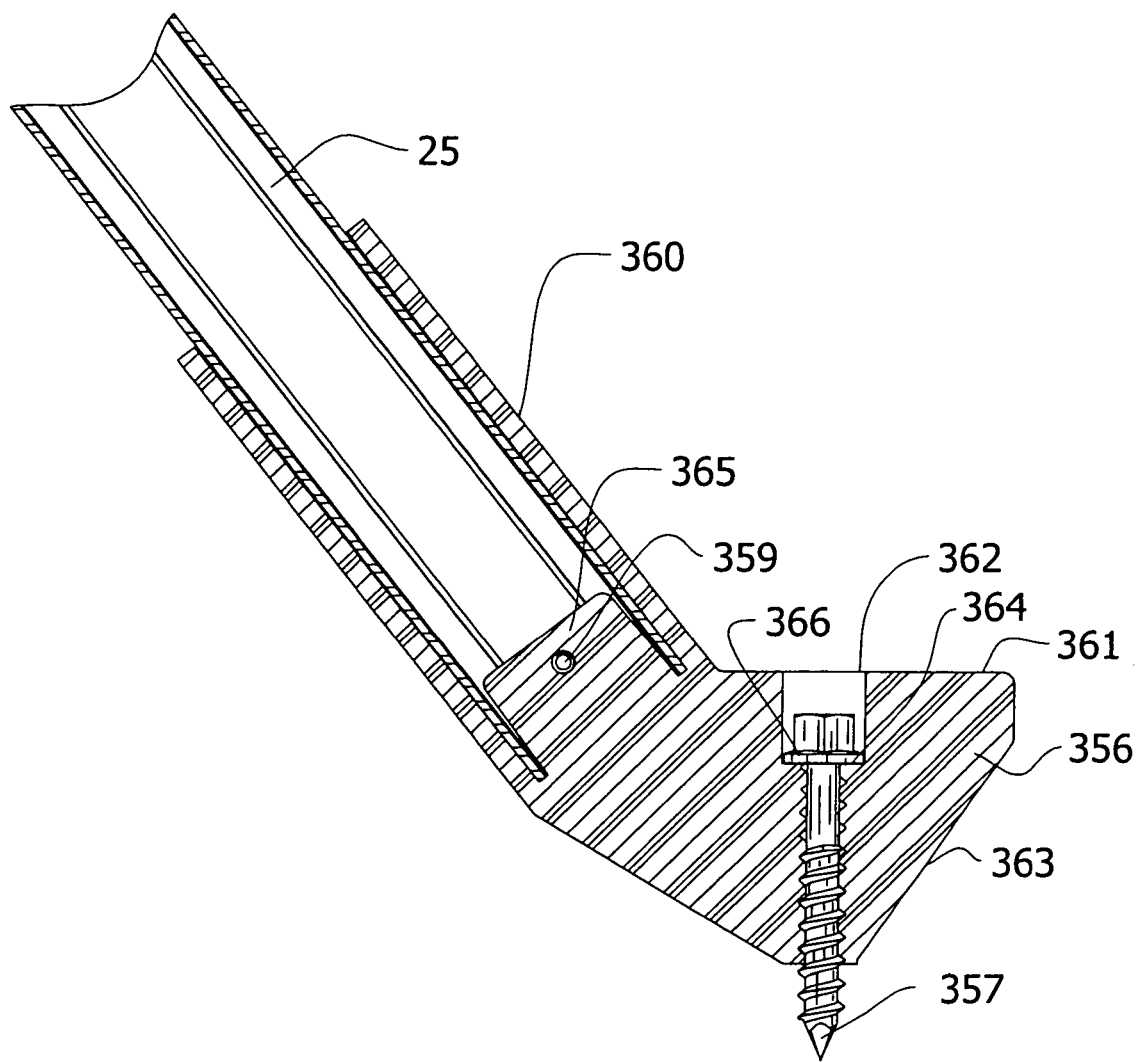
FIG. 59 is a section taken in the plane including line 59-59 of FIG. 60, the screw 357 being in a fully extended position.

Field adjustment of the exposed length of screw 357 (i.e., the length of the screw projecting below the bottom of the foot assembly 356, see FIGS. 57 and 59) is anticipated. To provide for unobstructed adjustment, counterbore 362 is sized to receive screw 357 and a screwdriver (not shown) to allow for adjustment. A smooth upper portion 364 of the counterbore 362 receives the head of the screw 357 below an upper surface of the foot pad 361 and allows selective adjustment of the screw. The lower portion of the counterbore 362 threadably engages the foot assembly 356 so that rotation of the screw 357 produces extension from or retraction into the counterbore. A washer 366 formed integrally with the screw 357 at the based of the screw head is sized to closely fit within counterbore 362 while still allowing movement of the screw within the counterbore. The close fitting relationship between the screw washer 366 and counterbore 362 forms a seal and prevents dirt and debris from entering a spaced between the underside of the washer 366 and the bottom of the smooth upper portion 364. Thus, dirt and debris will not limit the amount of adjustment of the screw 357 which can be made.

Figure 60:
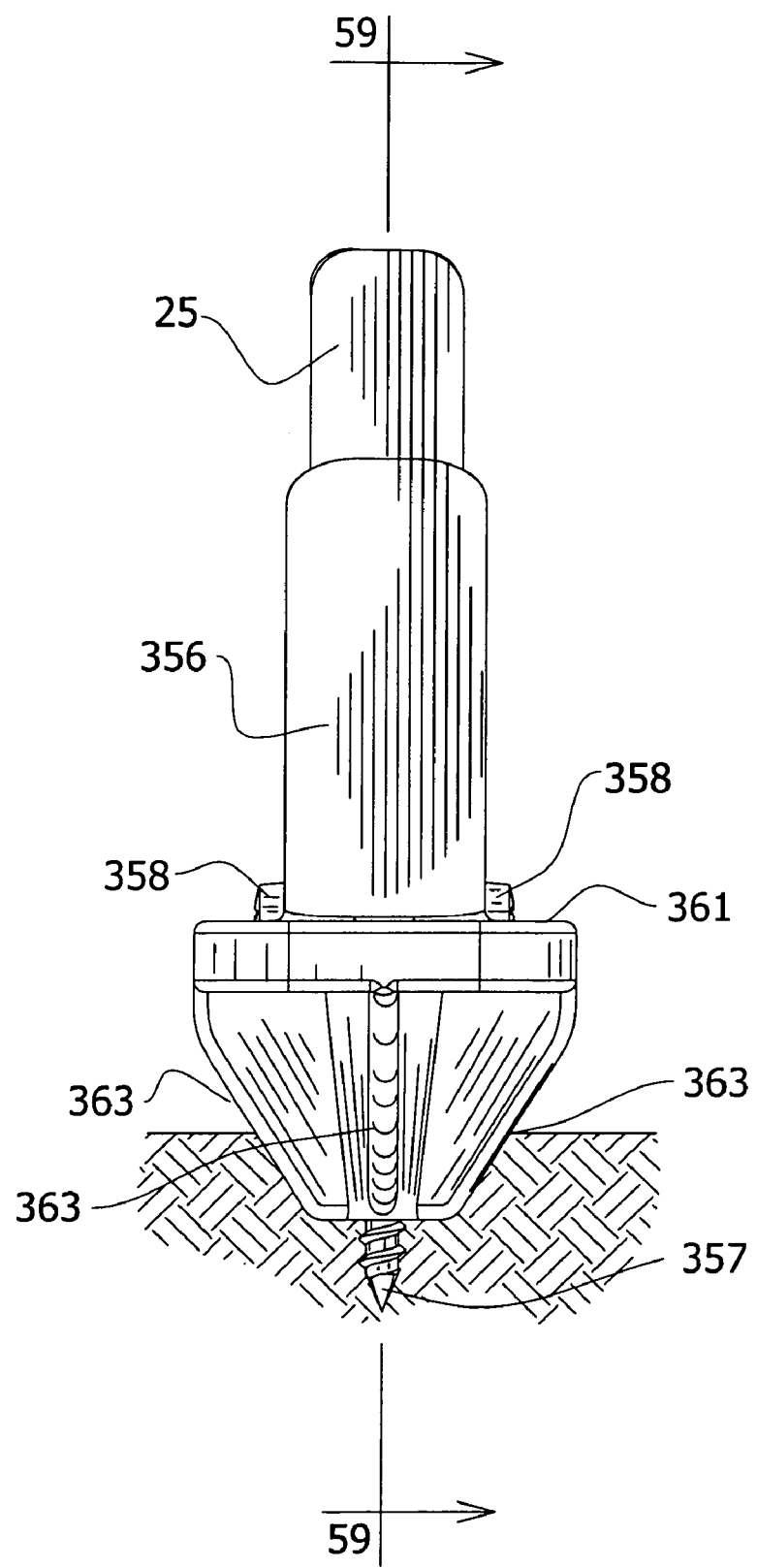
FIG. 60 is an inside elevation of the leg and foot assembly.
Figure 61:
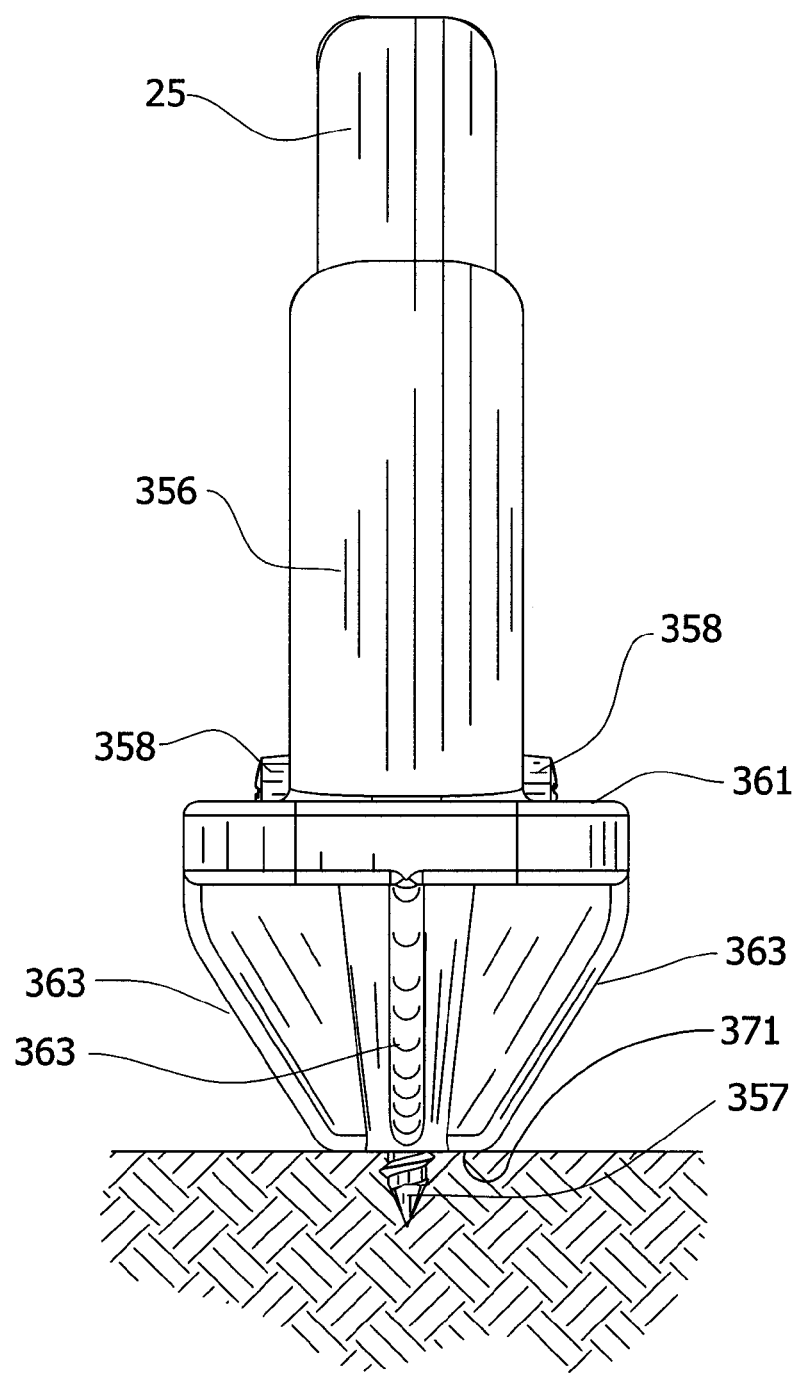
FIG. 61 is a an outside elevation of the foot on soil.

Screw 357 may be used in several different ways to secure the foot to the underlying ground or other surface. In the instances of use on hard, but rough terrain surfaces and when the support is used only to assist the user in steadying the support, only the point of the screw is required to contact the terrain surface. The point is sharp and opposes the compressive forces on the leg of the support. In other instances of use on moderately hard terrain surfaces such as frozen soil, asphalt pavement and ice, the screw 357 can be selectively extended to increase the depth of penetration into the surface. The greater extension of the screw 357 to provide a greater depth of terrain surface penetration is illustrated in FIG. 59 and FIG. 60. The foot assembly 356 is thrust into the terrain by the user's foot pressure applied by stepping on the foot pad 361 so that not only the exposed portion of the screw 357 penetrates the surface, but at least a portion of the webs 363. In this use, the threads of screw 357 are thrust into the terrain without rotation and contact the terrain to provide a barbed, resistive connection in these dense surfaces. Further stability is offered by the flat web surfaces 371. These surfaces offer resistance to forces tending to unseat the foot because of the orientation of the webs 363 and the surface areas available to distribute the loads applied through the legs 19, 21. The orientation of the webs 363 relative to the remainder of the leg 19 will provide surface areas which are not parallel to the applied loads. With the resulting increase in area for absorption of the applied loads, significant resistance to the forces tending to move the foot is generated.

Figure 62:
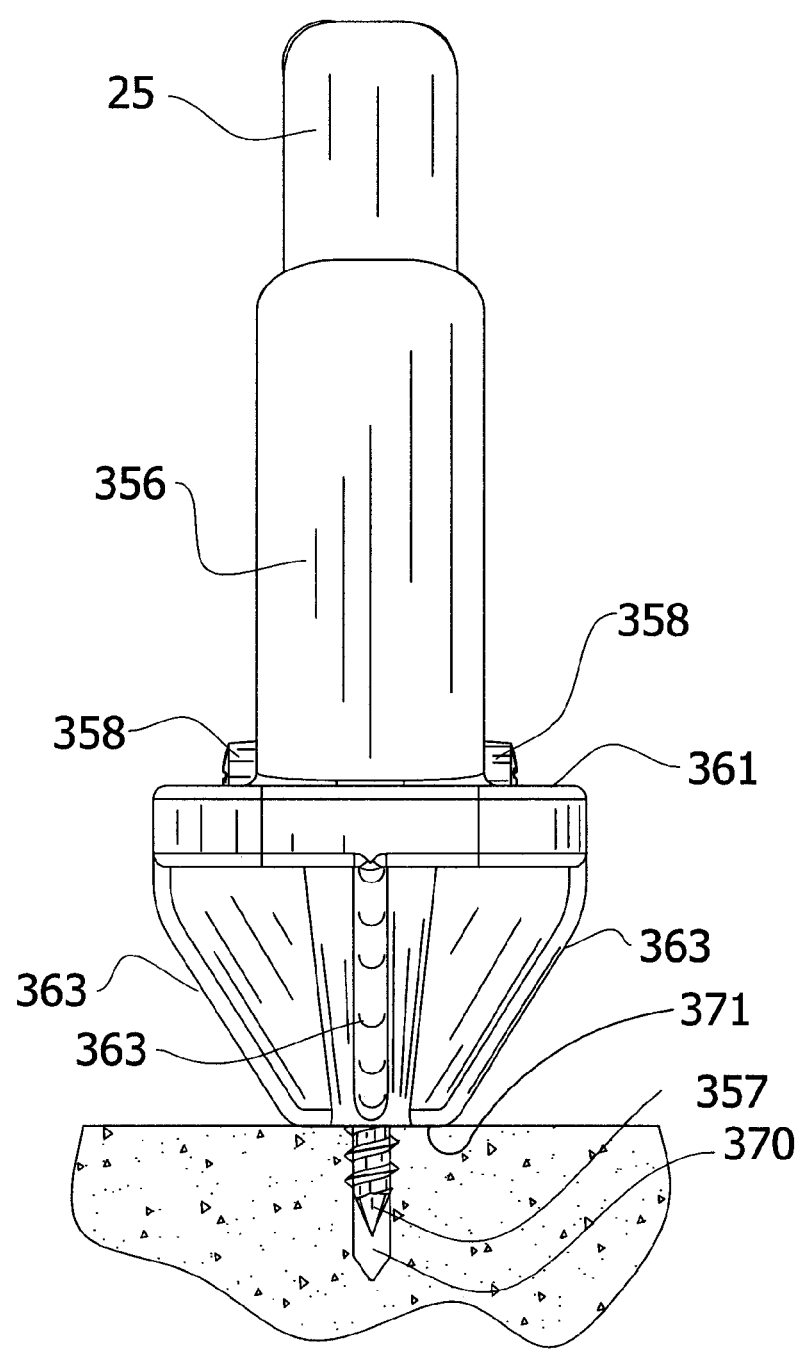
FIG. 62 is a outside elevation of the foot on concrete.
Figure 63:
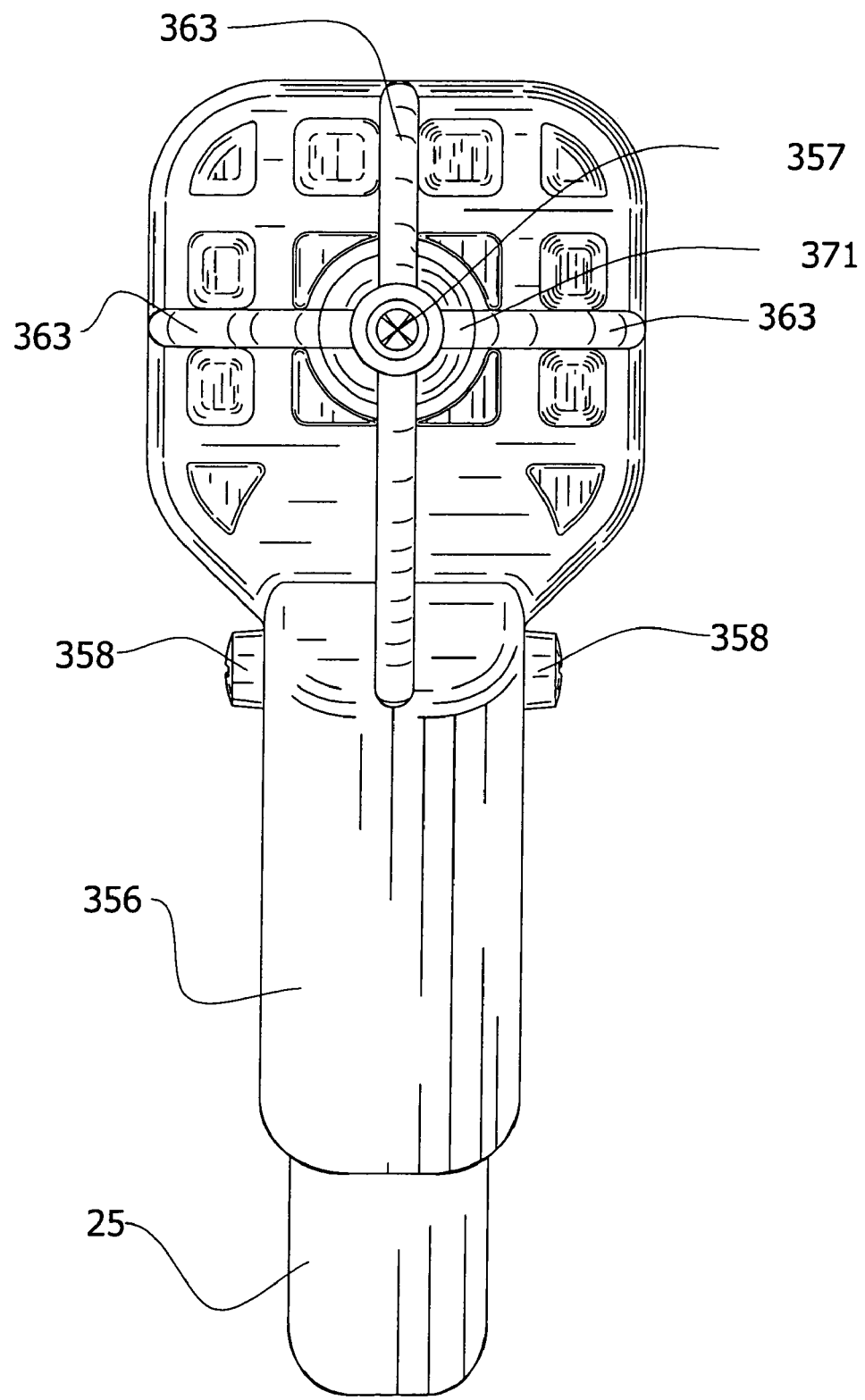
FIG. 63 is a bottom plan view of the foot.

When the support is used on hard terrain surfaces and is exposed to wind or other destabilizing forces, another method of use is possible. The method in such case requires the creation of a hole in the hard terrain substrate surface as illustrated in FIG. 62. In this method, screw 357 is first retracted fully into the foot 356. A pilot hole 370 is drilled into a concrete or masonry substrate having size approximately equal to the minor diameter of the screw 357 and depth sufficient to accommodate the fully extended length of the screw. The foot assembly 356 is aligned over the hole 370 and the screw 357 is rotationally advanced into the hole (FIG. 62). The threads of the screw 357 directly engage the concrete or masonry substrate in the hole 370. The screw 357 is advanced by rotation so that the washer 366 formed as one piece with the head of the screw (at its base) engages the bottom of the smooth portion 364. Further advancement of the screw 357 pulls the foot assembly 356 downwardly against the substrate (e.g., the concrete surface illustrated in FIG. 62). When screw 357 is fully advanced, the threads of screw 357 connectively engage both the substrate hole surface 370 and also the surfaces of counterbore 362, thus forming a positive connection of the support to the concrete. While surveyors and other users of geomatic supports normally do not install concrete screws, they do typically posses and use hole generating tools such as star-drills or cordless hammer drills to produce holes in concrete surfaces for the mounting of survey monuments, pins and markers. Additionally, these same users also typically possess screwdriver tools of the same type as required to engage screw 357. These same hole-generating capabilities and screwdrivers thus may be conveniently utilized and applied to provide receptacle holes and to engage screw 357 in the above described manner.

Use of the support in less dense terrain surfaces such as soil, sand and mud are also anticipated. In instances of engaging less dense terrain surfaces such as soil or sand, screw 357 alone does not provide sufficient connective resistance required for stability on the support. To provide sufficient connective resistance on these less dense surfaces, the webs 363 of the foot 357 are also provided. In use, these webs 363 are downwardly thrust into the substrate terrain to substantially their full height. To facilitate downward penetration in the terrain, these webs 363 are formed in a cross shape in order to provide a small cross-sectional surface. Terrain penetration is further facilitated by foot pad 361 wherein the user applies his or her weight to insert the foot 356 into the terrain. The broad surfaces of the webs 363 however are arranged to provide bearing surfaces which are perpendicular to each other to enhance resistance to the forces of the leg in maintaining stability of the support.

Insertion of the foot into less dense terrain can be difficult for the user as the foot can tend to rotate in response to uneven resistance in the substrate terrain. For instance, one side of the foot can encounter a small rock while the other encounters only soil. Rotation of the foot (about the axis 367 of the leg 25) is undesirable, as the webs must be fully planted in order to provide optimum stability resistance to forces. To resist this rotational effect, several features are combined. For one, the foot pad 361 is formed in a shape that is wider than the distance from the foot pad 361 to the line of contact with the terrain (e.g., the width of the foot pad is greater that the height from the foot pad to the distal surface 371 of the webs 363). The contact area of the foot pad 361 encountered by the users shoe tends to cause the webs 363 to remain perpendicularly aligned during insertion. Further, the flat surfaced sides of webs 363 tend to guide insertion once they penetrate the terrain. An additional feature is the contact line 371 formed at the distal ends of the webs. The width of the contact line tends to further distribute and balance the forces of insertion of the webs 363 as they penetrate the terrain. The contact line 371 tries to engage the ground over its whole length tending to cause the foot to square up before penetrating the ground.

When used on hard terrain surfaces such as concrete, instability of the support can also occur if the legs 25 rotate about their centerlines. In these conditions, the hard terrain surface tends to allow only a point contact of the foot. This rotation can occur due to an offset of the point of contact of the foot to the terrain in relationship to the centerline of the leg. The foot assembly 356 of the present invention is formed so that its point of contact with the underlying surface is coplanar with the centerline 367 of the leg to reduce the tendency of the foot assembly 356 to rotate as it is being forced into the ground. However, the foot assembly 356 is also constructed so that the foot pad 361 and webs 363 are not coaxial with and are arranged at an angle to the centerline 367 to resist compressive and extensive forces applied by the second leg section 25 to the foot assembly.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A support for use in supporting geomatic equipment, said support comprising
    a head,
    at least one leg for use in supporting the head above the ground,
    a hinge adapted to connect the leg to the head for pivoting movement of the leg about an axis relative to the head in directions outwardly from the head and inwardly toward the head,
    a hinge lock adapted to lock the leg in a fixed position of pivoting relative to the head, and
    a hinge lock actuator rotatable between a locked position of the hinge lock in which the leg is held in the fixed position, and an unlocked position in which the leg is free to pivot with respect to the head,
    the actuator being constrained for rotation between a first position corresponding to said locked position and a second position corresponding to said unlocked position, said actuator being movable between said first position and said second position by rotating the actuator less than 180°.

2. A support as set forth in claim 1 wherein the actuator rotates no more than about 90° between said first position and said second position.

3. A support as set forth in claim 2 wherein the actuator comprises a handle having a projecting finger grip.

4. A support as set forth in claim 3 wherein the hinge lock includes first detents associated with the head and second detents associated with the leg.

5. A support as set forth in claim 4 wherein the hinge lock is constructed for selectively moving the first and second detents into and out of engagement with each other.

6. A support as set forth in claim 5 wherein the first and second detents are arranged generally around the pivot axis of the leg.

7. A support as set forth in claim 6 further comprising a sleeve associated with the leg wherein the first detents include a first set of spaced apart ridges on the head, and wherein the second detents include a first set of spaced apart ridges on the sleeve facing the first set of ridges, the facing sets of ridges being intermeshed to lock the leg against pivoting relative to the head in the locked position of the actuator.

8. A support as set forth in claim 1 wherein the head comprises a first wall, a second wall, a top wall and a bottom wall, the walls being connected together to form a box structure in which the hinge is received.

9. A support as set forth in claim 8 wherein the top and bottom walls have channels formed therein, edge portions of the first and second walls being received in the channels of the top and bottom walls, the channels permitting movement of the second wall transversely of the channel.

10. A support as set forth in claim 1 comprising at least two legs for use in supporting the head above the ground, each leg including the hinge adapted to connect the leg to the head for pivoting movement of the leg about an axis relative to the head in directions outwardly from the head and inwardly toward the head and the hinge lock adapted to lock the leg in a fixed position of pivoting relative to the head.

11. A support as set forth in claim 1 wherein the head is adapted for releasable connection to a geomatic pole.

12. A support as set forth in claim 1 in combination with a geomatic pole.

13. A support for use in supporting geomatic equipment, said support comprising
   a head,
   at least one leg for use in supporting the head above the ground,
   a hinge adapted to connect the leg to the head for pivoting movement of the leg about an axis relative to the head in directions outwardly from the head and inwardly toward the head,
   a hinge pin attached to the head, said hinge pin having a diameter at least about as great as the length of the pin thereby providing a large cylindrical surface on which the hinge may turn,
   a tubular sleeve attached to the leg for receiving the hinge pin.

14. A support as set forth in claim 13 wherein the hinge pin has a diameter that is greater than the length of the pin.

15. A support as set forth in claim 13 wherein the head comprises a first wall, a second wall, a top wall, and a bottom wall, the hinge pin projecting outwardly from one of said walls.

16. A support as set forth in claim 13 wherein the tubular sleeve is capable of pivoting motion on the hinge pin.

17. A support as set forth in claim 13 in combination with a geomatic pole.

18. A support as set forth in claim 1 further comprising a first stop for preventing the actuator from rotating beyond the unlocked position.

19. A support for use in supporting geomatic equipment, said support comprising
   a head,
   at least one leg for use in supporting the head above the ground,
   a hinge adapted to connect the leg to the head for pivoting movement of the leg about an axis relative to the head in directions outwardly from the head and inwardly toward the head,
   a hinge lock adapted to lock the leg in a fixed position of pivoting relative to the head, and
   a hinge lock actuator rotatable between a locked position of the hinge lock in which the leg is held in the fixed position, and an unlocked position in which the leg is free to pivot with respect to the head,
   the actuator being constrained for rotation between a first position corresponding to said locked position and a second position corresponding to said unlocked position.

* * * * *